United States Patent
Butler et al.

(10) Patent No.: US 10,539,758 B2
(45) Date of Patent: Jan. 21, 2020

(54) TRACEABLE FIBER OPTIC CABLE ASSEMBLY WITH INDICATION OF POLARITY

(71) Applicant: CORNING RESEARCH & DEVELOPMENT CORPORATION, Corning, NY (US)

(72) Inventors: Douglas Llewellyn Butler, Painted Post, NY (US); Adam Kent Collier, Montour Falls, NY (US); Patrick Michael Gargano, Corning, NY (US); Ashley Wesley Jones, Denton, TX (US); Jason Clay Lail, Conover, NC (US); Radawan Ripumaree, Granite Falls, NC (US); Hieu Vinh Tran, Charlotte, NC (US)

(73) Assignee: Corning Research & Development Corporation, Charlotte, NC (US)

( * ) Notice: Subject to any disclaimer, the term of this patent is extended or adjusted under 35 U.S.C. 154(b) by 0 days.

(21) Appl. No.: 16/151,884

(22) Filed: Oct. 4, 2018

(65) Prior Publication Data
US 2019/0170957 A1    Jun. 6, 2019

Related U.S. Application Data

(63) Continuation of application No. 16/144,094, filed on Sep. 27, 2018.
(Continued)

(51) Int. Cl.
*G02B 6/44* (2006.01)
*G02B 6/38* (2006.01)

(52) U.S. Cl.
CPC .......... *G02B 6/447* (2013.01); *G02B 6/3893* (2013.01); *G02B 6/4452* (2013.01)

(58) Field of Classification Search
None
See application file for complete search history.

(56) References Cited

U.S. PATENT DOCUMENTS

| | | |
|---|---|---|
| 3,942,859 A | 3/1976 | Korodi |
| 4,412,936 A | 11/1983 | Khmelkov et al. |

(Continued)

FOREIGN PATENT DOCUMENTS

| | | |
|---|---|---|
| CN | 200941319 Y | 8/2007 |
| CN | 201419706 Y | 3/2010 |
| CN | 102589728 A | 7/2012 |
| CN | 201305952 U | 7/2012 |
| CN | 203241575 U | 10/2013 |
| DE | 4413597 A1 | 10/1995 |

(Continued)

OTHER PUBLICATIONS http://www.dexim.net/list.php?id=7, Dexim product reference, downloaded from the web Feb. 24, 2016. 2 pages.
(Continued)

*Primary Examiner* — Tina M Wong
(74) *Attorney, Agent, or Firm* — Adam R. Weeks

(57) ABSTRACT

Disclosed herein is a traceable fiber optic cable assembly with indication of polarity. In particular, the traceable fiber optic cable assembly includes a traceable fiber optic cable, a first duplex connector at a first end of the fiber optic cable, and a second duplex connector at a second end of the fiber optic cable. A first tracing end of the tracing optical fiber is in a preconfigured orientation in the first duplex connector offset from a central axis of the first duplex connector, and a second tracing end of the tracing optical fiber is in a preconfigured orientation in the second duplex connector offset from a central axis of the second duplex connector. The tracing optical fiber receives an optical tracing signal for propagation to the second tracing end of the first tracing optical fiber to indicate a first orientation of the first duplex connector corresponding to a first polarity state of the traceable fiber optic cable assembly.

25 Claims, 31 Drawing Sheets

Related U.S. Application Data

(60) Provisional application No. 62/594,834, filed on Dec. 5, 2017.

(56) References Cited

U.S. PATENT DOCUMENTS

| | | | |
|---|---|---|---|
| 4,422,719 A | 12/1983 | Orcutt | |
| 4,466,697 A | 8/1984 | Daniel | |
| 4,557,552 A | 12/1985 | Newton et al. | |
| 4,637,686 A | 1/1987 | Iwamoto et al. | |
| 4,755,018 A | 7/1988 | Heng et al. | |
| 4,762,416 A | 8/1988 | Lefevre et al. | |
| 4,763,984 A | 8/1988 | Awai et al. | |
| 4,768,854 A | 9/1988 | Campbell et al. | |
| 4,923,274 A | 5/1990 | Dean | |
| 4,995,691 A | 2/1991 | Purcell, Jr. | |
| 5,006,806 A | 4/1991 | Rippingale et al. | |
| 5,017,873 A | 5/1991 | Rippingale et al. | |
| 5,040,867 A | 8/1991 | de Jong et al. | |
| 5,122,750 A | 6/1992 | Rippingale et al. | |
| 5,179,611 A | 1/1993 | Umeda et al. | |
| 5,206,065 A | 4/1993 | Rippingale et al. | |
| 5,305,405 A | 4/1994 | Emmons et al. | |
| 5,329,348 A | 7/1994 | Nimura et al. | |
| 5,333,228 A | 7/1994 | Kingstone | |
| 5,345,520 A | 9/1994 | Grile | |
| 5,377,292 A | 12/1994 | Bartling et al. | |
| 5,394,496 A | 2/1995 | Caldwell et al. | |
| 5,395,362 A | 3/1995 | Sacharoff et al. | |
| 5,432,876 A | 7/1995 | Appledorn et al. | |
| 5,463,706 A | 10/1995 | Dumont et al. | |
| 5,500,913 A | 3/1996 | Allen et al. | |
| 5,591,160 A | 1/1997 | Reynard | |
| 5,666,453 A | 9/1997 | Dannenmann | |
| 5,741,152 A | 4/1998 | Boutros | |
| 5,764,043 A | 6/1998 | Czosnowski et al. | |
| 5,835,654 A | 11/1998 | Bergmann | |
| 5,937,127 A | 8/1999 | Zarian et al. | |
| 5,979,188 A | 11/1999 | Ojha | |
| 5,982,967 A | 11/1999 | Mathis et al. | |
| 6,126,325 A | 10/2000 | Yamane et al. | |
| 6,137,928 A | 10/2000 | Albrecht | |
| 6,137,935 A | 10/2000 | Bohme et al. | |
| 6,159,037 A | 12/2000 | Madsen et al. | |
| 6,173,097 B1 | 1/2001 | Throckmorton et al. | |
| 6,257,750 B1 | 7/2001 | Strasser et al. | |
| 6,278,827 B1 | 8/2001 | Sugiyama et al. | |
| 6,293,081 B1 | 9/2001 | Grulick et al. | |
| 6,301,418 B1 | 10/2001 | Freier et al. | |
| 6,311,000 B1 | 10/2001 | Schneider | |
| 6,314,713 B1 | 11/2001 | Fitz et al. | |
| 6,317,553 B1 | 11/2001 | Harper, Jr. et al. | |
| 6,347,172 B1 | 2/2002 | Keller et al. | |
| 6,356,690 B1 | 3/2002 | McAlpine et al. | |
| 6,379,054 B2 | 4/2002 | Throckmorton et al. | |
| 6,388,194 B1 | 5/2002 | Ryeczek | |
| 6,403,947 B1 | 6/2002 | Hoyt et al. | |
| 6,425,694 B1 | 7/2002 | Szilagyi et al. | |
| 6,439,780 B1 | 8/2002 | Mudd et al. | |
| 6,456,768 B1 | 9/2002 | Boncek et al. | |
| 6,456,785 B1 | 9/2002 | Evans | |
| 6,471,412 B1 | 10/2002 | Belenkiy et al. | |
| 6,519,396 B2 | 2/2003 | Schneider et al. | |
| 6,526,200 B1 | 2/2003 | Davie | |
| 6,532,328 B1 | 3/2003 | Kline | |
| 6,554,485 B1 | 4/2003 | Beatty et al. | |
| 6,560,390 B2 | 5/2003 | Grulick et al. | |
| 6,577,243 B1 | 6/2003 | Dannenmann et al. | |
| 6,596,943 B1 | 7/2003 | Ward | |
| 6,606,431 B2 | 8/2003 | Unsworth | |
| 6,640,028 B1 | 10/2003 | Schroll et al. | |
| 6,643,443 B2 | 11/2003 | Holman et al. | |
| 6,678,449 B2 | 1/2004 | Thompson et al. | |
| 6,695,491 B1 | 2/2004 | Leeman et al. | |
| 6,710,254 B2 | 3/2004 | Yueh | |
| 6,712,524 B2 | 3/2004 | Beatty et al. | |
| 6,728,453 B2 | 4/2004 | Petryszak | |
| 6,758,600 B2 * | 7/2004 | Del Grosso | G02B 6/3851 385/59 |
| 6,798,956 B2 | 9/2004 | Morrison | |
| 6,816,661 B1 | 11/2004 | Barnes et al. | |
| 6,823,120 B2 | 11/2004 | Hurley et al. | |
| 6,876,809 B1 | 4/2005 | Sonderegger et al. | |
| 6,906,505 B2 | 6/2005 | Brunet et al. | |
| 6,933,438 B1 | 8/2005 | Watts et al. | |
| 6,969,273 B2 | 11/2005 | Chen | |
| 6,979,223 B2 | 12/2005 | Chen | |
| 6,995,565 B1 | 2/2006 | Tulloch et al. | |
| 7,020,369 B2 | 3/2006 | Lodge, Jr. et al. | |
| 7,029,137 B2 | 4/2006 | Lionetti et al. | |
| 7,038,135 B1 | 5/2006 | Chan et al. | |
| 7,049,937 B1 | 5/2006 | Zweig et al. | |
| 7,090,411 B2 | 8/2006 | Brown | |
| 7,121,707 B2 | 10/2006 | Currie et al. | |
| 7,147,383 B2 * | 12/2006 | Sullivan | G02B 6/3878 385/59 |
| 7,164,819 B2 | 1/2007 | Jenson et al. | |
| 7,215,860 B2 | 5/2007 | Engelberth et al. | |
| 7,217,152 B1 | 5/2007 | Xin et al. | |
| 7,221,284 B2 | 5/2007 | Scherer et al. | |
| 7,242,831 B2 | 7/2007 | Fee | |
| 7,313,304 B2 | 12/2007 | Andrews et al. | |
| 7,330,632 B1 | 2/2008 | Buelow, II et al. | |
| 7,401,961 B2 | 7/2008 | Longatti et al. | |
| 7,406,231 B1 | 7/2008 | Beck et al. | |
| 7,433,565 B2 | 10/2008 | Joseph et al. | |
| 7,524,082 B2 | 4/2009 | North | |
| 7,544,909 B2 | 6/2009 | Dhir | |
| 7,572,066 B2 | 8/2009 | De Jong et al. | |
| 7,596,293 B2 | 9/2009 | Isenhour et al. | |
| 7,603,020 B1 | 10/2009 | Wakileh et al. | |
| 7,618,175 B1 | 11/2009 | Hulse | |
| 7,620,279 B2 | 11/2009 | Joseph | |
| 7,653,277 B2 | 1/2010 | Andrews et al. | |
| 7,671,279 B2 | 3/2010 | Yin | |
| 7,748,860 B2 | 7/2010 | Brunet | |
| 7,817,884 B2 | 10/2010 | Demeritt et al. | |
| 7,920,764 B2 | 4/2011 | Kewitsch | |
| 7,932,805 B2 | 4/2011 | Darr et al. | |
| 7,948,226 B2 | 5/2011 | Rathbun, II et al. | |
| 8,000,576 B2 | 8/2011 | Chen et al. | |
| 8,102,169 B2 | 1/2012 | Law et al. | |
| 8,150,227 B2 | 4/2012 | Kewitsch | |
| 8,152,385 B2 | 4/2012 | De Jong et al. | |
| 8,167,471 B1 | 5/2012 | Moritz | |
| 8,314,603 B2 | 11/2012 | Russell | |
| 8,322,871 B1 | 12/2012 | Knaggs et al. | |
| 8,331,752 B2 | 12/2012 | Biribuze et al. | |
| 8,351,750 B2 | 1/2013 | Fine et al. | |
| 8,408,029 B2 | 4/2013 | De Angelis et al. | |
| 8,414,319 B2 | 4/2013 | Patel et al. | |
| 8,428,405 B2 | 4/2013 | Kewitsch | |
| 8,492,448 B2 | 7/2013 | Dewa et al. | |
| 8,509,579 B2 | 8/2013 | Martin-Lopez | |
| 8,545,076 B2 | 10/2013 | Bickham et al. | |
| 8,548,293 B2 | 10/2013 | Kachmar | |
| 8,582,939 B2 | 11/2013 | Gimblet et al. | |
| 8,582,940 B2 | 11/2013 | Abernathy et al. | |
| 8,591,087 B2 | 11/2013 | Bickham et al. | |
| 8,620,123 B2 | 12/2013 | Dean, Jr. et al. | |
| 8,620,125 B2 | 12/2013 | Button et al. | |
| 8,662,760 B2 * | 3/2014 | Cline | G02B 6/3887 385/76 |
| 8,683,827 B2 | 4/2014 | De Angelis et al. | |
| 8,708,724 B2 | 4/2014 | Patel et al. | |
| 8,724,842 B2 | 5/2014 | Sumitani et al. | |
| 8,724,942 B2 | 5/2014 | Logunov et al. | |
| 8,770,525 B2 | 7/2014 | Donaldson et al. | |
| 8,787,717 B2 | 7/2014 | Logunov | |
| 8,791,829 B2 | 7/2014 | Gustafsson et al. | |
| 8,798,419 B2 | 8/2014 | Wessels, Jr. et al. | |
| 8,805,141 B2 | 8/2014 | Fewkes et al. | |
| 8,896,286 B2 | 11/2014 | Abuelsaad et al. | |
| 8,896,287 B2 | 11/2014 | Abuelsaad et al. | |
| 8,897,612 B2 | 11/2014 | Logunov | |

(56) References Cited

U.S. PATENT DOCUMENTS

| | | | |
|---|---|---|---|
| 8,903,212 B2 | 12/2014 | Kachmar | |
| 8,909,013 B1 | 12/2014 | Jiang et al. | |
| 8,929,703 B2 | 1/2015 | Logunov et al. | |
| 9,025,923 B2 | 5/2015 | Logunov et al. | |
| 9,073,243 B2 | 7/2015 | Gimblet et al. | |
| 9,146,347 B2 | 9/2015 | Logunov et al. | |
| 9,182,561 B2 | 11/2015 | Bauco et al. | |
| 9,196,975 B2 | 11/2015 | Scherer et al. | |
| 9,271,709 B2 | 3/2016 | Grey et al. | |
| 9,304,278 B1 | 4/2016 | Bauco et al. | |
| 9,388,975 B2 | 7/2016 | Wenger | |
| 9,429,731 B2 | 8/2016 | Bookbinder et al. | |
| 9,435,713 B2 | 9/2016 | Collier et al. | |
| 9,448,380 B2 | 9/2016 | Mogensen | |
| 9,507,096 B2 | 11/2016 | Isenhour et al. | |
| 9,529,167 B2 | 12/2016 | Wu | |
| 9,571,694 B2 | 2/2017 | Hirao | |
| 9,671,551 B2 | 6/2017 | Dean, Jr. et al. | |
| 9,709,750 B1 | 7/2017 | Kuang et al. | |
| 9,829,651 B2 * | 11/2017 | Hall | G02B 6/3885 |
| 10,120,138 B2 | 11/2018 | Jones | |
| 10,234,614 B2 | 3/2019 | Bauco | |
| 2001/0002220 A1 | 5/2001 | Throckmorton et al. | |
| 2001/0048797 A1 | 12/2001 | Van Dijk et al. | |
| 2002/0009282 A1 | 1/2002 | Grulick et al. | |
| 2002/0036775 A1 | 3/2002 | Wolleschensky et al. | |
| 2002/0037133 A1 | 3/2002 | Unsworth | |
| 2002/0136497 A1 | 9/2002 | McGarry et al. | |
| 2002/0159735 A1 | 10/2002 | Edvold et al. | |
| 2002/0185299 A1 | 12/2002 | Giebel | |
| 2003/0002830 A1 | 1/2003 | Petryszak | |
| 2003/0016924 A1 | 1/2003 | Thompson et al. | |
| 2003/0108270 A1 | 6/2003 | Brimacombe et al. | |
| 2003/0108303 A1 | 6/2003 | Asada | |
| 2003/0152344 A1 | 8/2003 | Brunet et al. | |
| 2003/0206519 A1 | 11/2003 | Sanders et al. | |
| 2003/0222786 A1 | 12/2003 | Dannenmann et al. | |
| 2004/0022504 A1 | 2/2004 | Hurley et al. | |
| 2004/0052473 A1 | 3/2004 | Seo et al. | |
| 2004/0101230 A1 | 5/2004 | Philebrown | |
| 2004/0146254 A1 | 7/2004 | Morrison | |
| 2004/0160774 A1 | 8/2004 | Lionetti et al. | |
| 2004/0179777 A1 | 9/2004 | Buelow, II et al. | |
| 2004/0196648 A1 | 10/2004 | Franklin et al. | |
| 2005/0052174 A1 | 3/2005 | Angelo et al. | |
| 2005/0089284 A1 | 4/2005 | Ma | |
| 2005/0212503 A1 | 9/2005 | Deibele | |
| 2005/0271338 A1 * | 12/2005 | Livingston | G02B 6/3831 385/114 |
| 2006/0104578 A1 | 5/2006 | Herbst | |
| 2006/0133750 A1 | 6/2006 | Lee | |
| 2006/0140562 A1 | 6/2006 | Joseph et al. | |
| 2006/0193575 A1 | 8/2006 | Greenwood et al. | |
| 2006/0232385 A1 | 10/2006 | Scherer et al. | |
| 2006/0285350 A1 | 12/2006 | Wang | |
| 2007/0116402 A1 | 5/2007 | Slade et al. | |
| 2007/0153508 A1 | 7/2007 | Nall et al. | |
| 2007/0217749 A1 | 9/2007 | Jong et al. | |
| 2008/0080820 A1 | 4/2008 | Andrews et al. | |
| 2008/0087082 A1 | 4/2008 | Andrews et al. | |
| 2008/0121171 A1 | 5/2008 | Hulsey | |
| 2008/0198618 A1 | 8/2008 | North | |
| 2008/0204235 A1 | 8/2008 | Cook | |
| 2008/0219621 A1 | 9/2008 | Aldeghi et al. | |
| 2008/0273844 A1 | 11/2008 | Kewitsch | |
| 2009/0027873 A1 | 1/2009 | Tarlton | |
| 2009/0297104 A1 | 12/2009 | Kachmar | |
| 2009/0299440 A9 | 12/2009 | Slatkine | |
| 2010/0021114 A1 | 1/2010 | Chen et al. | |
| 2010/0066254 A1 | 3/2010 | Ott et al. | |
| 2010/0148747 A1 | 6/2010 | Rathbun, II et al. | |
| 2010/0166374 A1 | 7/2010 | Lapp | |
| 2010/0274235 A1 | 10/2010 | Mihajlovic et al. | |
| 2010/0329604 A1 | 12/2010 | Kojima et al. | |
| 2011/0034068 A1 | 2/2011 | Russell | |
| 2011/0085776 A1 | 4/2011 | Biribuze et al. | |
| 2011/0103747 A1 | 5/2011 | Chang et al. | |
| 2011/0103757 A1 | 5/2011 | Alkemper et al. | |
| 2011/0122646 A1 | 5/2011 | Bickham et al. | |
| 2011/0150488 A1 | 6/2011 | Kewitsch | |
| 2011/0305035 A1 | 12/2011 | Bickham et al. | |
| 2012/0019900 A1 | 1/2012 | Kitson et al. | |
| 2012/0219259 A1 | 8/2012 | Kewitsch | |
| 2012/0275178 A1 | 11/2012 | Logunov | |
| 2012/0275180 A1 | 11/2012 | Button et al. | |
| 2012/0275745 A1 | 11/2012 | Logunov | |
| 2012/0308183 A1 * | 12/2012 | Irwin | G02B 6/3879 385/56 |
| 2013/0021597 A1 | 1/2013 | Carlson, Jr. et al. | |
| 2013/0088888 A1 | 4/2013 | Fewkes et al. | |
| 2013/0107565 A1 | 5/2013 | Genier | |
| 2013/0201001 A1 | 8/2013 | Ratnakar | |
| 2013/0209037 A1 | 8/2013 | Cooke et al. | |
| 2013/0209045 A1 | 8/2013 | Dean, Jr. et al. | |
| 2013/0272014 A1 | 10/2013 | Logunov et al. | |
| 2013/0341922 A1 | 12/2013 | Jimenez Buendia | |
| 2014/0016904 A1 | 1/2014 | Kachmar | |
| 2014/0070639 A1 | 3/2014 | Tamura | |
| 2014/0221763 A1 | 8/2014 | Vayser et al. | |
| 2014/0227438 A1 | 8/2014 | Dean, Jr. et al. | |
| 2014/0270639 A1 | 9/2014 | James, III et al. | |
| 2014/0355295 A1 | 12/2014 | Kuchinsky et al. | |
| 2014/0363134 A1 | 12/2014 | Bookbinder et al. | |
| 2015/0043875 A1 | 2/2015 | Bookbinder et al. | |
| 2015/0049992 A1 | 2/2015 | Bauco | |
| 2015/0214746 A1 | 7/2015 | Lopez Gomez et al. | |
| 2015/0277059 A1 * | 10/2015 | Raven | G02B 6/3879 385/78 |
| 2015/0369986 A1 | 12/2015 | Logunov et al. | |
| 2016/0116660 A1 | 4/2016 | Benjamin et al. | |
| 2016/0139353 A1 | 5/2016 | Bauco et al. | |
| 2016/0202418 A1 | 7/2016 | Fortin et al. | |
| 2016/0231521 A1 | 8/2016 | Smith et al. | |
| 2016/0291277 A1 | 10/2016 | Bauco et al. | |
| 2016/0313483 A1 | 10/2016 | Chomycz | |
| 2016/0313513 A1 | 10/2016 | Wijbrans et al. | |
| 2016/0341922 A1 | 11/2016 | Bauco et al. | |
| 2016/0377818 A1 | 12/2016 | Tong et al. | |
| 2017/0123167 A1 | 5/2017 | Isenhour et al. | |
| 2017/0176691 A1 * | 6/2017 | Childers | G02B 6/3885 |
| 2017/0205587 A1 * | 7/2017 | Chang | G02B 6/3831 |
| 2017/0207585 A1 | 7/2017 | Butler et al. | |
| 2017/0293102 A1 | 10/2017 | Bauco et al. | |
| 2017/0315318 A1 | 11/2017 | Modavis | |
| 2018/0128996 A1 | 5/2018 | Sawicki et al. | |
| 2018/0136398 A1 | 5/2018 | Bauco et al. | |
| 2018/0136399 A1 | 5/2018 | Bauco et al. | |
| 2018/0172925 A1 | 6/2018 | Bauco et al. | |
| 2019/0064447 A1 * | 2/2019 | Chang | G02B 6/387 |

FOREIGN PATENT DOCUMENTS

| | | |
|---|---|---|
| DE | 10239602 B3 | 2/2004 |
| DE | 102007025494 A1 | 12/2008 |
| DE | 102009015263 A1 | 10/2010 |
| DE | 202015007044 U1 | 12/2015 |
| EP | 1168025 A2 | 1/2002 |
| EP | 2113969 A1 | 11/2009 |
| GB | 2260198 A | 4/1993 |
| GB | 2375898 A | 11/2002 |
| JP | 57011305 A | 6/1980 |
| JP | 59182404 A | 4/1983 |
| JP | 61139221 A | 6/1986 |
| JP | 61161827 U | 10/1986 |
| JP | 02055506 A | 2/1990 |
| JP | 2108007 A | 4/1990 |
| JP | 2108008 A | 4/1990 |
| JP | 6017157 U | 3/1994 |
| JP | 06130253 A | 5/1994 |
| JP | 9178956 A | 7/1997 |
| JP | 9237524 A | 9/1997 |
| JP | 2008153030 A | 7/2008 |
| JP | 2009244288 A | 10/2009 |
| JP | 2010237233 A | 10/2010 |

(56) References Cited

FOREIGN PATENT DOCUMENTS

| | | |
|---|---|---|
| JP | 2013196960 A | 9/2013 |
| KR | 875507 B1 | 12/2008 |
| WO | 1998034144 A1 | 8/1998 |
| WO | 1999024856 A1 | 5/1999 |
| WO | 2005106899 A1 | 11/2005 |
| WO | 2006044177 A2 | 4/2006 |
| WO | 2006113114 A2 | 10/2006 |
| WO | 2007053371 A1 | 5/2007 |
| WO | 2008048955 A2 | 4/2008 |
| WO | 2010011299 A2 | 1/2010 |
| WO | 2010021896 A1 | 2/2010 |
| WO | 2011063214 A | 5/2011 |
| WO | 2013055842 A1 | 4/2013 |
| WO | 2013059811 A1 | 4/2013 |
| WO | 2014026300 A1 | 2/2014 |
| WO | 2015000194 A1 | 1/2015 |
| WO | 2016170172 A1 | 10/2016 |

OTHER PUBLICATIONS

Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.

Fiber Optic Products, Inc., "Specifications of our Fiber and Cable," n. d. Retrieved on Aug. 9, 2013, 2 pages.

M. Rajesh, "Polymer Photonics: An Overview," Fabrication and Characterisation, 2011, 38 pages.

Schott, "SpectraStream Glass Harnesses," Rev. Nov. 2006, 2 pages.

Spigulis, J., "Side-Emitting Fibers Brighten Our World in New Ways," Oct. 2005, Retrieved from www.osa-opn.org, 6 pages.

"Super Vision Fiber Optics Side Glow Cables, " TriN01ihLighting.com, Tri North Lighting, Inc., n.d., Web. Aug. 1, 2013.

"Diode Lasers, Fiber Optics, IR, Red, Green, Blue Diode Lasers, Laser Diode, Fiber Illuminators, Fiber Optics, Coupler, Galvonarneters, Laser Show Acessories," Jan. 1, 2013, httn://www.meshtel.com/, 1 oage.

Lu et al. Optical fiber with nanostructured cladding ofTi02 nanoparticles self-assembled onto a side polished fiber and its temperature sensing, Optics Express, vol. 22, No. 26, Dec. 29, 2014, 7 pages, downloaded from internet on Jan. 5, 2015.

"Side Emitting Super Glowing Fiber." MeshTel.com. MeshTel-Intelite, Inc., 1996-2012. Web. Aug. 1, 2013.

Endruweit et al. "Spectroscopic experiements regarding the efficiency of side emission optical fibres in the UV-A and visible blue spectrum", Optics and Lasers Engineering 46 (2008) pp. 97-105.

Hecht, "Understanding Fiber Optics" , 4th Edition, 2002, pp. 106-107.

\* cited by examiner

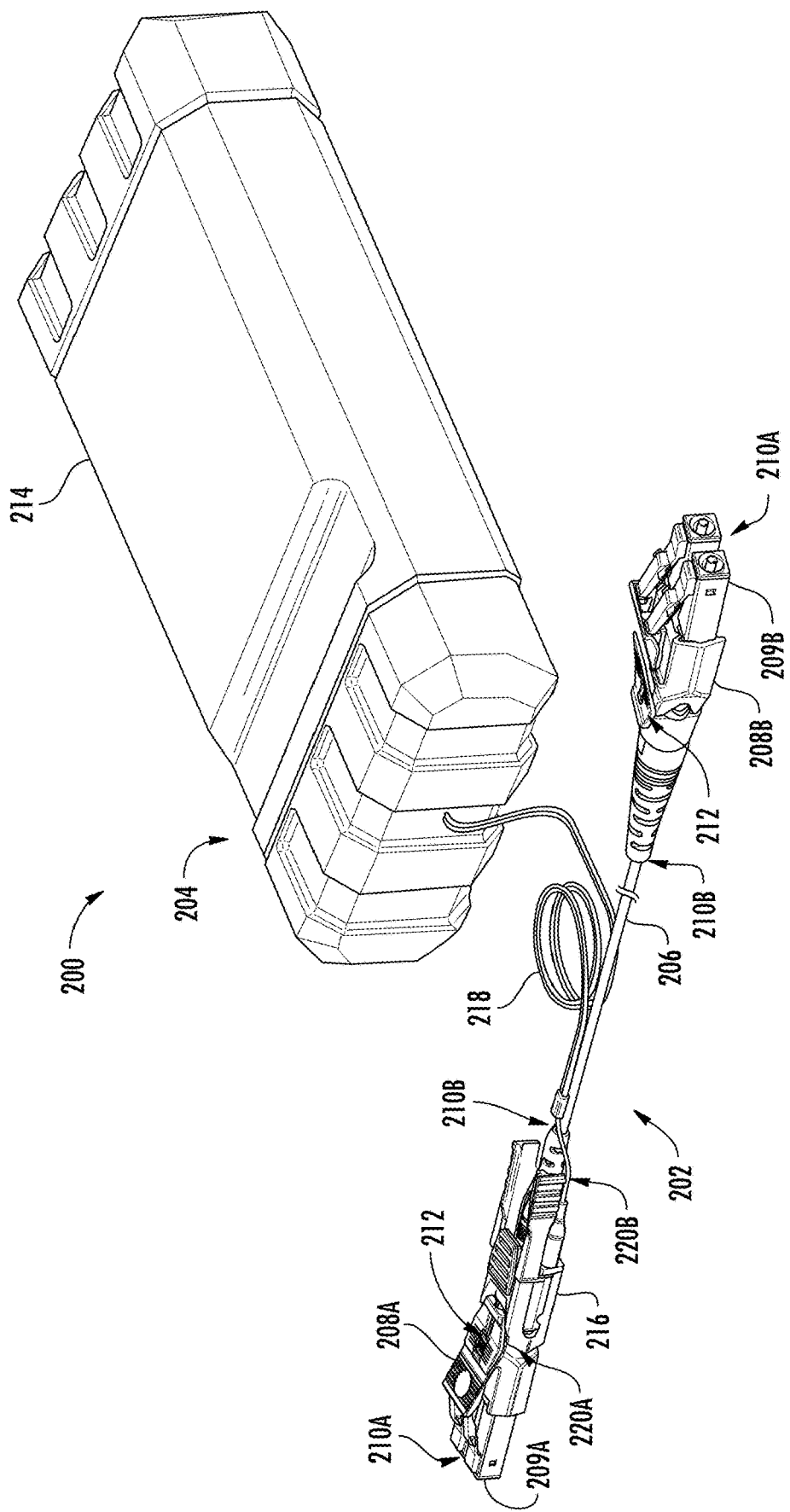

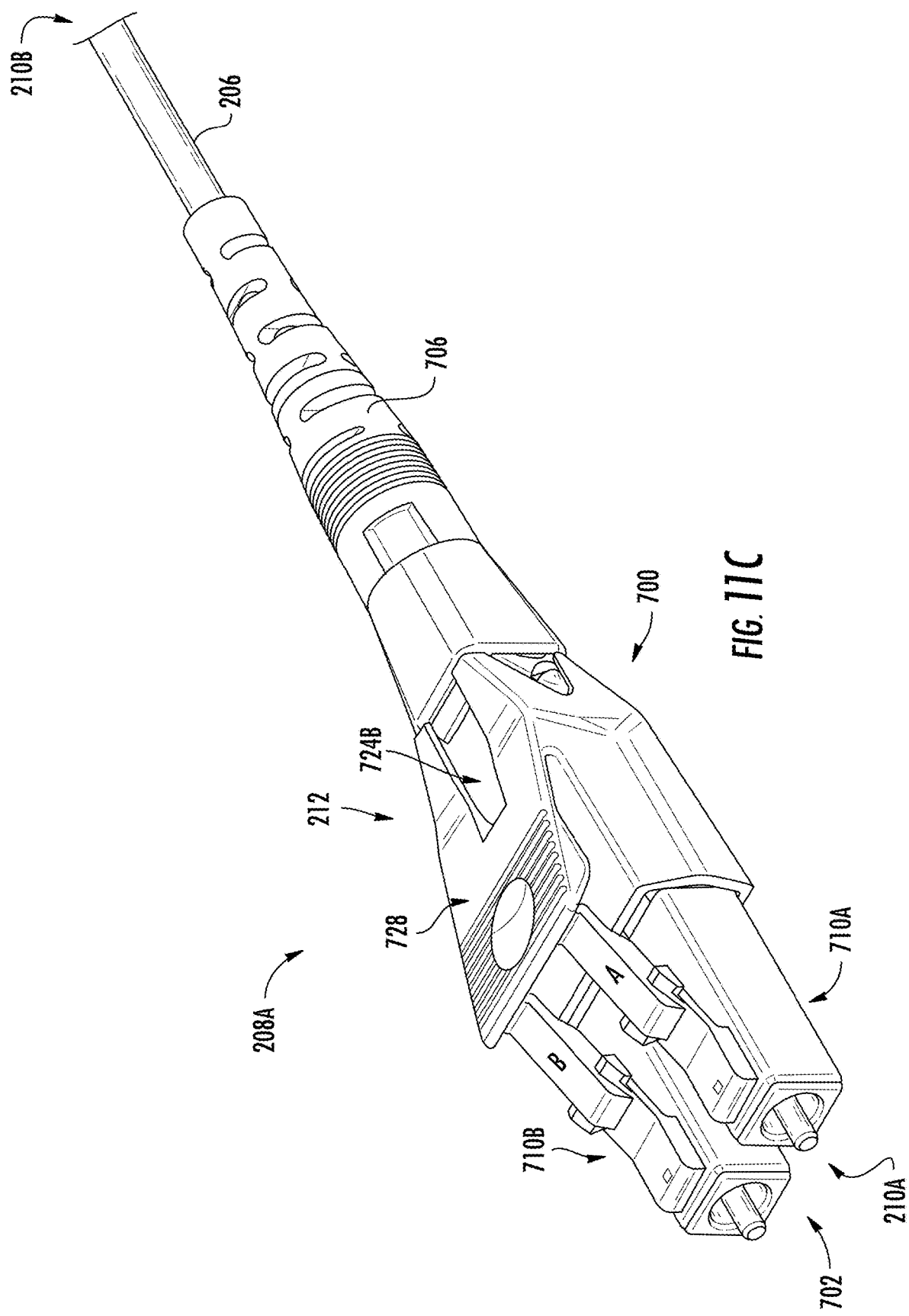

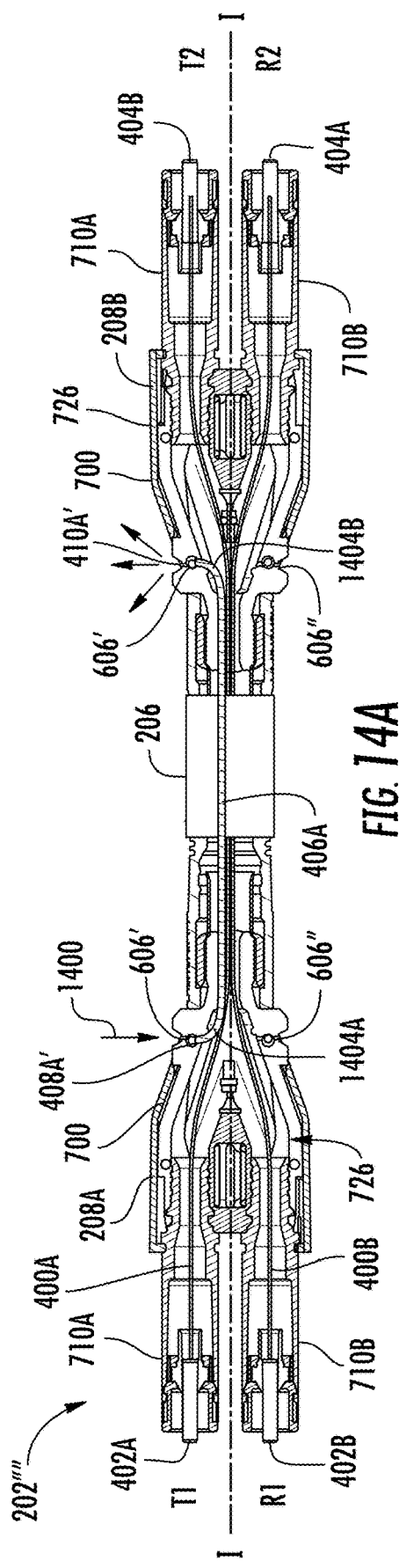
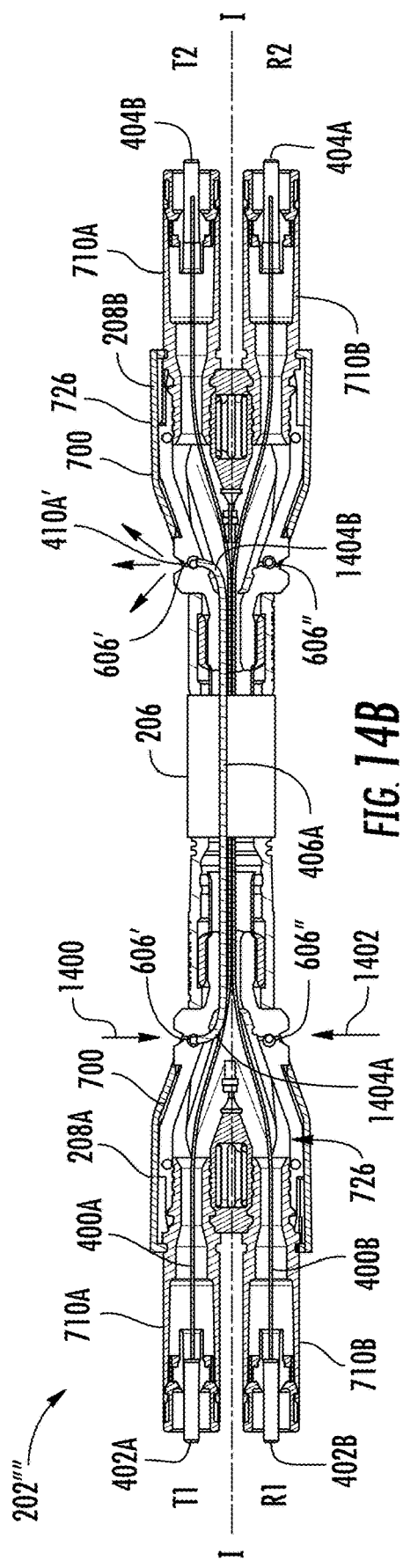
FIG. 14A
FIG. 14B

TRACEABLE FIBER OPTIC CABLE ASSEMBLY WITH INDICATION OF POLARITY

CROSS REFERENCE TO RELATED APPLICATION

This application claims the benefit of priority of U.S. Provisional Application Ser. No. 62/594,834, filed Dec. 5, 2017, and U.S. patent application Ser. No. 16/144,094, filed Sep. 27, 2018, the content of each of which is relied upon and incorporated herein by reference in its entirety.

BACKGROUND

The disclosure relates to traceable fiber optic cable assembly, and more particularly to a traceable fiber optic cable assembly with indication of polarity and method of determining polarity.

Computer networks continue to increase in size and complexity. Businesses and individuals rely on these networks to store, transmit, and receive critical data at high speeds. Even with the expansion of wireless technology, wired connections remain critical to the operation of computer networks, including enterprise data centers. Portions of these wired computer networks are regularly subject to removal, replacement, upgrade, or other moves and changes. To ensure the continued proper operation of each network, the cables connecting the individual components must be precisely understood and properly connected between specific ports.

In many cases, a network's cables, often called patch cords, can be required to bridge several meters across a data center, among other uses (e.g., within high performance computers). These cables may be used between racks of servers, storage, switches, and patch panels. The cables may begin in one equipment rack, run through the floor or other conduit, and terminate at a component in a second equipment rack. Data center operators may need to reconfigure cable endpoints to adapt to changes in use patterns or to turnover in equipment, which requires knowing the attachment location of both ends of the cable. To change the configuration of a cable, an operator needs to know where both ends of the cable are attached. However, in practice, it is not unusual for the operators to only know where one end of the cable is connected. Determining the location of the other end of the cable can be time consuming and fraught with risk. For example, disconnecting the wrong cable can interrupt important or critical network traffic.

In this regard, FIGS. 1A and 1B are views of network cables (e.g., patch cords 100) used in fiber optic equipment. More specifically, FIG. 1A is a perspective view of an equipment rack 102 supporting patch cords 100, and FIG. 1B is a perspective view of an under-floor cable tray 104 supporting patch cords 100. FIGS. 1A and 1B illustrate a problem that occurs in data centers or similar network locations, which is congestion and clutter caused by large quantities of patch cords 100. Network operators frequently need to change connections to accommodate moves, additions, and changes in the network. However, operators may find it difficult to trace a particular patch cord 100 from the source to the receiver when the network location is congested, as illustrated in FIGS. 1A and 1B.

However, even when cable ends are identified, some duplex connectors may include one or more orientations, which may affect the polarity state of the cable. Determining the polarity state of a cable may be involved and time consuming. As a result, there is a need for a traceable cable that allows a network operator to quickly identify the terminal ends of a given cable (e.g., such as those that are being replaced, relocated, or tested) with the lowest possible risk of error and which also indicates the polarity state of the cable.

No admission is made that any reference cited herein constitutes prior art. Applicant expressly reserves the right to challenge the accuracy and pertinency of any cited documents.

SUMMARY

Disclosed herein is a traceable fiber optic cable assembly with indication of polarity. In particular, the traceable fiber optic cable assembly includes a traceable fiber optic cable, a first duplex connector at a first end of the fiber optic cable, and a second duplex connector at a second end of the fiber optic cable. Each duplex connector includes a transmit simplex connector and a receive simplex connector. A first tracing end of the tracing optical fiber is in a preconfigured orientation in the first duplex connector offset from a central axis of the first duplex connector (e.g., a first tracing end of the tracing optical fiber is proximate the first transmit simplex connector within the first duplex connector), and a second tracing end of the tracing optical fiber is in a preconfigured orientation in the second duplex connector offset from a central axis of the second duplex connector (e.g., proximate the second transmit simplex connector within the second duplex connector). The tracing optical fiber receives an optical tracing signal for propagation of the first optical tracing signal to the second tracing end of the first tracing optical fiber to indicate a first orientation of the first duplex connector corresponding to a first polarity state of the traceable fiber optic cable assembly. In other words, an operator injects light into one of the first duplex connectors (e.g., proximate the first transmit simplex connector), and if light emits from the second duplex connector, then the operator knows the orientation of the first duplex connector corresponding to a first polarity state of the traceable fiber optic cable assembly. This provides an easy and effective way to trace a cable assembly while also informing a user as to the polarity state of the cable assembly.

One embodiment of the disclosure relates to a traceable fiber optic cable assembly. The traceable fiber optic cable assembly includes a traceable fiber optic cable, a first duplex connector, and a second duplex connector. The first traceable fiber optic cable includes a first data transmission element, a second data transmission element, and a first tracing optical fiber. The first data transmission element includes a first data end and a second data end for communication of first optical data signals. The second data transmission element includes a first data end and a second data end for communication of second optical data signals. The first tracing optical fiber includes a first tracing end and a second tracing end. The first duplex connector is at a first end of the traceable fiber optic cable. The first duplex connector includes a first housing defining a first interior, a first transmit simplex connector at least partially within the first interior of the first housing, and a first receive simplex connector at least partially within the first interior of the first housing. The first housing defines a first tracing opening and a first unfilled opening, the first tracing opening in a preconfigured orientation relative to the first transmit simplex connector and offset from a central axis of the first duplex connector. The second duplex connector is at a second end of the traceable fiber optic cable. The second duplex connector includes a second housing defining a second interior, a second transmit simplex connector at least partially within the second interior of the second housing, and a second receive simplex connector at least partially within the second interior of the second housing. The first tracing end of the first tracing optical fiber is within the first tracing opening of the first housing of the first duplex connector and the second tracing end of the first tracing optical fiber is within the second housing of the second duplex connector. The first tracing end is accessible from an exterior of the first housing for receiving a first optical tracing signal for propagation of the first optical tracing signal to the second tracing end of the first tracing optical fiber to indicate a first orientation of the first duplex connector corresponding to a first polarity state of the traceable fiber optic cable assembly. The first unfilled opening is devoid of a tracing optical fiber.

An additional embodiment of the disclosure relates to a method for determining polarity of a traceable fiber optic cable assembly. The method includes transmitting a first optical tracing signal into a first duplex connector at a first end of a traceable fiber optic cable of a traceable fiber optic cable assembly. The first optical tracing signal is transmitted through at least one of (i) a first tracing end of a first tracing optical fiber in a first tracing opening of a first housing of the first duplex connector for propagation through the first tracing optical fiber to a second tracing end in a second duplex connector at a second end of the traceable fiber optic cable, the first tracing opening in a preconfigured orientation relative to a first transmit simplex connector of the first duplex connector and offset from a central axis of the first duplex connector; and (ii) a first unfilled opening of the first housing of the first duplex connector. The method further includes determining an orientation of the first duplex connector corresponding to a first polarity state of the traceable fiber optic cable assembly by visually observing whether the first optical tracing signal emits from a second housing of the second duplex connector. The tracing opening is positioned proximate the second transmit simplex connector.

An additional embodiment of the disclosure relates to a traceable fiber optic cable assembly. The traceable fiber optic cable assembly includes a traceable fiber optic cable, a first transmit connector at a first end of the traceable fiber optic cable, a first receive connector at the first end of the traceable fiber optic cable, a second transmit connector at a second end of the traceable fiber optic cable, and a second receive connector at the second end of the traceable fiber optic cable. The traceable fiber optic cable includes a first data transmission element, a second data transmission element, and a first tracing optical fiber. The first data transmission element includes a first data end and a second data end for communication of first optical data signals. The second data transmission element includes a first data end and a second data end for communication of second optical data signals. The first tracing optical fiber includes a first tracing end and a second tracing end. The first tracing end of the first tracing optical fiber is proximate the first transmit connector at the first end of the traceable fiber optic cable and the second tracing end of the first tracing optical fiber is proximate the second receive connector at the second end of the traceable fiber optic cable. The first tracing optical fiber is configured to receive a first optical tracing signal at the first tracing end for propagation of the first optical tracing signal through the first tracing optical fiber to the second tracing end of the first tracing optical fiber to indicate a first orientation of the first transmit connector and the first receive connector corresponding to a first polarity state of the traceable fiber optic cable assembly.

Additional features and advantages will be set forth in the detailed description which follows, and in part will be readily apparent to those skilled in the art from that description or recognized by practicing the embodiments as described herein, including the detailed description which follows, the claims, as well as the accompanying drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 2A is a perspective view of an exemplary cable tracing system, such as for use with the patch cords of FIGS. 1A-1B;

FIG. 11C is a perspective view of the first fiber optic connector of FIG. 11A after the polarity reversal is completed;

FIG. 14A is a schematic top view of a traceable fiber optic cable assembly with indication of polarity using a single side launch;

FIG. 14B is a schematic top view of another embodiment of the traceable fiber optic cable assembly with indication of polarity of FIG. 14A with a double side launch.

DETAILED DESCRIPTION

Figure 1A:
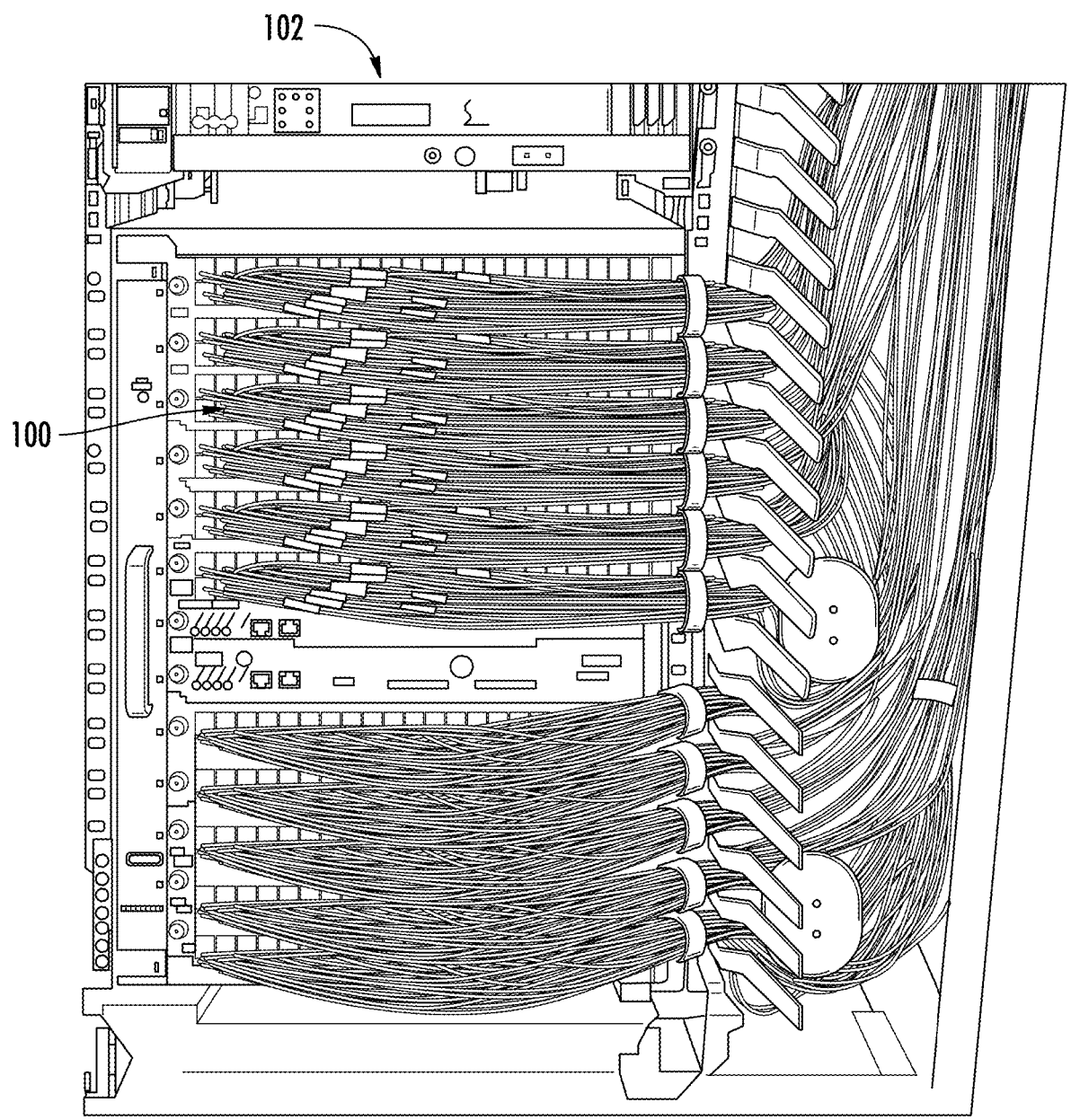
FIG. 1A is a perspective view of an equipment rack supporting patch cords.

Reference will now be made in detail to the present preferred embodiments, examples of which are illustrated in the accompanying drawings. Whenever possible, the same reference numerals will be used throughout the drawings to refer to the same or like parts.

Terms such as "left," "right," "top," "bottom," "front," "back," "horizontal," "parallel," "perpendicular," "vertical," "lateral," "coplanar," and similar terms are used for convenience of describing the attached figures and are not intended to limit this description. For example, terms such as "left side" and "right side" are used with specific reference to the drawings as illustrated and the embodiments may be in other orientations in use. Further, as used herein, terms such as "horizontal," "parallel," "perpendicular," "vertical," "lateral," etc., include slight variations that may be present in working examples.

As used herein, the terms "optical communication," "in optical communication," and the like mean, with respect to a group of elements, that the elements are arranged such that optical signals are passively or actively transmittable therebetween via a medium, such as, but not limited to, one or more optical fibers, connectors, ports, free space, index-matching material (e.g., structure or gel), reflective surface, connectors, or other light directing or transmitting means, or a combination of the foregoing.

As used herein, it is intended that term "optical fiber" includes all types of single mode and multi-mode light waveguides, including optical fibers that may be coated, uncoated, colored, buffered, ribbonized and/or have other organizing or protective structures, such as, a cable jacket, one or more tubes, strength members or the like.

As used herein, the term "signal" refers to light intended to be transmitted or received from one device to another whether it is modulated with data or an unmodulated continuous wave of light.

As used herein, the term "data fiber" refers to a fiber with light propagating within its core where the light is modulated (e.g., with information).

Disclosed herein is a traceable fiber optic cable assembly with indication of polarity. In particular, the traceable fiber optic cable assembly includes a traceable fiber optic cable, a first duplex connector at a first end of the fiber optic cable, and a second duplex connector at a second end of the fiber optic cable. Each duplex connector includes a transmit simplex connector and a receive simplex connector. A first tracing end of the tracing optical fiber is in a preconfigured orientation in the first duplex connector offset from a central axis of the first duplex connector (e.g., a first tracing end of the tracing optical fiber is proximate the first transmit simplex connector within the first duplex connector), and a second tracing end of the tracing optical fiber is in a preconfigured orientation in the second duplex connector offset from a central axis of the second duplex connector (e.g., proximate the second transmit simplex connector within the second duplex connector). The tracing optical fiber receives an optical tracing signal for propagation of the first optical tracing signal to the second tracing end of the first tracing optical fiber to indicate a first orientation of the first duplex connector corresponding to a first polarity state of the traceable fiber optic cable assembly. In other words, an operator injects light into one side of the first duplex connector (e.g., proximate the first transmit simplex connector), and if light emits from the second duplex connector, then the operator knows the orientation of the first duplex connector corresponding to a first polarity state of the traceable fiber optic cable assembly. This provides an easy and effective way to trace a cable assembly while also informing a user as to the polarity state of the cable assembly.

The content of U.S. patent application Ser. No. 15/411, 157, entitled "Traceable Fiber Optic Cable Assembly with Fiber Guide and Tracing Optical Fibers for Carrying Light Received from a Light Launch Device;" U.S. patent application Ser. No. 15/411,198, entitled "Traceable Fiber Optic Cable Assembly with Illumination Structure and Tracing Optical Fibers for Carrying Light Received from a Light Launch Device," and U.S. patent application Ser. No. 15/411,235, entitled "Light Launch Device for Transmitting Light into a Traceable Fiber Optic Cable Assembly with Tracing Optical Fibers," are incorporated herein by reference in their entirety.

Figure 1B:
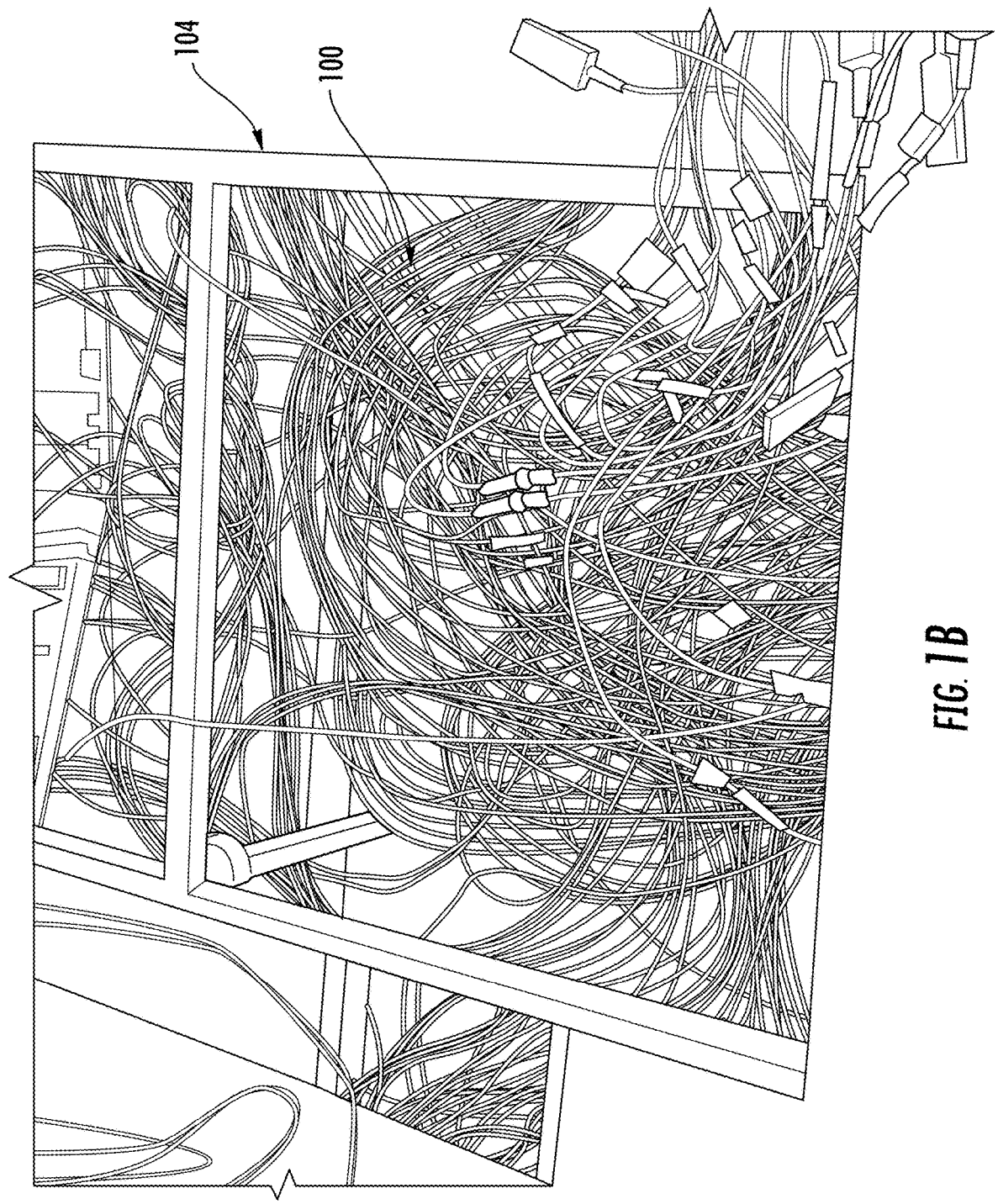
FIG. 1B is a perspective view of an under-floor cable tray supporting patch cords.
Figure 2B:
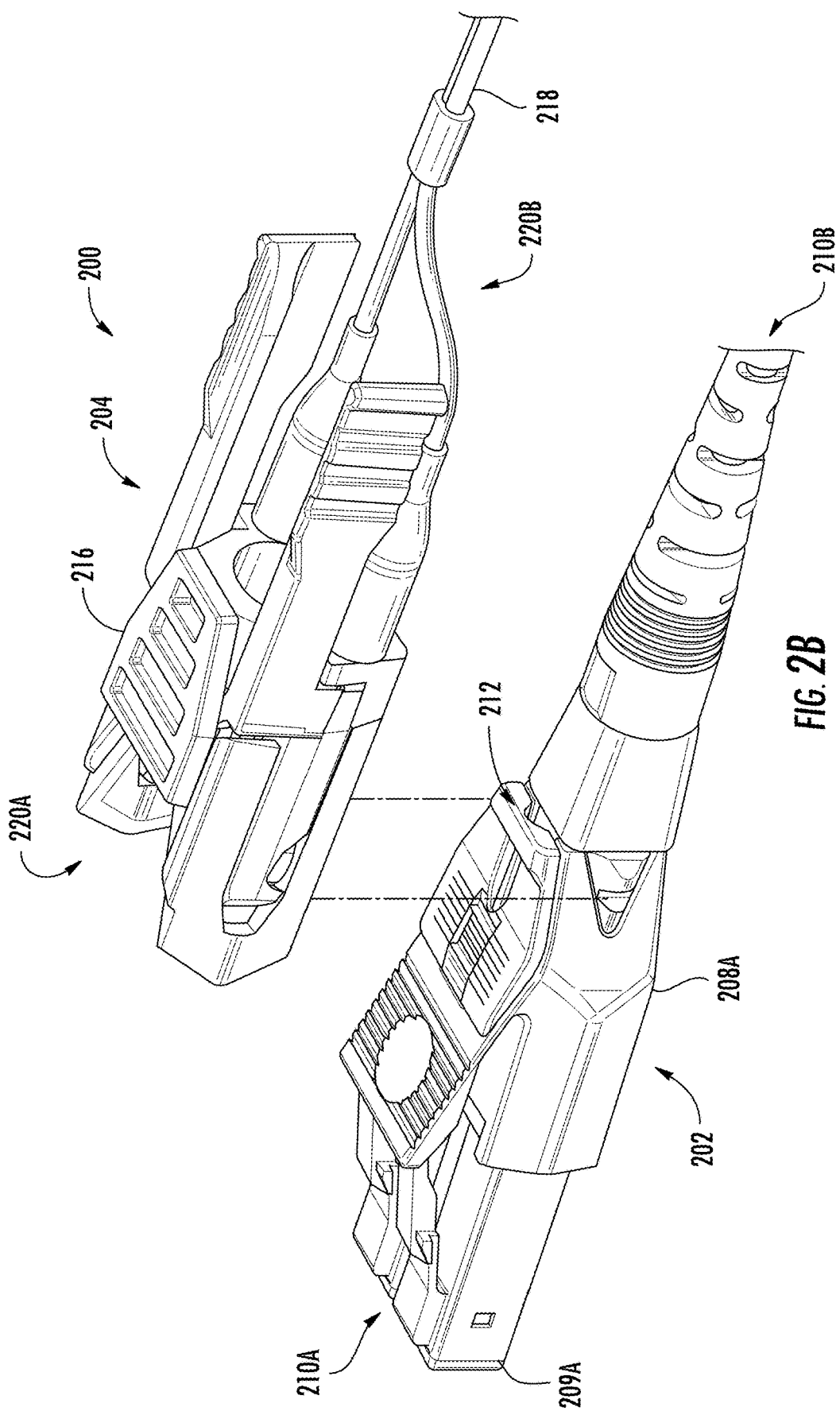
FIG. 2B is a perspective view of the cable tracing system of FIG. 2A illustrating a launch connector disengaged from a first fiber optic connector.
Figure 2C:
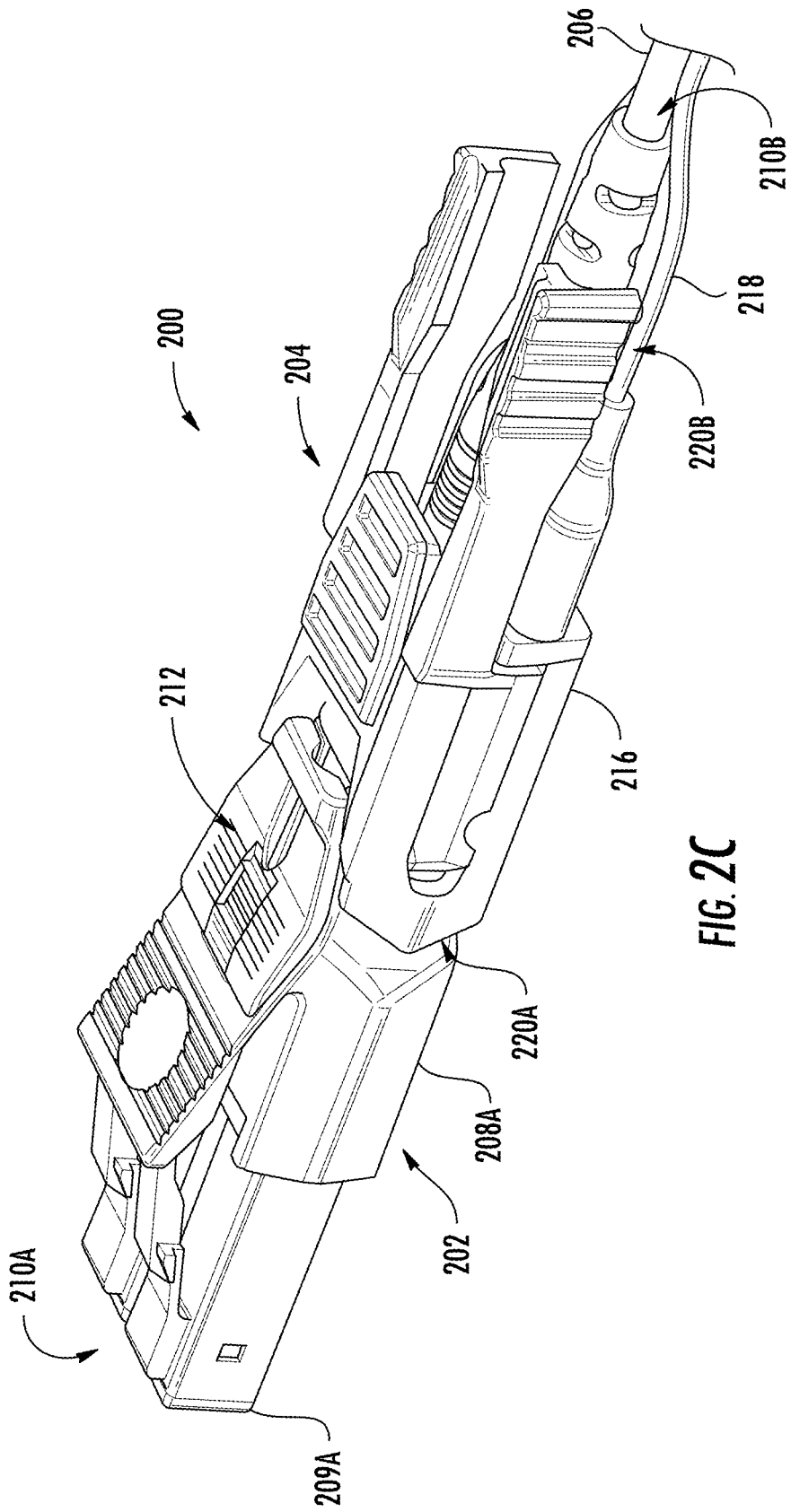
FIG. 2C is a perspective view of the cable tracing system of FIG. 2A illustrating a launch connector engaged with the first fiber optic connector.

FIGS. 2A-2C are views of an exemplary cable tracing system 200 that can be used to trace a fiber optic cable assembly 202. The cable tracing system 200 facilitates the identification (or "tracing") of ends of a traceable fiber optic cable 206 (e.g., fiber optic cable) using fiber optic tracing signals. FIG. 2A is a perspective view of the exemplary cable tracing system 200, such as for use with the patch cords 100 of FIGS. 1A-1B. The cable tracing system 200 comprises a traceable fiber optic cable assembly 202 (may also be referred to as an optical communication cable assembly) and a light launch device 204. The cable tracing system 200 allows a user to selectively attach the light launch device 204 to a part of the traceable fiber optic cable assembly 202 and use the light launch device 204 to inject one or more optical tracing signals (e.g., fiber optic tracing signal, a first optical tracing signal, second optical tracing signal, etc.) into the traceable fiber optic cable assembly 202. This allows the user to trace the location of part or all of the traceable fiber optic cable assembly 202 based on the propagation of the optical tracing signals into the traceable fiber optic cable assembly 202.

In certain embodiments, the traceable fiber optic cable assembly 202 includes one or more illumination components (e.g., illumination structures) to efficiently and effectively translate and disperse light for easily locating one or more portions of the traceable fiber optic cable assembly 202. In this manner, the traceable fiber optic cable assembly 202 and light launch device 204 provide easy tracing of the traceable fiber optic cable assembly 202 using fiber optic tracing signals. The cable tracing system 200 is configured to efficiently illuminate a portion of the traceable fiber optic cable assembly 202 for effective visibility for a user to quickly locate one or more portions of the traceable fiber optic cable assembly 202.

With reference to FIGS. 2A-2C, the traceable fiber optic cable assembly 202 includes a fiber optic cable 206, a first fiber optic connector 208A (e.g., traceable fiber optic cable first connector, traceable fiber optic cable assembly first connector, etc.) at a first end of the fiber optic cable 206, and a second fiber optic connector 208B (e.g., traceable fiber optic cable second connector, traceable fiber optic cable assembly second connector, etc.) at a second end of the fiber optic cable 206. The first fiber optic connector 208A and the second fiber optic connector 208B are present on opposite ends (e.g., first end 209A, and second end 209B) of the fiber optic cable 206 to allow the traceable fiber optic cable assembly 202 to act as a patch cord between components of a network. In use, the fiber optic cable 206 may extend between two locations, such as two equipment racks in a data center, telecommunications room, or the like. Further, in some embodiments, the fiber optic cable 206 may have a length between about zero meters and about 30 meters, and in some embodiments, the fiber optic cable 206 may have a length between about 1 meter and about 5 meters. In other embodiments, the fiber optic cable 206 may have a length of more than 30 meters.

The first and second fiber optic connectors 208A, 208B are merely an example. Thus, although FIGS. 2A-2C (among other figures herein) illustrate the first and second fiber optic connectors 208A, 208B as an LC duplex connector, the features described below may be applicable to different connector configurations and different connector sub-assembly designs. This includes simplex configurations of LC connector sub-assemblies, and both simplex and duplex configurations of different (i.e., non-LC) connector sub-assembly designs.

The first fiber optic connector 208A and the second fiber optic connector 208B each include a distal end 210A and a proximal end 210B. The proximal end 210B of the first fiber optic connector 208A and the proximal end 210B of the second fiber optic connector 208B are towards a center of the fiber optic cable 206. The first and second fiber optic connectors 208A, 208B may each comprise an illumination component 212 (e.g., illumination component that may include one or more total internal reflection (TIR) structures. The illumination component 212 directs (e.g., propagates) the light emitted from the fiber so that the fiber optic connector 208A, 208B is more easily visible to workers. For example, in some embodiments, the first illumination component 212 of the second fiber optic connector 208B illuminates after receiving a first fiber optic tracing signal from the first fiber optic connector 208A to communicate the location of the second fiber optic connector 208B, and/or the second illumination component 212 of the first fiber optic connector 208A illuminates after receiving a second fiber optic tracing signal from the second fiber optic connector 208B to communicate the location of the first fiber optic connector 208A. In particular, in some embodiments, the first and second fiber optic tracing signals are transmitted consecutively and/or not simultaneously (e.g., not concurrently). In this way, one or more tracing optical fibers within the fiber optic cable 206 provide for traceability of the fiber optic cable 206 from one or both of the ends 209A, 209B of the fiber optic cable 206. As explained below, the cable tracing system 200 (e.g., traceable fiber optic cable assembly 202) provides the ability to trace a fiber optic cable 206 without disconnecting the fiber optic cable 206 from corresponding receptacles.

In one embodiment, the traceable fiber optic cable assembly 202 comprises an end point only (EPO) configuration. In an EPO configuration, a far end of the traceable fiber optic cable assembly 202 (e.g., second fiber optic connector 208B) illuminates (e.g., lights up) when a near end of the traceable fiber optic cable assembly 202 (e.g., a first fiber optic connector 208A) is activated (e.g., receives an optical tracing signal). However, in another embodiment, the traceable fiber optic cable assembly 202 comprises an along the length (ATL) configuration. In an ATL configuration, at least a portion of the fiber optic cable 206 is illuminated (in some embodiments, the first fiber optic connector 208A and/or the second fiber optic connector 208B may also be illuminated). The description below is with respect to an EPO configuration; however, the teachings are also applicable to an ATL configuration.

The light launch device 204 may include a launch module 214, a launch connector 216, and a launch cable 218 therebetween. The launch module 214 generates the fiber optic tracing signal for direction through the traceable fiber optic cable assembly 202. The launch connector 216 is selectively attachable to and removable from the first fiber optic connector 208A and/or second fiber optic connector 208B. The launch cable 218 directs (e.g., propagates) the fiber optic tracing signal from the launch module 214 to the first fiber optic connector 208A or the second fiber optic connector 208B. More specifically, in some embodiment one or more launch optical fibers within the launch cable 218 provide for injection of the fiber optic tracing signal into the fiber optic cable 206 for traceablility of the fiber optic cable 206 from one or both of the ends 209A, 209B of the fiber optic cable 206. The launch connector 216 may include a distal end 220A and a proximal end 220B.

FIG. 2B is a perspective view of the cable tracing system 200 of FIG. 2A illustrating the launch connector 216 of the light launch device 204 in a disengaged position (e.g., disconnected position, detached position, etc.) from the first fiber optic connector 208A. FIG. 2C is a perspective view of the cable tracing system 200 of FIG. 2A illustrating the launch connector 216 of the light launch device 204 in an engaged position (e.g., connected position, attached position, etc.) with the first fiber optic connector 208A.

Referring specifically to FIG. 2B, the launch connector 216 is configured to selectively engage (e.g., connect, attach, etc.) to the first fiber optic connector 208A (or the second fiber optic connector 208B) to direct the optical tracing signal emitted from the light launch device 204 through the launch connector 216 and to the fiber optic cable 206 at the first fiber optic connector 208A when tracing is desired. The launch connector 216 can be removed from the first fiber optic connector 208A after tracing is completed. The light launch device 204 transmits an optical tracing signal from the light launch device 204 into the first fiber optic connector 208A to illuminate the second fiber optic connector 208B to trace ends of the fiber optic cable assembly 202. The launch connector 216 can be attached or removed even when the first fiber optic connector 208A and/or second fiber optic connector 208B is engaged with another fiber optic component (e.g., patch panel, first fiber optic component, second fiber optic component, etc.), or any other network component. For example, the launch connector 216 may vertically or axially (e.g., from a proximal end 210B of the first or second fiber optic connector 208A, 208B) engage the first or second fiber optic connector 208A, 208B.

The launch connector 216 and the first fiber optic connector 208A (or second fiber optic connector 208B) mechanically interact with one another to align their respective optical fibers (discussed in more detail below) to direct an optical tracing signal therebetween. Once engaged, the user operates the light launch device 204 to inject an optical tracing signal into the first fiber optic connector 208A (or second fiber optic connector 208B) to illuminate the second fiber optic connector 208B (or first fiber optic connector 208A) through the fiber optic cable 206.

In this way, a user can quickly and easily locate the ends 209A, 209B of the traceable fiber optic cable assembly 202 (e.g., the first fiber optic connector 208A and the second fiber optic connector 208B), which streamlines and simplifies the process of tracing or otherwise identifying a fiber optic cable 206 in a congested environment. As a result, the technician can reliably identify the fiber optic cable 206 in question (which may be a telecommunication patch cord) from amongst many other cables (which may also be telecommunication patch cords).

Figure 3A:
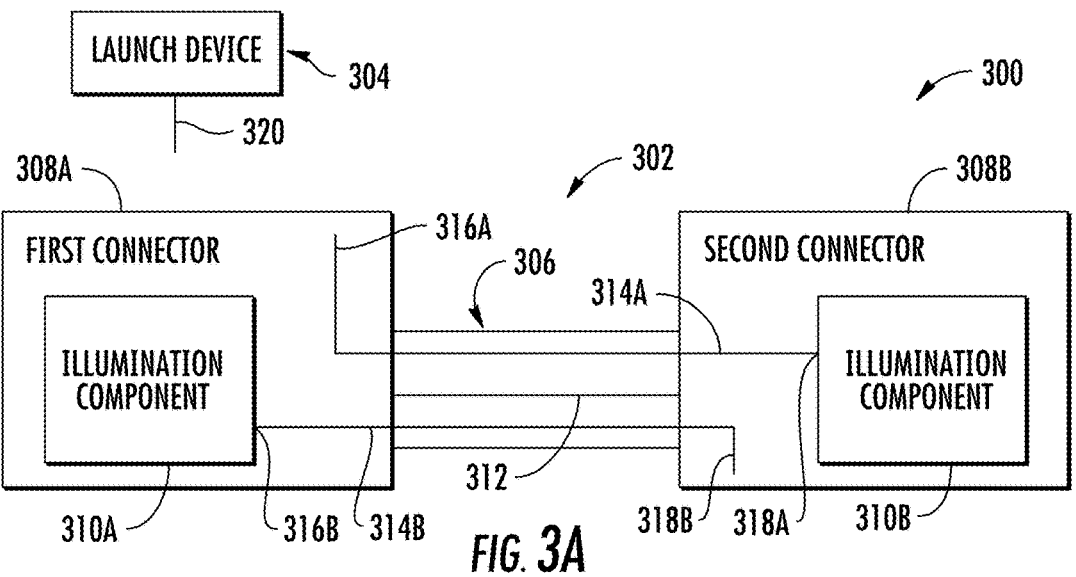
FIG. 3A is a schematic diagram of another embodiment of the exemplary cable tracing system in FIGS. 2A-2C.
Figure 3B:
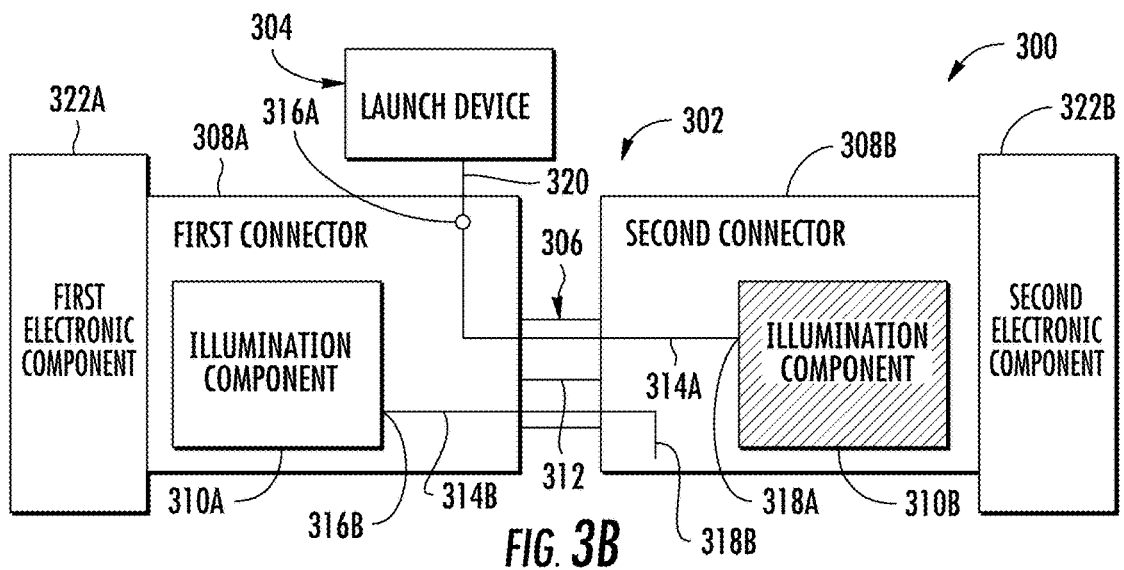
FIG. 3B is a schematic diagram illustrating the cable tracing system of FIG. 3A.
Figure 3C:
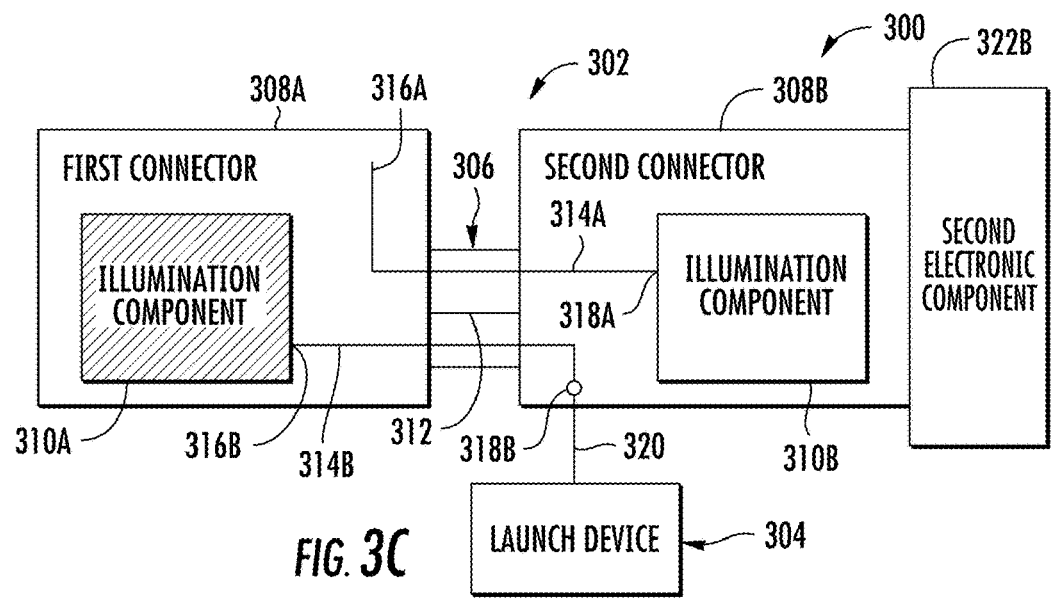
FIG. 3C is another schematic diagram illustrating the cable tracing system of FIG. 3A.

FIGS. 3A-3C are schematic diagrams of another embodiment of the exemplary cable tracing system showing how the cable tracing system 300 selectively sends signals to illuminate ends of a cable, thereby allowing a user to trace the ends of a cable. More specifically, in FIG. 3A the cable tracing system 300 comprises a traceable cable assembly 302 and a light launch device 304 (as similarly described above with FIGS. 2A-2C). As shown, the traceable cable assembly 302 comprises a first connector 308A and a second connector 308B, and a fiber optic cable 306 therebetween. In some embodiments, the fiber optic cable 306 may be more appropriately referred to as a conduit, without having any data transmission elements. It should be noted that other environments could use this tracing concept, such as other fiber optic deployment applications, electrical interconnects, and potentially liquid or gas conduits, etc. For example, the fiber optic cable 306 may direct fluids such as air or liquid and may be appropriate for use in a medical setting such as IV lines or oxygen tubing.

Any suitable type of connector could be used with the cable tracing system 300. The first connector 308A and the second connector 308B may vary widely depending on the nature of the cable and the components being connected. The specific type of connectors should match the port configuration of the network component and will vary based upon the quantity and type of signals being directed by the cable. The first connector 308A includes a first illumination component 310A, and the second connector 308B includes a second illumination component 310B (as similarly described above with FIGS. 2A-2C and described in more detail below). The fiber optic cable 306 may have a different design or configuration depending on the types of connectors used.

The traceable cable assembly 302 further comprises a data transmission element 312 (e.g., optical data fiber), a first tracing element 314A (e.g., first tracing optical fiber) and second tracing element 314B (e.g., second tracing optical fiber) extending between the first connector 308A and the second connector 308B. The data transmission element 312 extends between the first connector 308A and the second connector 308B to carry transmission of one or more data signals (e.g., optical data signals) therebetween. Generally, the data transmission element 312 is a structure capable of carrying a data signal from one end of the fiber optic cable 306 (or any other type of cable) to the other. The data transmission element 312 may be configured to direct an electrical signal, for example, using a copper wire or other electrically conductive material. Alternatively, or additionally, the data transmission element 312 may be configured to direct an optical signal by conducting electromagnetic waves such as ultraviolet, infrared, or visible light to carry data from one location to another. The data transmission element 312 could comprise one or more data transmission elements, which may be of the same type or different types as compared to one another.

The first tracing element 314A and the second tracing element 314B are used to allow for accurate identification of ends of the traceable cable assembly 302. In particular, the first tracing element 314A includes a first tracing end 316A that is positioned within the first connector 308A and a second tracing end 318A that is positioned within the second connector 308B and is in communication with the second illumination component 310B. The second tracing element 314B includes a first tracing end 316B positioned within the first connector 308A and a second tracing end 318B positioned within the second connector 308B and in communication with the first illumination component 310A. It is noted that although two tracing elements are shown, in certain embodiments, only one tracing element is needed. In some embodiments, the operator can visually identify the first tracing element 314A and/or the second tracing element 314B with or without special equipment, such as an IR camera. In some embodiments, discussed below, the first tracing element 314A and the second tracing element 314B are in the form of tracing optical fibers configured to direct and emit tracer light for visualization purposes.

The light launch device 304 comprises a launch fiber 320 to insert a tracing signal into one or both of the first tracing element 314A and the second tracing element 314B. The first and second tracing ends 316A, 316B, 318A, 318B may be flat cleaved, flat polished or otherwise prepared to efficiently receive the light from the light launch device 304 and may be positioned flush with the connector wall, slightly inside the first and second connectors 308A, 308B or slightly outside the first and second connectors 308A, 308B.

FIG. 3B is an exemplary schematic diagram illustrating the cable tracing system 300 of FIG. 2A in use. As shown, the first connector 308A is mechanically engaged with and in communication with a first network component 322A, and the second connector 308B is mechanically engaged with and in communication with a second network component 322B. Additionally, the launch fiber 320 of the light launch device 304 is in communication with the first tracing end 316A of the first tracing element 314A. The light launch device 304 emits an optical tracing signal (e.g., first optical tracing signal) through the first tracing end 316A through the first tracing element 314A and exits through the second tracing end 318A in the second illumination component 310B, thereby illuminating the second illumination component 310B. In this way, a user can connect the light launch device 304 to the first connector 308A to locate the second connector 308B by illumination thereof.

FIG. 3C is another exemplary schematic diagram illustrating the cable tracing system 300 of FIG. 2A in use to illuminate the first connector 308A. Here, the first connector 308A is not mechanically engaged or in communication with a network component, but the second connector 308B is mechanically engaged and in communication with the second network component 322B. In this configuration, the launch fiber 320 of the light launch device 304 is in communication with the second tracing end 318B of the second tracing element 314B. The light launch device 304 emits a second tracing signal through the second tracing end 318B through the second tracing element 314B and exits through the second tracing end 316B in the first illumination component 310A, thereby illuminating the first illumination component 310A. In this way, a user can connect the light launch device 304 to the second connector 308B to locate the first connector 308A by illumination thereof, regardless of whether the first connector 308A and the second connector 308B are connected to a first network component 322A or a second network component 322B (e.g., when the second connector 308B is connected to a second network component 322B, and the first connector 308A is not connected to a first network component 322A).

Figure 4:
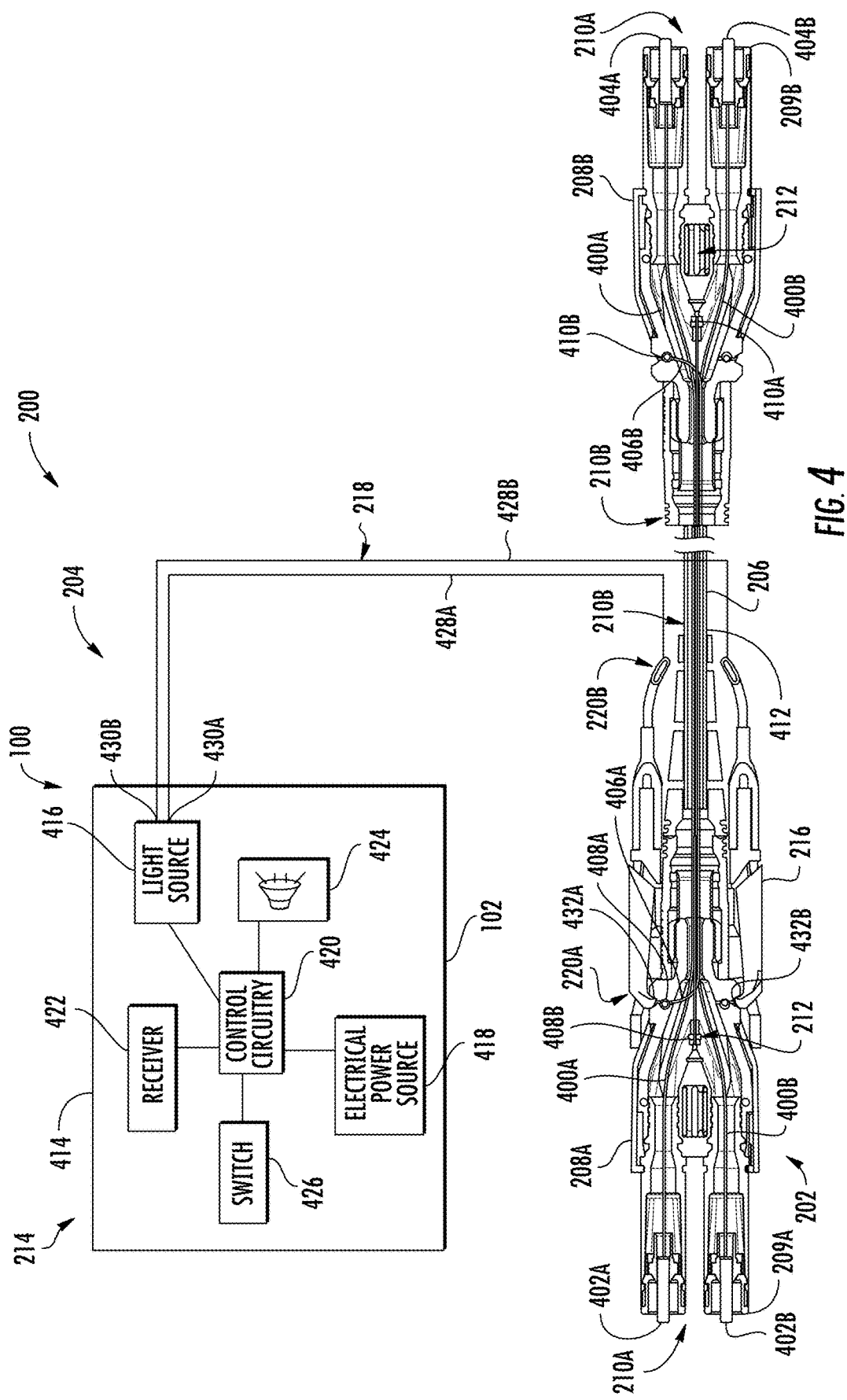
FIG. 4 is a more detailed schematic diagram of the cable tracing system of FIGS. 2A-2C.

FIG. 4 is a more detailed schematic diagram illustrating an exemplary embodiment of the cable tracing system 200. As shown, the cable tracing system 200 comprises a traceable fiber optic cable assembly 202 and a light launch device 204. The traceable fiber optic cable assembly 202 includes a fiber optic cable 206, a first fiber optic connector 208A, and a second fiber optic connector 208B. The fiber optic cable 206 includes a first data transmission fiber 400A (e.g., first data optical fiber, first data transmission element) and a second data transmission fiber 400B (e.g., second data optical fiber, first data transmission element). The first data transmission fiber 400A comprises a first data end 402A and a second data end 404A, and the second data transmission fiber 400B comprises a first data end 402B and a second data end 404B. The first data transmission fiber 400A and the second data transmission fiber 400B carry optical data signals from the first fiber optic connector 208A to the second fiber optic connector 208B, and vice versa. Any number of data transmission fibers could be used, depending upon networking requirements, data transmission requirements, etc.

Further, the fiber optic cable 206 comprises a first tracing optical fiber 406A and a second tracing optical fiber 406B for direction of a fiber optic tracing signal therethrough, thereby facilitating a user in tracing the ends of the fiber optic cable 206. In particular, the first tracing optical fiber 406A extends along the length of the fiber optic cable 206, and the second tracing optical fiber 406B extends along the length of the fiber optic cable 206 in the opposite direction. The first tracing optical fiber 406A comprises a first tracing end 408A (may also be referred to herein as a tracing launch end) and a second tracing end 410A (may also be referred to herein as a tracing emission end), and the second tracing optical fiber 406B comprises a first tracing end 408B (may also be referred to herein as a tracing emission end) a second tracing end 410B (may also be referred to herein as a tracing launch end). The first tracing end 408A of the first tracing optical fiber 406A and the first tracing end 408B of the second tracing optical fiber 406B are positioned within the first fiber optic connector 208A, and the second tracing end 410A of the first tracing optical fiber 406A and the second tracing end 410B of the second tracing optical fiber 406B are positioned within the second fiber optic connector 208B.

Each of the first tracing end 408A and second tracing end 410B comprise a bend (at or proximate thereto), and each of the second tracing end 410A and first tracing end 408B are generally straight (at or proximate thereto). The bend of the first tracing end 408A and the second tracing end 410B allow injection of an optical tracing signal into one or more sides of the first and/or second fiber optic connectors 208A, 208B. The straight second tracing end 410A and the first tracing end 408B allow emission of an optical tracing signal into the first and/or second fiber optic connectors 208A, 208B, and in particular, into an internal illumination structure of the first and/or second fiber optic connectors 208A, 208B (described in more detail below). In some embodiments, the second tracing end 410A and the first tracing end 408B of the tracing optical fibers may also be bent. For example, in some embodiments, the tracing ends include a bend of between 0 and 90 degrees, or in some embodiments greater than or equal to 90 degrees. The first tracing end 408A and second tracing end 410B are configured to receive light from the light launch device 204 while the tracing ends 410A, 410B are configured to emit light. The bends at or near the first tracing end 408A and second tracing end 410B may be about but less than 90 degrees (or any other angle) to allow for convenient injection of light into the first and second tracing optical fibers 406A, 406B.

The fiber optic cable 206 further comprises a cable jacket 412 (e.g., hollow tube forming a conduit) substantially surrounding at least a portion of the first data transmission fiber 400A, the second data transmission fiber 400B, the first tracing optical fiber 406A, and the second tracing optical fiber 406B for protection thereof. Alternatively, the first and second data transmission fibers 400A, 400B and/or the first and second tracing optical fibers 406A, 406B may be only partially embedded within the cable jacket 412 and/or mounted to an outer surface of the cable jacket 412, or otherwise attached to the cable jacket 412. Further, there may be strength members (e.g., aramid yarns) or other elements located within the fiber optic cable 206 between the first and second data transmission fibers 400A, 400B and the cable jacket 412.

With continuing reference to FIG. 4, the light launch device 204 is used to inject an optical tracing signal into one of the first or second fiber optic connectors 208A, 208B. The light launch device 204 includes a launch module 214, a launch connector 216, and a launch cable 218. The launch module 214 also includes a housing 414 and may have a number of elements stored in the housing 414, such as a light source 416 (e.g., laser source), an electrical power source 418 (e.g., batteries), control circuitry 420 respectively connected to other components of the light launch device 204 (e.g., to control the light source 416 and power usage), a receiver 422 or other wireless communication components (e.g., to receive commands from an external controller), a speaker 424 (to allow for the generation of audible signals), a switch 426 (e.g., an on-off switch), and/or one or more user interface features.

In one embodiment, the light source 416 may emit a wavelength that is chosen to enhance visibility, such as a wavelength as near to 555 nm as possible. In some embodiments, the light source 416 is a 520-540 nm green laser diode, LED (light emitting diode) or super-luminescent diode (SLD). Alternatively, other colors/wavelengths may be emitted, such as red light from approximately 620-650 nm. In other embodiments, non-laser light sources may be used, such as LEDs. Several factors may be considered when selecting an appropriate light source 416, and the factors may include, but are not limited to, visibility, cost, eye safety, peak power, power consumption, size, and commercial availability. While the light source 416 is shown as part of the housing 414, in other embodiments the light source 416 may be part of the launch connector 216 or may be located elsewhere on the light launch device 204, such as on the launch cable 218.

The launch cable 218 (e.g., delivery waveguide, umbilical, etc.) may comprise a first launch fiber 428A (e.g., first launch optical fiber) and a second launch fiber 428B (e.g., second launch optical fiber).

The first launch fiber 428A comprises a first launch end 430A and a first emission end 432A, and the second launch fiber 428B includes a second launch end 430B and a second emission end 432B. The first and second launch ends 430A, 430B are optically connected with the light source 416. In this way, the launch cable 218 provides a path for directing light and/or electrical power to one or more of the first and second emission ends 432A, 432B. The launch cable 218 may be several meters in length, for example, so that the housing 414 of the light launch device 204 can be placed on the ground while the launch connector 216 is at least indirectly coupled with the traceable fiber optic cable assembly 202 several meters away. The launch connector 216 may be mounted to, or otherwise provided at or near the first tracing end 408A of the first tracing optical fiber 406A or the second tracing end 410B of the second tracing optical fiber 406B.

When the launch connector 216 is attached to the first fiber optic connector 208A, and the first emission end 432A of the first launch fiber 428A of the launch cable 218 is aligned with the first tracing end 408A of the first tracing optical fiber 406A. In this way, a first optical tracing signal is generated by the light source 416 is directed through the first and second launch fibers 428A, 428B. The first optical tracing signal then exits the first emission end 432A of the first launch fiber 428A and enters the first tracing end 408A of the first tracing optical fiber 406A positioned in the first fiber optic connector 208A. The first optical tracing signal then travels through the first tracing optical fiber 406A until it exits the second tracing end 410A of the first tracing optical fiber 406A positioned in the second fiber optic connector 208B. Accordingly, a user can use the light launch device 204 to locate a second end 209B of the fiber optic cable 206 after attaching the light launch device 204 to a first end 209A of the fiber optic cable 206.

The allowed mechanical tolerances for the first and second launch fibers 428A, 428B to the first and second tracing optical fibers 406A, 406B (e.g., tracing fiber) may be less than about +/−100 microns, and preferably less than about +/−50 microns, although broader tolerances are also useable in some embodiments. For example, the first and second launch fibers 428A, 428B and first and second the tracing optical fibers 406A, 406B could be selected to enable a larger tolerance. In some embodiments, the first and second launch fibers 428A, 428B have a significantly narrower core diameter and mode field diameter (MFD) than the first and second tracing optical fibers 406A, 406B. In some embodiments, the first and second tracing optical fibers 406A, 406B will be a 240 micron diameter core 0.5 numerical aperture (NA) plastic optical fiber (POF). In such embodiments, there is 100% spatial overlap of the first and second launch fibers 428A, 428B to the first and second tracing optical fibers 406A, 406B for any lateral offset below 57.5 microns. The NA of the two fibers are the same so very little light will be lost from typical angular misalignments of a few degrees. In some embodiments, launch fibers 428A, 428B are used with smaller MFDs than 125 microns and lower NAs if the tolerance stack up requires it (e.g., Corning VSDN fiber with an 80 micron MFD and a 0.29 NA).

In certain embodiments, the first and second tracing optical fibers 406A, 406B include a cladding including polymer OF-138, which may provide a number of advantages including robustness. In certain embodiments, the traceable fiber optic cable comprises a core and a coating surrounding the core, the coating diameter less than 225 microns (e.g., less than 200 microns). In particular, in certain embodiments, the coating diameter is less than 250 microns (e.g., about 200 microns). This reduces the eccentricity (increases the concentricity) between the outermost coating diameter and the glass core diameter. With better concentricity, the fiber connectors may have better alignment between input fiber cores and output fiber cores. This leads to higher coupling efficiency and lower variability in coupling efficiency, which may increase the optical power visible (in traceable fiber applications) and/or reduce yield hit in manufacturing.

In certain embodiments, the traceable fiber optic cable assembly comprises no electrically conducting devices (e.g., as the data transmission elements and tracing elements are optical fibers).

Figures 5A, 5B, 5C, 5D:
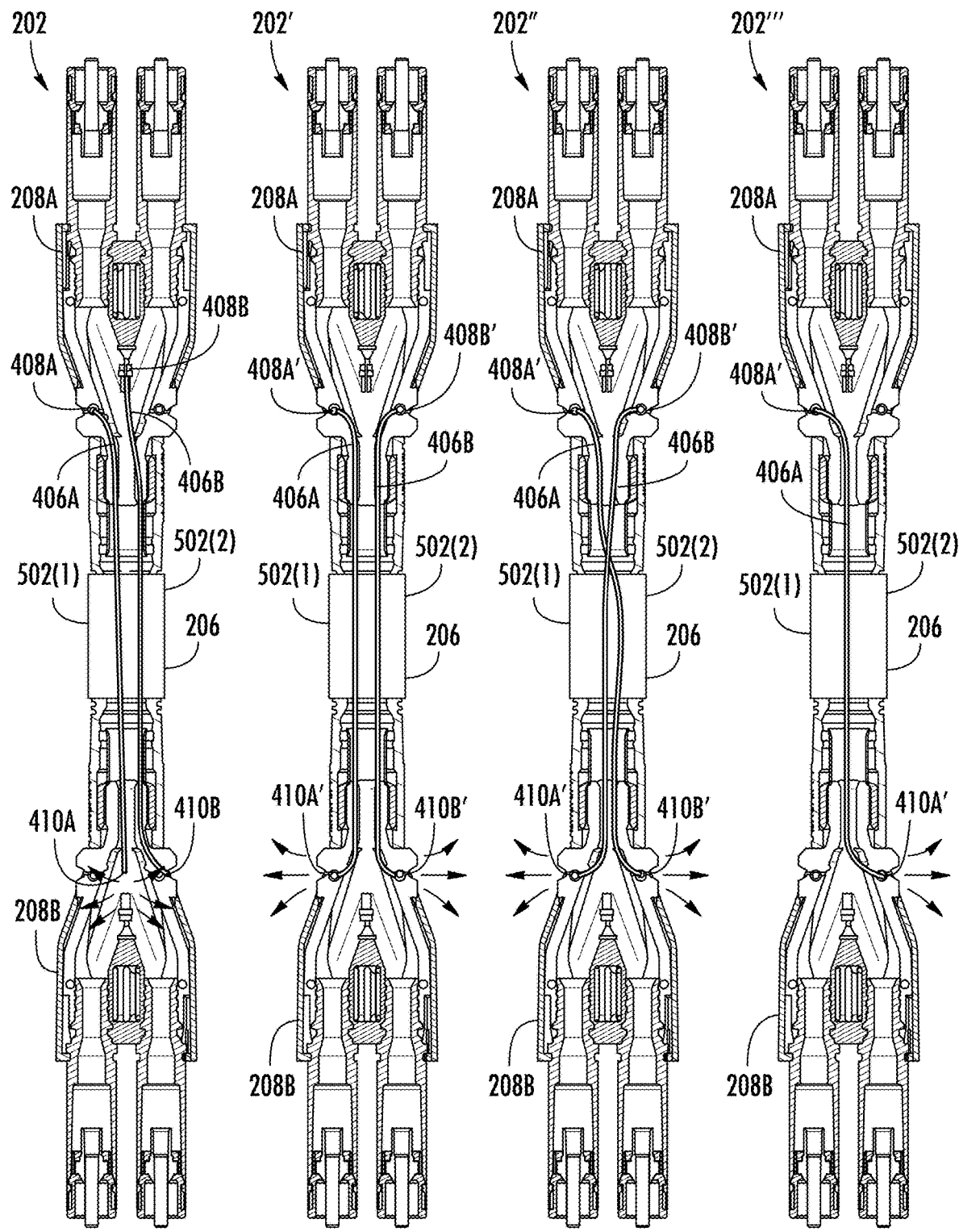
FIG. 5A is a first configuration of the traceable fiber optic cable assembly with ends of tracing optical fibers positioned within the connector.
FIG. 5B is a second configuration of the traceable fiber optic cable assembly with ends of tracing optical fibers positioned in sides of the connector, where the two tracing optical fibers are parallel to one another.
FIG. 5C is a third configuration of the traceable fiber optic cable assembly with ends of tracing optical fibers positioned in sides of the connector, where the two tracing optical fibers cross paths with one another.
FIG. 5D is a fourth configuration of the traceable fiber optic cable assembly with ends of a single tracing optical fiber positioned in the connectors of the traceable fiber optic cable.

FIG. 5A is a first configuration of the traceable fiber optic cable assembly 202 with first and second tracing optical fibers 406A, 406B. The traceable fiber optic cable assembly 202 includes a fiber optic cable 206, a first fiber optic connector 208A, and a second fiber optic connector 208B. It is noted that the traceable fiber optic cable assembly 500 includes a first side 502(1) and a second side 502(2) opposite the first side 502(1). The fiber optic cable 206 includes a first tracing optical fiber 406A and a second tracing optical fiber 406B for direction of a fiber optic tracing signal therethrough, thereby facilitating a user in tracing the ends of the fiber optic cable 206. The first tracing end 408A of the first tracing optical fiber 406A and the first tracing end 408B of the second tracing optical fiber 406B are positioned within the first fiber optic connector 208A, and the second tracing end 410A of the first tracing optical fiber 406A and the second tracing end 408B of the second tracing optical fiber 406B are positioned within the second fiber optic connector 208B. In particular, the first tracing end 408A is positioned in a first side 502(1) of the first fiber optic connector 208A and the first tracing end 408B is positioned within (but not in a side of) the second fiber optic connector 208B. The second tracing end 410B is positioned in a second side 502(2) of the second fiber optic connector 208B and the second tracing end 410A is positioned within (but not in a side of) the first fiber optic connector 208A. In this way, for example, when light is injected into the first tracing end 408A within the first fiber optic connector 208A, the light propagates through the first tracing optical fiber 406A and emits within a housing body of the second fiber optic connector 406B.

FIG. 5B is a second configuration of the traceable fiber optic cable assembly 202' with tracing ends 408A', 408B', 410A', 410B' of tracing optical fibers 406A, 406B positioned in sides of the connectors 208A, 208B and wherein the two tracing optical fibers 406A, 406B are parallel to one another within the cable 206. In this configuration the first tracing end 408A' of the first tracing optical fiber 406A is positioned in a first side 502(1) of the first fiber optic connector 208A and the second end 410B' of the first tracing optical fiber 406A is positioned within a first side 502(1) of the second fiber optic connector 208B. The first tracing end 408B of the second tracing optical fiber 406B is positioned in a second side 502(2) of the first fiber optic connector 208A and the second end 410B of the second tracing optical fiber 406B is positioned within a second side 502(2) of the second fiber optic connector 208B. In this way, for example, when light is injected into the first tracing end 408A within the first fiber optic connector 208A, the light propagates through the first tracing optical fiber 406A and emits from both sides 502(1), 502(2) of the second fiber optic connector 406B.

In this embodiment, the first and second launch fibers 406A, 406B are used concurrently for tracing. For example, in certain embodiments, the launch connector (see e.g., launch connector 204 of FIG. 2B) is attached to the first fiber optic connector 208A and injects light into the first and second launch fibers 406A, 406B at the same time. This may double the light power emitted from the second fiber optic connector 208B to the observer. This may also spread the light emitted form the second fiber optic connector 208B to spread the light out over a larger area, thereby enhancing the system visibility. Further, light is emitted from the second fiber optic connector 208B at two separate locations, illuminating different parts of the second fiber optic connector 208B and/or other connectors nearby.

FIG. 5C is a third configuration of the traceable fiber optic cable assembly 202" with tracing ends 408A', 408B', 410A', 410B' of tracing optical fibers 406A, 406B positioned in sides of the connectors 208A, 208B, where the two tracing optical fibers 406A, 406B cross paths with one another. In this configuration the first tracing end 408A' of the first tracing optical fiber 406A is positioned in a first side 502(1) of the first fiber optic connector 208A and the second tracing end 410A' of the first tracing optical fiber 406A is positioned within a second side 502(2) of the second fiber optic connector 208B. The first tracing end 408B of the second tracing optical fiber 406B is positioned in a second side 502(2) of the second fiber optic connector 208B and the second tracing end 410B of the second tracing optical fiber 406B is positioned within a first side 502(1) of the first fiber optic connector 208A. In this way, for example, when light is injected into the first tracing end 408A, 408B within the first fiber optic connector 208A, the light propagates through the first tracing optical fiber 406A and emits from both sides 502(1), 502(2) of the second fiber optic connector 406B.

This configuration has many of the same potential benefits discussed above with respect to FIG. 5B.

FIG. 5D is a fourth configuration of the traceable fiber optic cable assembly 202''' with a tracing end 410A' of a single tracing optical fiber 406A positioned in a side 502(1) of the connectors 208A, 208B. In this configuration the first tracing end 408A' is positioned in a first side 502(1) of the first fiber optic connector 208A and the second tracing end 410A' is positioned within a second side 502(2) of the second fiber optic connector 208B. In this way, for example, when light is injected into the first tracing end 408A' within the first fiber optic connector 208A, the light propagates through the first tracing optical fiber 406A and emits from only one side 502(2) of the second fiber optic connector 406B.

It is noted that a potential benefit of the configurations in FIGS. 5B-5D is that they may provide a simpler build process. For example, the position or orientation of ends of the first tracing optical fiber 406A' in either of the sides of the first fiber optic connector 208A is flexible and would be functional regardless of which side the first tracing optical fiber 406A is placed (i.e., resulting in the configuration of FIG. 5B or FIG. 5C). Comparatively, in FIG. 5A, the position and orientation of the first tracing optical fiber 406A in the side or within the interior of the first fiber optic connector 208A affects whether the traceable fiber optic cable assembly 202 functions correctly.

Figure 6:
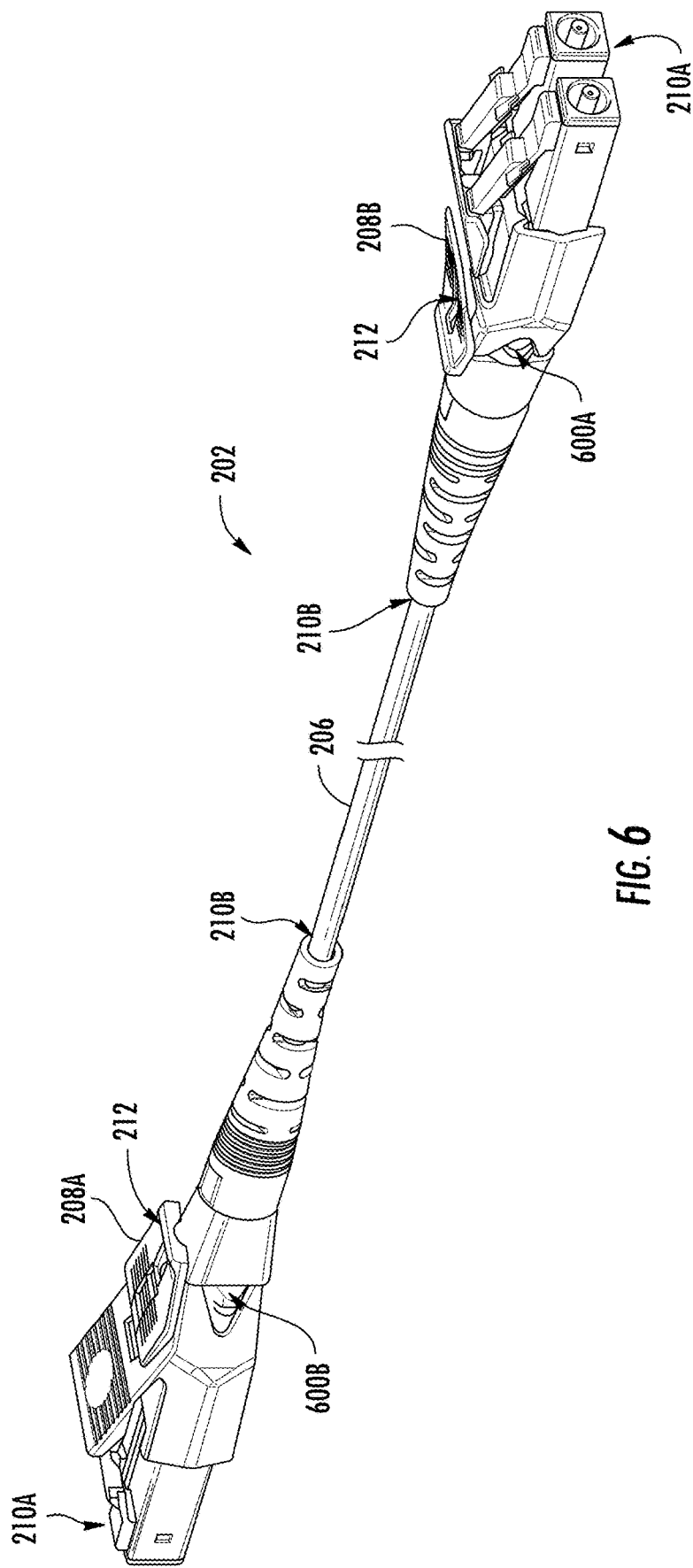
FIG. 6 is a perspective view of the traceable fiber optic cable assembly of FIGS. 2A-2C and 4.

FIG. 6 is a view of the traceable fiber optic cable assembly 202 of FIGS. 2A-2C and 4. In particular, FIG. 5 is a perspective view of the traceable fiber optic cable assembly 202. As discussed above, the traceable fiber optic cable assembly 202 comprises a fiber optic cable 206, a first fiber optic connector 208A, and a second fiber optic connector 208B. Each of the first and second fiber optic connectors 208A, 208B comprise a left connector fiber guide 600A (e.g., first connector fiber guide) and a right connector fiber guide 600B (e.g., second connector fiber guide).

Figure 7A:
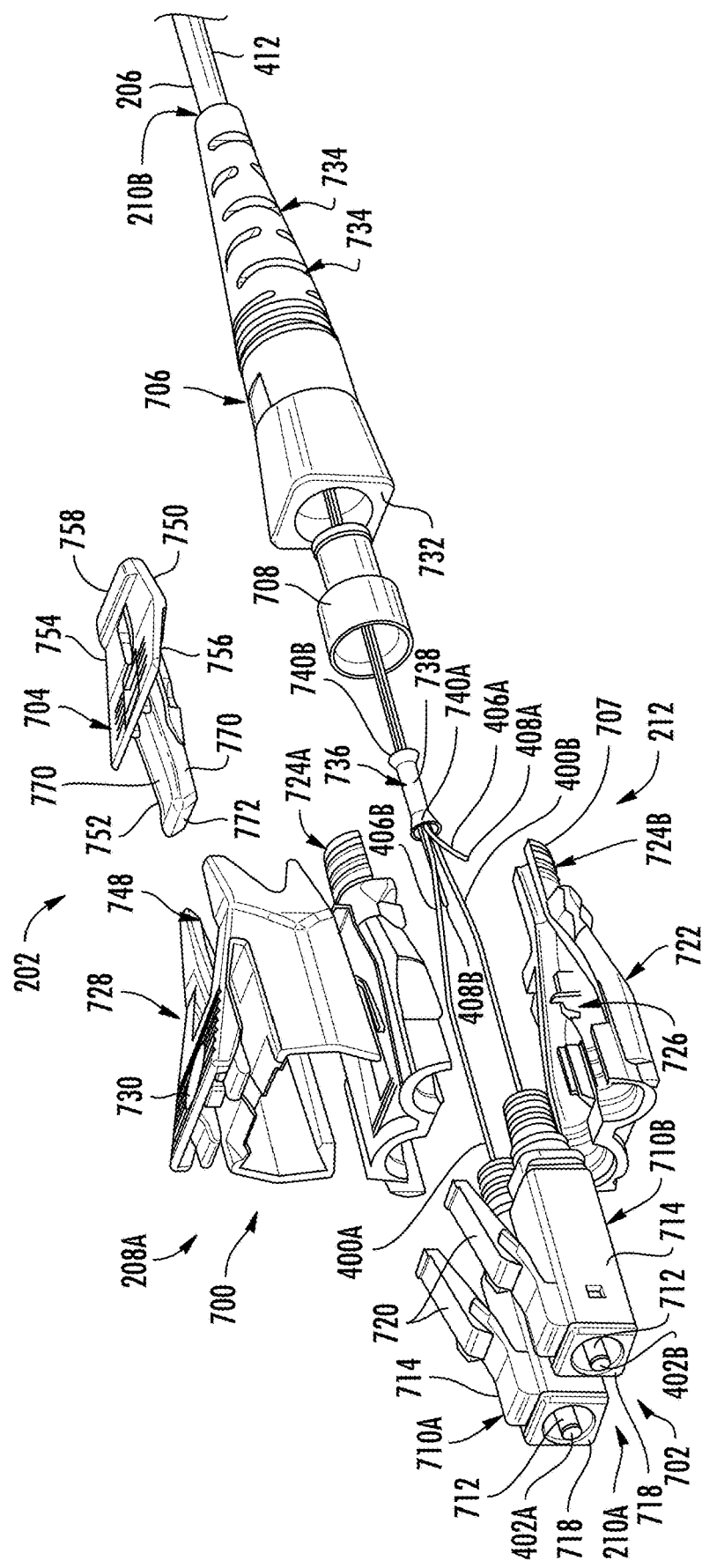
FIG. 7A is an exploded view of the first fiber optic connector of FIGS. 2A-2C and 4-6.

FIG. 7A is an exploded view of the first fiber optic connector of FIGS. 2A-2C and 4-6. The first and second fiber optic connectors 208A, 208B (e.g., optical connector, connector, etc.) are in the form of an LC duplex connector (although other types of connectors could be used). Each of the first and second fiber optic connector 208A, 208B comprises a housing 700, a connection interface 702, a locking member 704 (e.g., lock feature), a boot 706, and a crimp band 708, as explained below in more detail. It is noted that any discussion of these components with respect to the one of the first and second fiber optic connectors 208A, 208B applies to both of the first and second optic connectors 208A, 208B.

The connection interface 702 comprises first and second LC connector sub-assemblies 710A, 710B (may also be referred to herein as first and second simplex connectors). As shown, each connector sub-assembly 710A, 710B (may be referred to generally as connector sub-assembly 710) includes a ferrule 712 configured to support an optical fiber (e.g., the first and second data transmission fibers 400A, 400B) and a ferrule casing 714 (e.g., connector sub-assembly housing, housing, etc.) surrounding a portion of the ferrule 712. The ferrule 712 extends from a ferrule holder 716 (shown in FIG. 9A) that is retained in the ferrule casing 714 by a cap 718 or internal geometry of the ferrule casing 714. A spring (also not shown) biases the ferrule holder 716 forward within the ferrule casing 714 so that a front end of the ferrule 712 projects beyond the ferrule casing 714. The front end presents the optical fiber (e.g., data transmission fiber 400A, 400B) for optical coupling with a mating component (e.g., another fiber optic connector).

Each connector sub-assembly 710A, 710B also includes a latch arm 720 extending outwardly and rearwardly from a portion of the ferrule casing 714. Thus, the latch arm 720 has a proximal end coupled to the ferrule casing 714 and a distal end spaced from the ferrule casing 714. The distal end of the latch arm 720 may be depressed toward the ferrule casing 714 for mating purposes, as will be described in greater detail below.

The housing 700 of the first fiber optic connector 208A includes a body 722 in which a rear portion of each connector sub-assembly 710 (e.g., rear portions of ferrule casing 714) is received. The body 722 comprises a top clamshell 724A and a bottom clamshell 724B (e.g., a two-piece construction). At least a portion of the body 722 is translucent to allow at least a portion of the optical tracing signal to exit the housing 700. Note that translucent, at least as used herein, comprises semi-transparent and transparent objects. In particular, as used herein, the term semi-transparent identifies objects that allow at least some light to pass through at least part of the object and transparent identifies objects that allow substantially all light to pass through all or part of the object. In some embodiments, at least part of the body 722 is semi-transparent. In yet other embodiments, at least part of the body 722 is transparent. Top and bottom clamshells 724A, 724B attach together to define an interior 726 (e.g., of the housing 700). The first and second data transmission fibers 400A, 400B (e.g., first and second optical data fibers) are routed through the interior 726 from the rear of the housing 700 to the connector sub-assemblies 710. The top and bottom surface of the body 722 is mostly flat as this is where the light exits the body 722, and it is desirable to leave the light path uninterrupted until it reaches the locking member 704 (described below in more detail).

The housing 700 further comprises a trigger casing 728 with a trigger arm 730 extending forward and outwardly from a top of the trigger casing 728 (and/or body 722). The trigger arm 730 is depressible and biased upward (e.g., away from the body 722). The trigger arm 730 extends outwardly from the body 722 and over the distal end of the latch arm 720. This advantageously allows the trigger arm 730 to engage and disengage both latch arms 720 at the same time with a single trigger, and also inhibits fiber optic cables from snagging on the latch arms 720. The locking member 704 moves relative to the housing 700 (including the trigger casing 728 and trigger arm 730) to allow or prevent the trigger arm 730 from depressing and activating the latch arms 720. The trigger casing 728 is slidably removable from the body 722, such as to reverse polarity of the fiber optic cable assembly 202 (explained in more detail below).

The trigger arm 730 is shown as a separate component (e.g., a clip) removably attached to the body 722, but may alternatively be integrally formed with the body 722 so as to be part of a unitary (i.e., monolithic) structure with the body 722. However, providing the trigger arm 730 as a removable component may provide certain benefits. For example, it may be possible to remove the trigger arm 730 and attach it to the opposite side of the body 722. The connector sub-assemblies 710 may also be configured to independently rotate within the body 722 so the latch arms 720 can be orientated on the opposite side of the body 722 as well. Repositioning the trigger arm 730 and connector sub-assemblies 710 in such a manner reverses the orientation of the first fiber optic connector 208A corresponding to a first polarity state of the traceable fiber optic cable assembly 202. In other words, changing the orientation of one connector 208A changes the polarity of the fiber optic cable assembly 202. Additional details and advantages of such polarity reversal, and an exemplary configuration of the trigger arm 730 and body 722 in general, are described in U.S. Pat. No. 8,152,385, whose disclosure of these aspects is herein incorporated by reference.

The housing 700 may be attached to a fiber optic cable 206 that includes the first and second data transmission fibers 400A, 400B (e.g., first and second optical data fibers) and first and second tracing optical fibers 406A, 406B). For example, the optical fibers may be un-buffered fibers extending from within a cable jacket 412 of the fiber optic cable 206. One or more strength members (e.g., aramid yarn) may extend from the cable jacket 412. The strength members may be secured to a rear of the housing 700 by a crimp band 708 that is crimped onto the rear of the housing 700. In other embodiments, the fiber optic cable 206 may have a different configuration or be secured to the housing 700 or other part of the first fiber optic connector 208A in a different manner (e.g., using an adhesive).

To help prevent sharp bends in the optical fibers where the fiber optic cable 206 is secured to the housing 700, the first fiber optic connector 208A further includes a boot 706 extending over a portion of the fiber optic cable 206 and the housing 700. The boot 706 comprises a substantially flat proximal surface 732 (e.g., with a substantially rectangular cross section). Slots 734 provide controlled bending for fiber optic cable 206. Boot 706 is rotatably attached to the housing 700. More specifically, boot 706 is able to be rotated at least about 45 degrees in both directions, thereby allowing removal of the trigger arm 730 for polarity reversal (explained in more detail below).

The housing 700 may include a metal guide tube 736 at a rear of the housing 700 to prevent sharp bends in the optical fibers as the optical fibers enter the body 722. More specifically, the metal guide tube 736 comprises a cylindrical body 738 with a first tapered end 740A and a second tapered end 740B opposite thereto. The first and second tapered ends 740A, 740B further prevent sharp bends. The metal guide tube 736 prevents the optical fibers from being pinched during assembly of the top clamshell 724A to the bottom clamshell 724B.

Figure 7B:
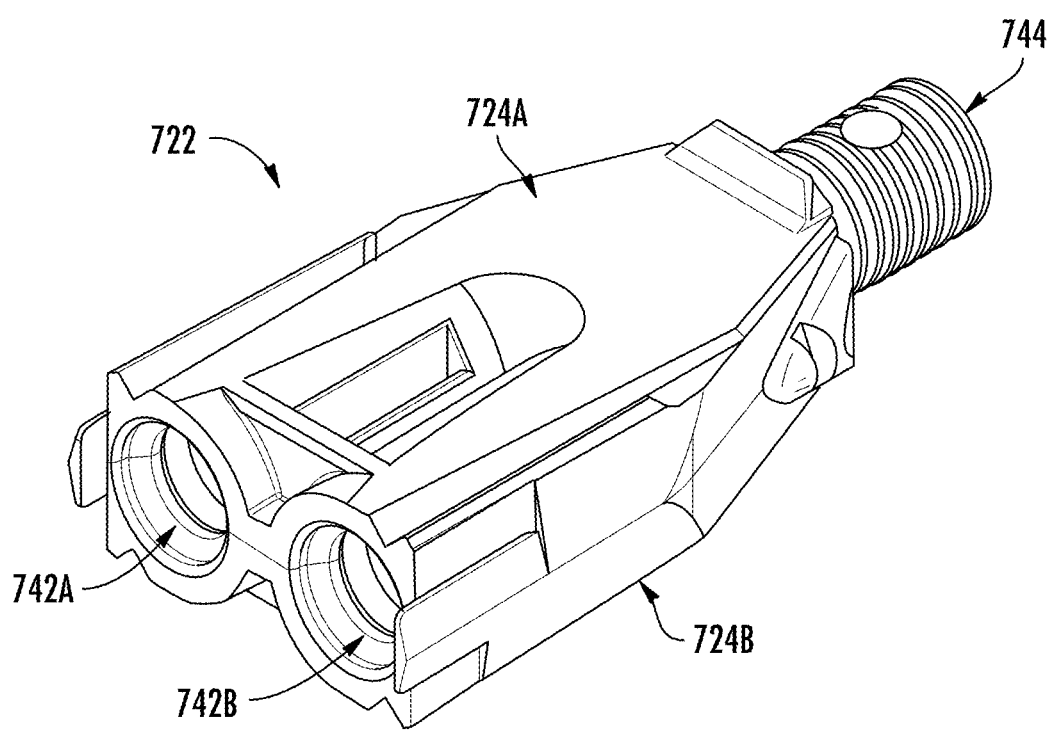
FIG. 7B is a perspective view of the housing body of the first fiber optic connector of FIG. 7A.

FIG. 7B is a perspective view of the body 722 of the first fiber optic connector 208A of FIG. 7A. As shown, the body 722 comprises a top clamshell 724A and a bottom clamshell 724B. In this embodiment, the top clamshell 724A and bottom clamshell 724B are substantially identical, but other embodiments can use body portions that are not identical. The top clamshell 724A and bottom clamshell 724B attach together and form first and second front apertures 742A, 742B (e.g., two substantially parallel apertures 742) for receiving first and second connector sub-assemblies 710A, 710B. First front aperture 742A and second front aperture 742B are configured to receive and retain a portion of the first and second connector sub-assemblies 710A, 710B in such a manner as to allow rotation for polarity reversal.

The housing 700 further comprises a rear aperture 744 opposite from the first and second front apertures 742A, 742B that is at least partially defined from the mating of the top and bottom clamshells 724A, 724B. The rear aperture 744 is in continuous communication with the first and second front apertures 742A, 742B by body 722 through interior 726. The rear aperture 744 is configured to interact with fiber optic cable 206 and crimp band 708 to allow ingress of optical fibers through its passage and for securing the fiber optic cable 206 to the housing 700 at the outer periphery. Further, the rear aperture 744 is configured to receive the metal guide tube 736 therein. However, as noted above, the connector described is merely exemplary, and other types of connectors are within the scope of this disclosure.

Figure 7C:
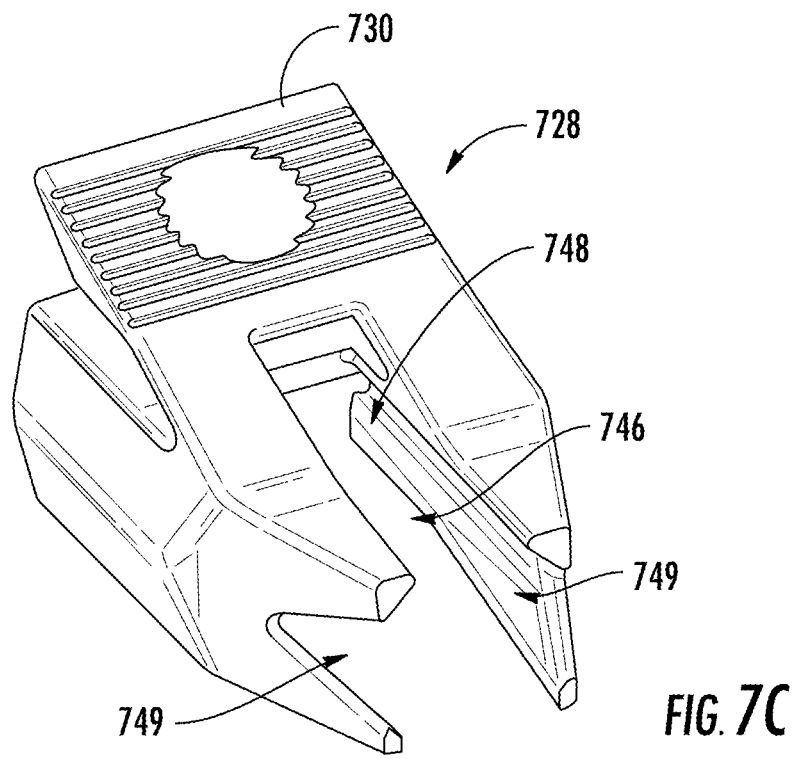
FIG. 7C is a rear perspective view of a trigger casing of the first fiber optic connector of FIG. 7A.
Figure 7D:
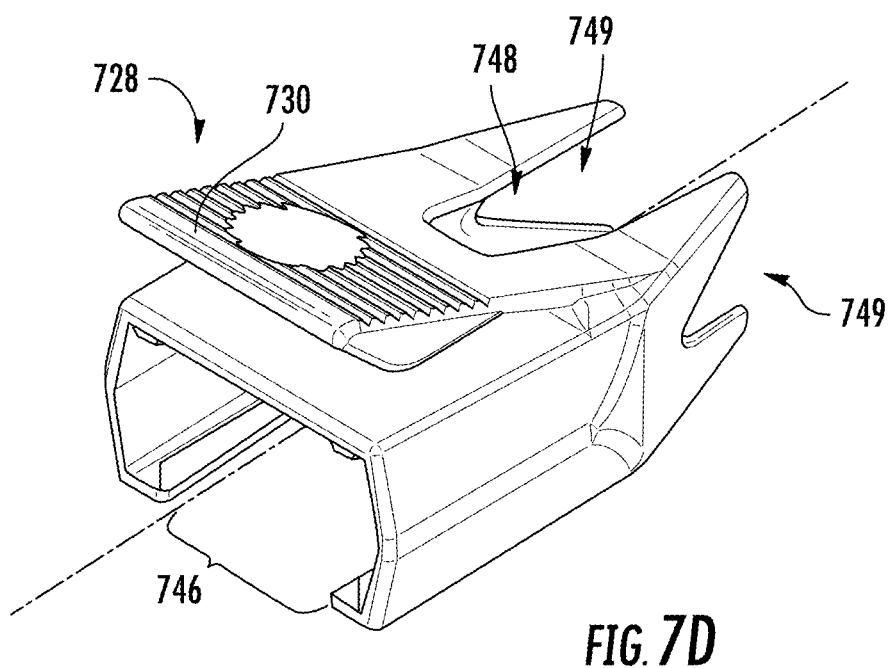
FIG. 7D is a front perspective view of the trigger casing of the first fiber optic connector of FIG. 7A.

FIGS. 7C and 7D are views of the trigger casing 728 of the first fiber optic connector of FIG. 7A. The trigger casing 728 is substantially rectangular with a substantially rectangular through-passage. The trigger arm 730 comprises a flexible arm attached to a top surface of the trigger casing 728 and extending angularly away from it. The trigger casing 728 further comprises a lateral gap 746 in a bottom thereof, to allow the trigger casing 728 to be removed from the body 722. The rectangular shape of the trigger casing 728 and passage prevent accidental rotation of the trigger casing 728 relative to the body 722. The trigger casing 728 may have a lateral gap 746 in the trigger arm 730 towards a bottom of the trigger arm 730, to receive a portion of the locking member 704 therethrough, as explained in more detail below. Further, the trigger casing 728 may comprise a top opening 748 to receive a portion of the locking member 704 therein. Further, the trigger casing 728 may comprise side apertures 749 to facilitate removal of the trigger casing 728 from the body 722 and to receive the left or right connector fiber guide 600A, 600B therein.

Figure 7E:
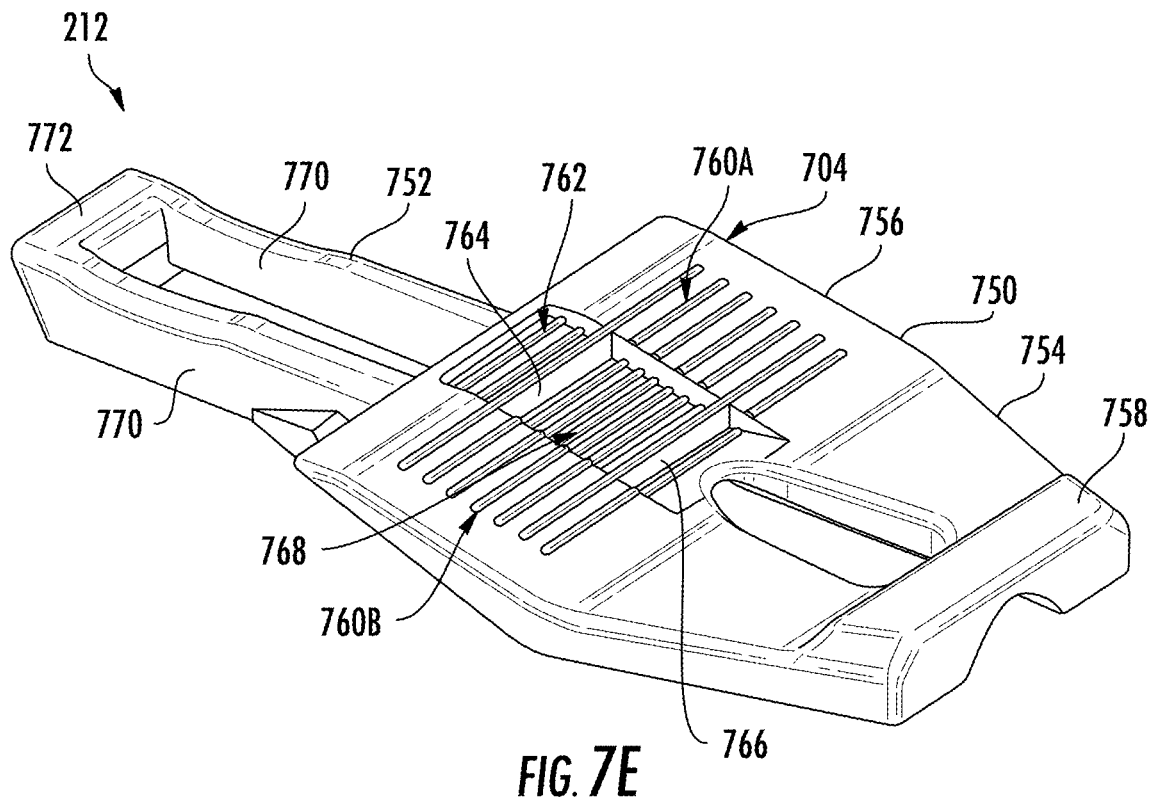
FIG. 7E is a rear perspective view of a locking member of the first fiber optic connector of FIG. 7A.
Figure 7F:
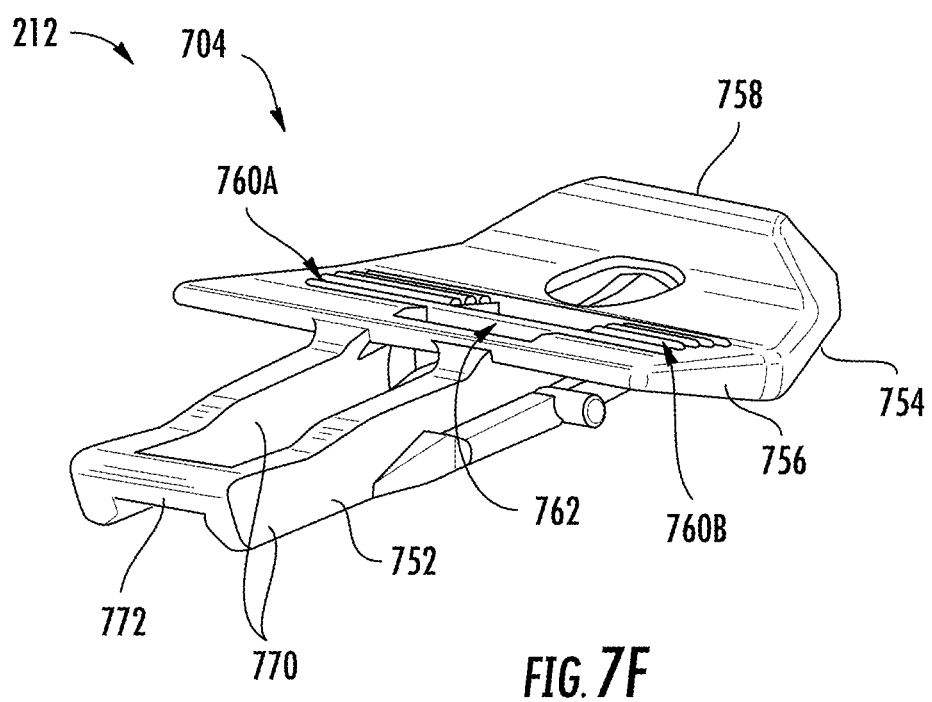
FIG. 7F is a front perspective view of the locking member of the first fiber optic connector of FIG. 7A.

FIGS. 7E and 7F are views of the locking member 704 of the first fiber optic connector 208A. The locking member 704 (also called a trigger lock) is translucent to allow passage of the optical tracing signal therethrough so that the optical tracing signal exits the housing 700. The locking member 704 comprises a proximal portion 750 and a distal portion 752, the proximal portion 750 wider than the distal portion 752. The proximal portion 750 may, for example, have a front end with a width greater than that of the top opening 748 of the trigger casing 728 in the trigger arm 730, but equal to or less than that of the trigger arm 730 in general. In the embodiment shown, the proximal portion 750 includes a first segment 754 and a second segment 756 bent or otherwise inclined relative to the first segment 754. Such a configuration enables the proximal portion 750 to have a shape generally conforming to or otherwise complementing that of the trigger arm 730, as will be described in greater detail below. The first segment 754 may also include a ramp, flange, ledge or other raised gripping element 758 at a rear of the locking member 704 to make it easier for a user to move the locking member 704 between its forward and rearward positions (explained in more detail below). The design of the locking member 704 as an illumination component may be further optimized by reducing the height and area of the gripping element 758 which may be raised and may block light.

The second segment 756 comprises left gripping ridges 760A, right gripping ridges 760B, and an external TIR structure 762 positioned therebetween. In particular, the illumination component 212 comprises the external TIR structure 762. The left and right gripping ridges 760A, 760B are used to facilitate sliding of the locking member 704. The external TIR structure 762 extends from the front to the back of the locking member 704. The locking member 704 comprises a major forward TIR surface 764, a major rearward TIR surface 766, and a plurality of minor TIR surfaces 768. The plurality of minor TIR surfaces 768 could be positioned between the major forward TIR surface 764 and the major rearward TIR surface 766, positioned on both sides of the major forward TIR surface 764, and/or positioned on both sides of the major rearward TIR surface 766. As explained in more detail below, the major forward TIR surface 764, major rearward TIR surface 766, and/or plurality of minor TIR surfaces 768 redirect an emitted optical tracing signal proximally (e.g., toward a user). However, the major forward TIR surface 764, major rearward TIR surface 766, and/or minor TIR surfaces 768 may redirect the emitted optical tracing signal at different angles and may depend on the position of the locking member 704 relative to the housing 700 (explained in more detail below). The top of the major forward TIR surface 764 and/or major rearward TIR surface 766 could be the same height as the left and right gripping ridges 760A, 760B to provide a consistent horizontal height for comfort of a user when gripping the locking member 704.

Figure 7G:
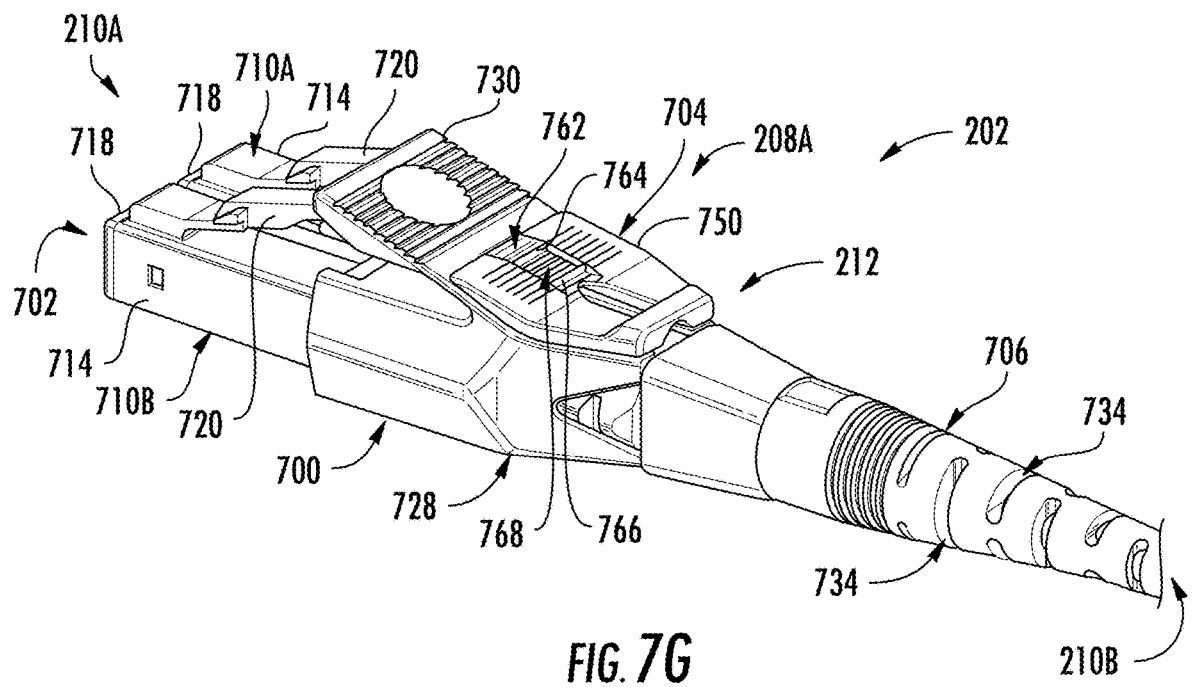
FIG. 7G is a rear perspective view of the first fiber optic connector of FIG. 7A with the locking member in an unlocked orientation.
Figure 7H:
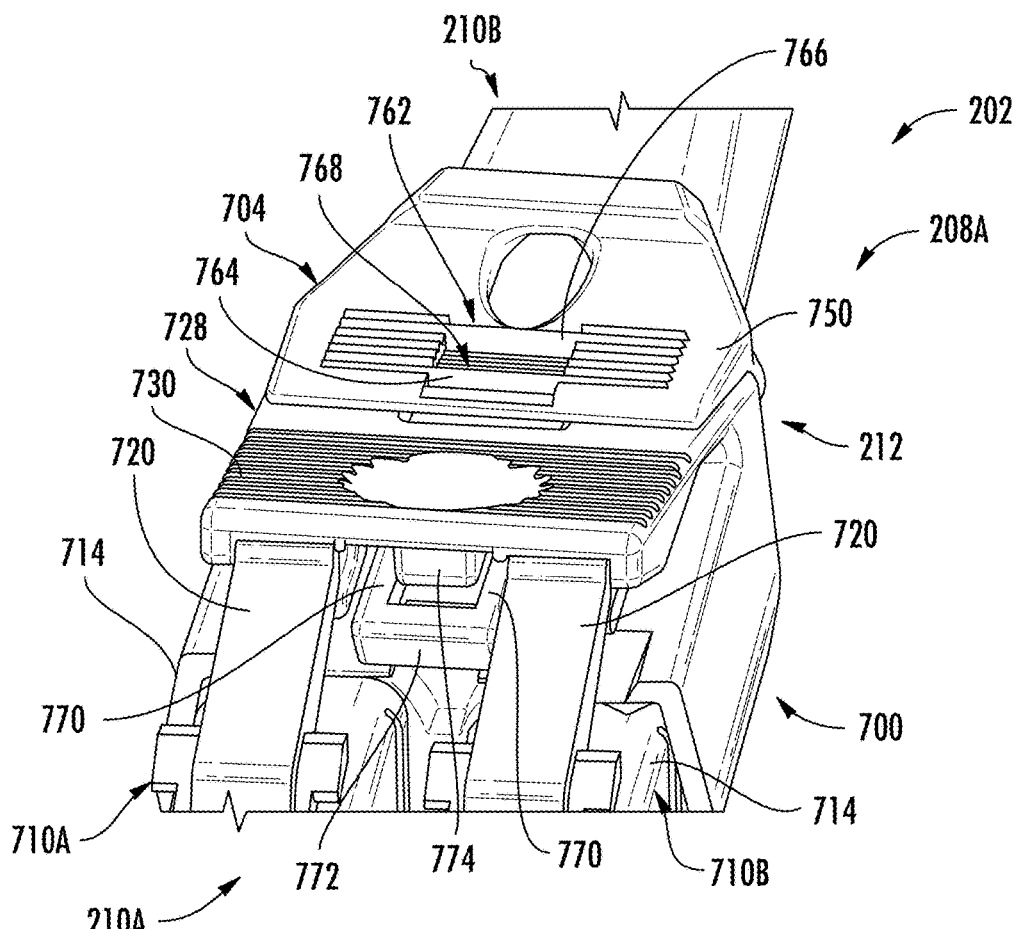
FIG. 7H is a front perspective view of the first fiber optic connector of FIG. 7A with the locking member in the unlocked orientation.

Referring to FIGS. 7G and 7H, the distal portion 752 includes axial or elongated bars 770 that are spaced apart from each other. The elongated bars 770 extend forward from an underside of the second segment 756 to a crossbar 772, which extends between the elongated bars 770. The distal portion 752 may also include one or more locking features configured to cooperate with complementary locking features on the trigger arm 730 to removably secure the locking member 704 in the forward position, rearward position, or both.

FIGS. 7G and 7H are views of the locking member 704 in an unlocked orientation (e.g., slid forward). The underside of the trigger arm 730 includes a wedge 774 between axial slots left and right elongated bars 770 of the locking member 704. The wedge 774 may initially be positioned above the elongated bars 770 of the locking member 704, as may be the case, for example, when the trigger arm 730 has not yet been depressed or otherwise moved in a direction toward the body 722. The wedge 774 is sized to fit within space between the elongated bars 770. Additionally, when the locking member 704 is in its forward position, the crossbar 772 of the locking member 704 is positioned forward of the wedge 774. Thus, in the forward position of the locking member 704, the wedge 774 can be received between the elongated bars 770 to allow the trigger arm 730 to move toward the body 722 and trigger casing 728 far enough to depress the distal ends of the latch arms 720. In other words, the crossbar 772 does not interfere or interact with the wedge 774 in the forward position of the locking member 704.

Figure 7I:
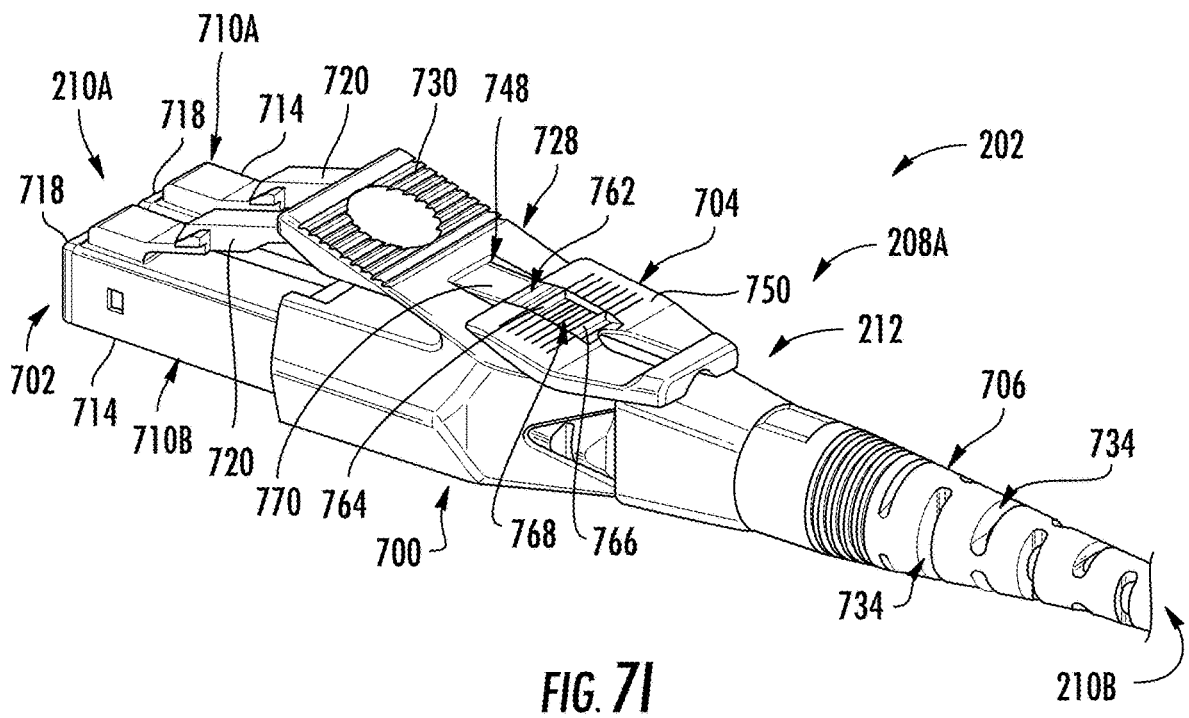
FIG. 7I is a rear perspective view of the first fiber optic connector of FIG. 7A with the locking member in a locked orientation.
Figure 7J:
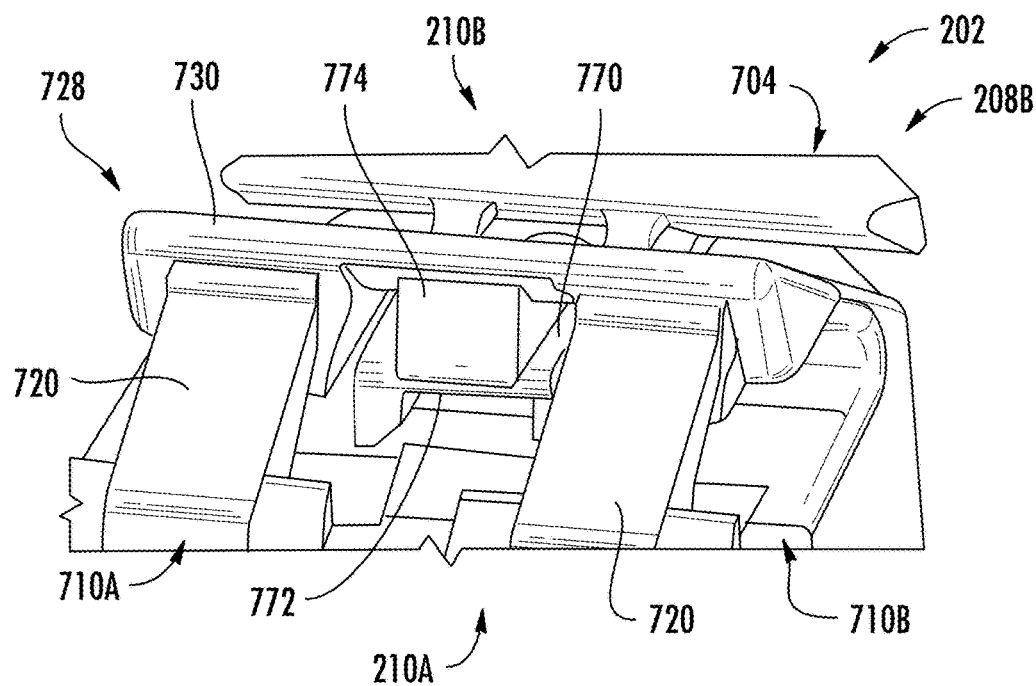
FIG. 7J is a front perspective view of the first fiber optic connector of FIG. 7A with the locking member in the locked orientation.

FIGS. 7I and 7J are views of the locking member 704 in a locked orientation (e.g., slid backward). In contrast, the crossbar 772 is positioned under the wedge 774 when the locking member 704 is in its rearward position. Such an arrangement effectively prevents the trigger arm 730 from being moved towards the body 722 and trigger casing 728, or at least moved to an extent that may result in the latch arms 720 being depressed by the trigger arm 730 and moving from an initial position. For example, there may be contact between the wedge 774 and the crossbar 772 when the trigger arm 730 has not been moved at all from an initial position toward the body 722 and the trigger casing 728. Alternatively, there may be contact very soon after such movement so that only a limited range of movement is possible. The trigger arm 730 and latch arms 720 in such alternative embodiments may be configured so that the trigger arm 730 does not depress the distal ends of the latch arms 720 despite the limited range of movement.

As can be appreciated, the crossbar 772 defines a stop feature on the distal portion 752 of the locking member 704 in the embodiment shown. In other embodiments, the locking member 704 may have a different shape or configuration, yet still include a stop feature that functions in a manner similar to the crossbar 772. Thus, the stop feature may be in a form other than the crossbar 772.

Figure 8:
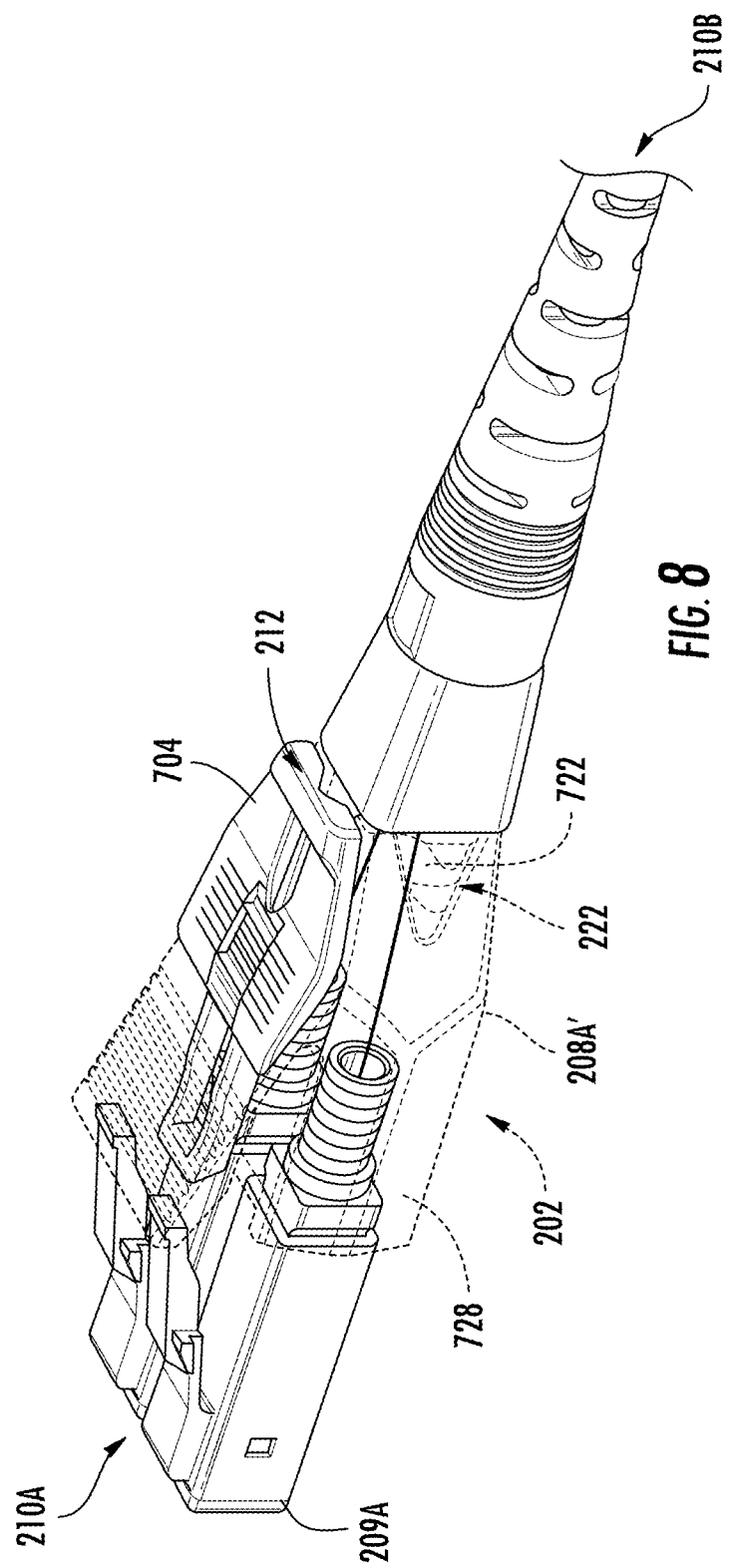
FIG. 8 is a perspective view of another embodiment of the first fiber optic connector of FIGS. 2A-2C and 4-7J with a translucent housing body and trigger casing.

FIG. 8 is a perspective view of another embodiment of the first fiber optic connector 208A' with a translucent body 722 (shown in dashed lines for illustrative purposes) and/or a translucent trigger casing 728 (shown in dashed lines for illustrative purposes) which increases the total emission surface area. In this way, more light is emitted from the first fiber optic connector 208A', which may increase the visibility and ease of identification of the first fiber optic connector 208A'. Additionally, such a configuration may allow for close-up identification of the transmission fibers (e.g., blue and orange transmission fibers), thereby allowing a user to determine the state of reversible polarity of the connector.

Translucent materials for the body 722, trigger casing 728, and/or locking member 704 may include polyetherimide (e.g., Ultem®). In certain embodiments, other materials (e.g., for the body 722) include Ultrason®. In certain embodiments, at least a portion of the first fiber optic connector comprises a first translucent material to allow at least a portion of a second optical tracing signal to exit the first interior of the first housing, and at least a portion of the second fiber optic connector comprises a second translucent material to allow at least a portion of the first optical tracing signal to exit the second interior of the second housing.

It is noted that patterned coloration and/or surface texture can be applied to the body 722, trigger casing 728, and/or locking member 704 to enhance light scattering. Further, in certain embodiments two-shot injection molding can be used to vary the opaque/clear sections of the body 722, trigger casing 728, and/or locking member 704 as needed for more or less emission. In certain embodiments, opaque colored sections may be used to present cohesively colored parts to customers.

FIGS. 9A-9G are views of the interior of the first and second fiber optic connectors 208A, 208B, and in particular of the mounting of the optical fibers within the housing 700 of the first and second fiber optic connector 208A, 208B. As shown, the bottom clamshell 724B is the same for both the first and second fiber optic connectors 208A, 208B. As shown, the traceable fiber optic cable assembly 202 comprises first and second data transmission fibers 400A, 400B. In particular, the first data end 402A of the first data transmission fiber 400A is positioned within a first fiber optic cable ferrule in the first fiber optic connector 208A. The first data end 402B of the second data transmission fiber 400B is positioned within the second fiber optic cable ferrule in the second fiber optic connector 208B. Further, the first data end 402A of the first data transmission fiber 400A is positioned within a second fiber optic cable ferrule in the first fiber optic connector 208A, and the first data end 402B of the second data transmission fiber 400B is positioned within the first fiber optic cable ferrule in the second fiber optic connector 208B.

Further, as mentioned above, each body 722 comprises a left and right connector fiber guide 600A, 600B at opposite sides of the body. Each of the left and right connector fiber guides 600A, 600B comprises a tracing opening 606 in communication with a fiber channel 900 extending from the body interior 726 to external of the left and right connector fiber guides 600A, 600B.

In the first fiber optic connector 208A, the first tracing end 408A of the first tracing optical fiber 406A is positioned in the tracing opening 606 of the left connector fiber guide 600A and extends through the fiber channel 900. The second tracing end 410A of the first tracing optical fiber 406A is centrally mounted in the second fiber optic connector 208B (discussed in more detail below). Similarly, in the second fiber optic connector 208B, the second tracing end 410B of the second tracing optical fiber 406B is positioned in the tracing opening 606 of the left connector fiber guide 600A and extends through a fiber channel 900. The first tracing end 408B of the second tracing optical fiber 406B is centrally mounted in the second fiber optic connector 208A (discussed in more detail below).

Figure 9A:
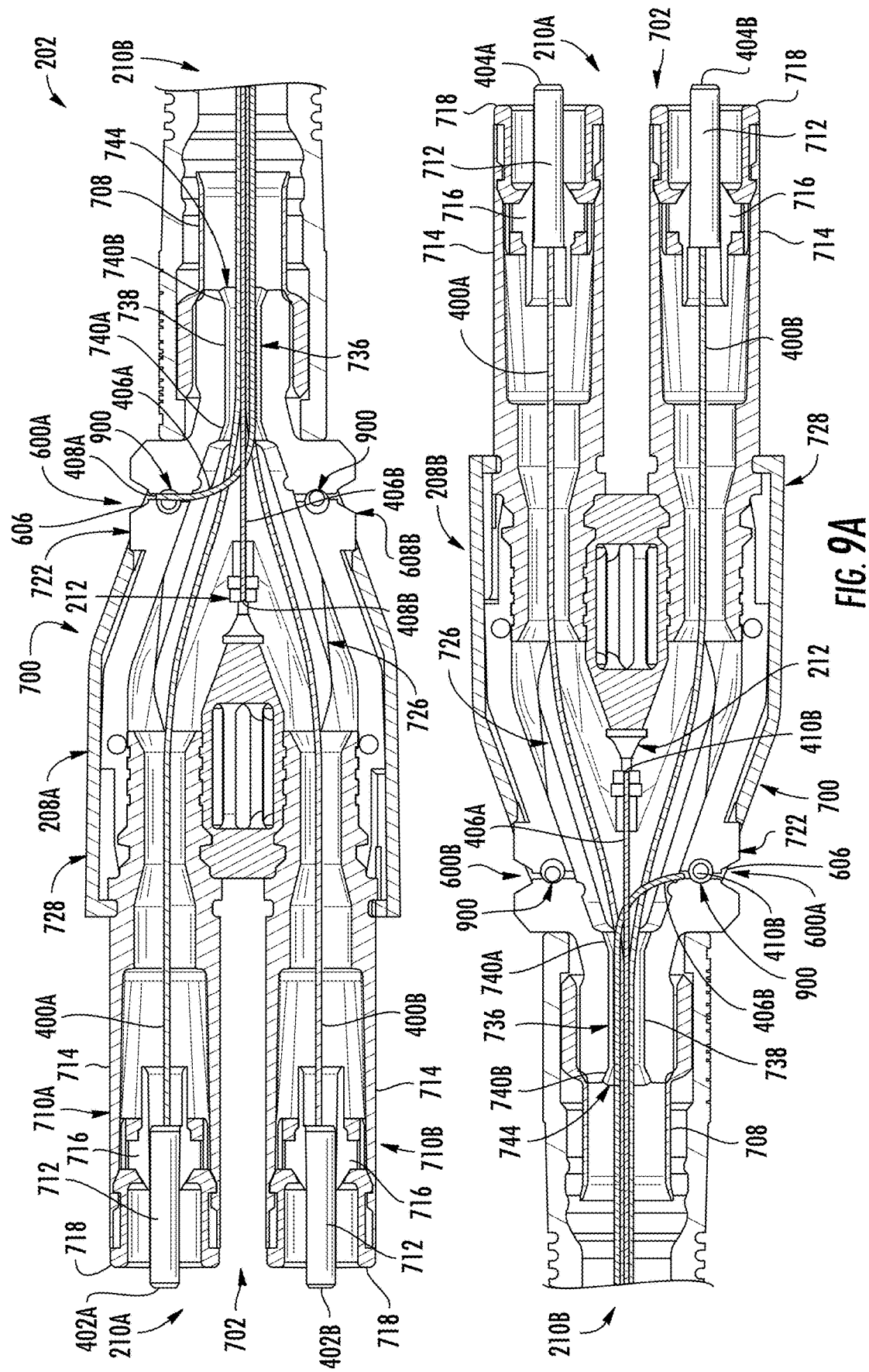
FIG. 9A is a cross-sectional view of a traceable fiber optic cable assembly.
Figure 9B:
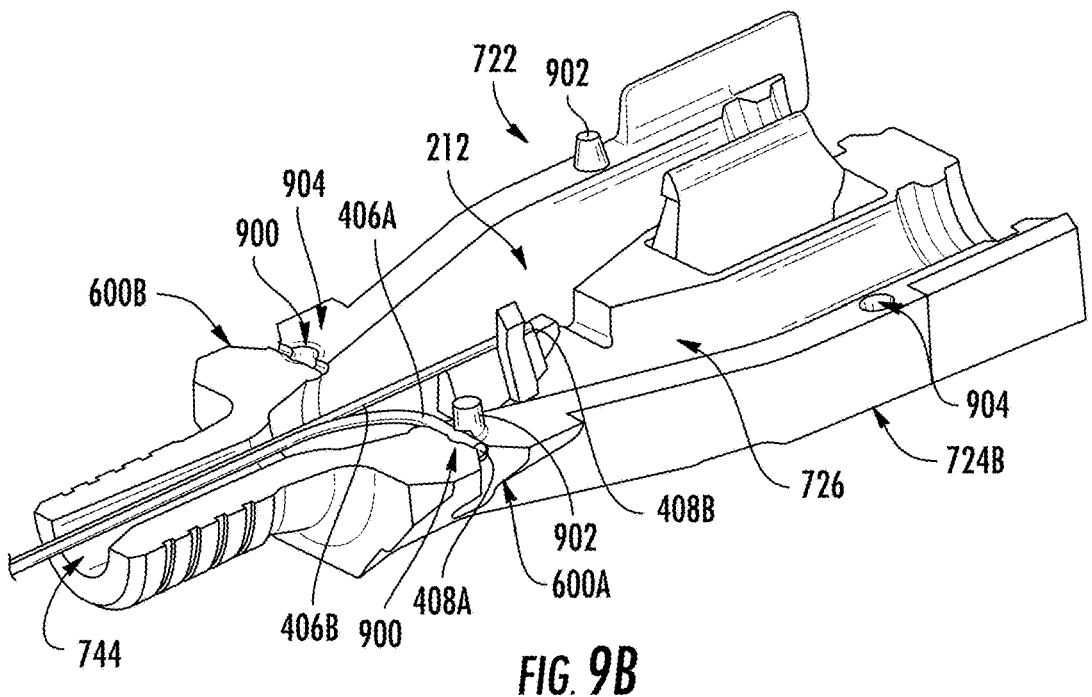
FIG. 9B is a perspective view of the first fiber optic connector housing bottom clamshell of FIG. 9A with a first tracing end of the first tracing optical fiber and a first tracing end of the second tracing optical fiber positioned therein.
Figure 9C:
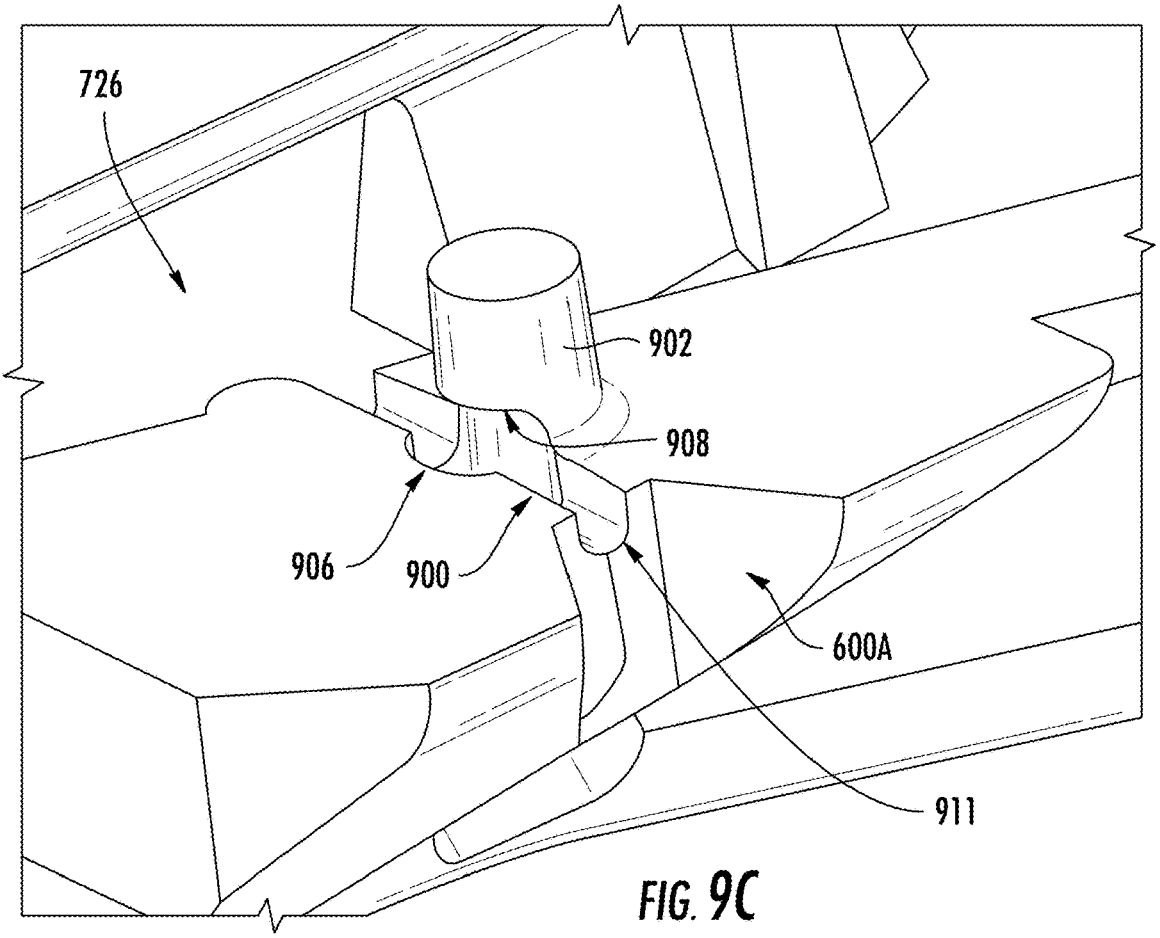
FIG. 9C is an enlarged perspective view of a fiber channel and alignment protrusion feature of FIG. 9B.
Figure 9D:
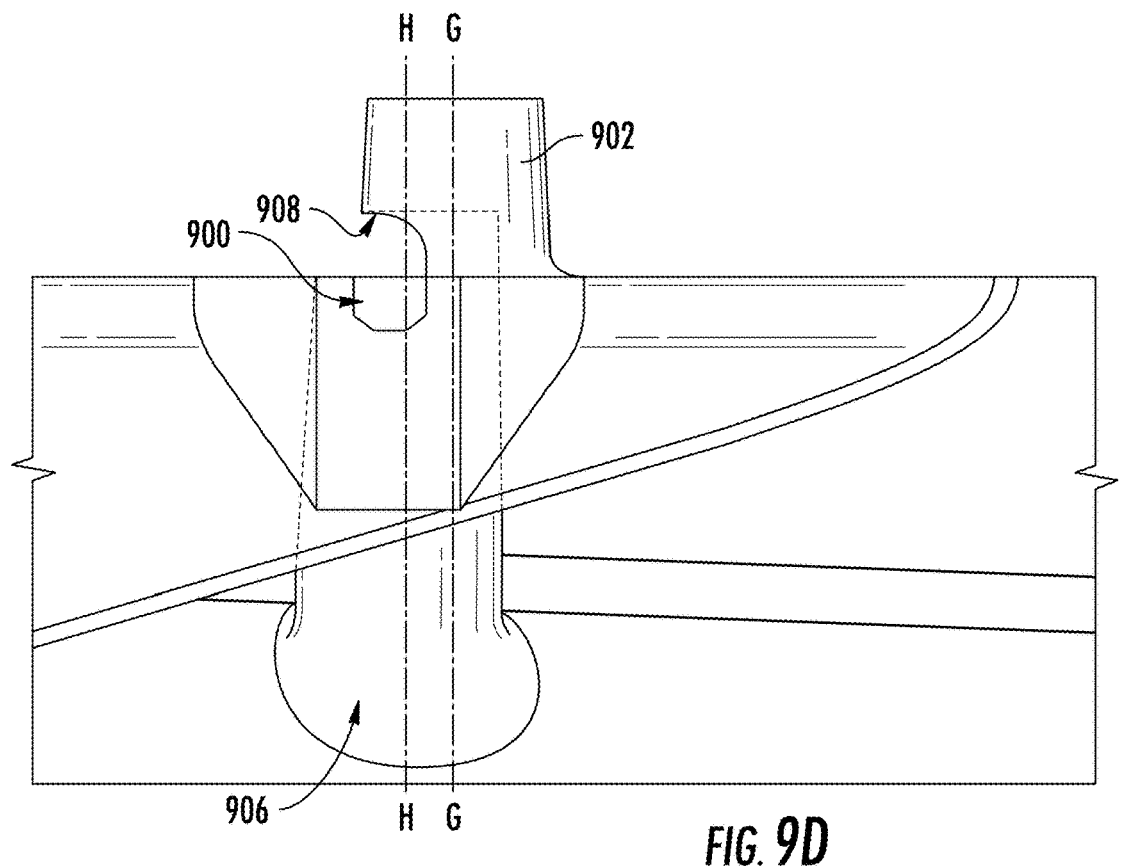
FIG. 9D is a cross-sectional side view of the fiber channel and alignment protrusion feature of FIGS. 9B and 9C.
Figure 9E:
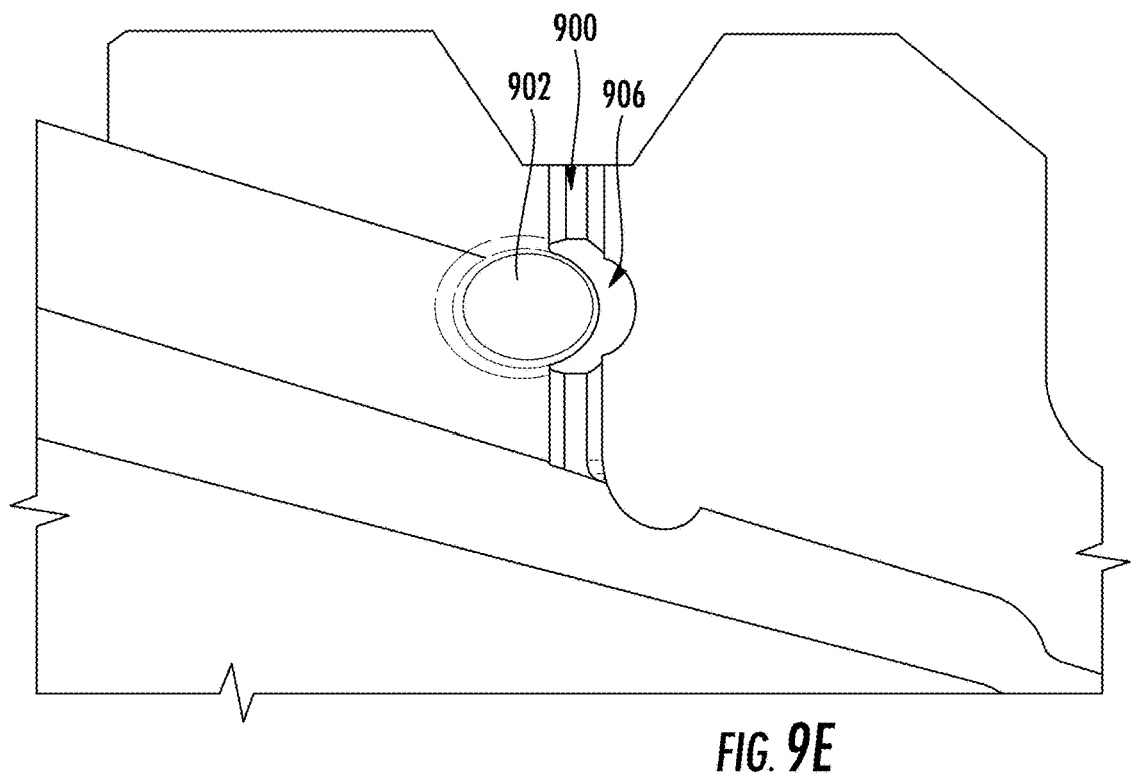
FIG. 9E is a top view of the fiber channel and alignment protrusion feature of FIGS. 9B-9D.

FIG. 9B is a perspective view of the bottom clamshell 724B of the housing 700 of the first and second fiber optic connector 208A, 208B, and FIGS. 9C-9E are views of the fiber channel 900 and alignment protrusion feature of FIG. 9B. Alignment protrusion features 902 cooperate with corresponding alignment cavity features 904, respectively, providing alignment and preventing lateral and axial translation. The alignment features are shown by way of example and in no way limit the possible configurations of such features. Although the top and bottom clamshells 724A, 724B are identical, as discussed above, in other embodiments top and bottom clamshells 724A, 724B may not be substantially identical, such as one half may comprise all the alignment cavity features and the other half comprise all the alignment protrusion features. Likewise, other configurations are possible for securing the housing components together. Other variations include a housing formed from a single component that has an upper and lower portion connected by a living hinge.

As shown, the first tracing end 408A of the first tracing optical fiber 406A is positioned in the tracing opening 606 of the left connector fiber guide 600A and extends through the fiber channel 900. The fiber channel 900 of the left connector fiber guide 600A comprises an access port 906 at least partially positioned beneath the alignment protrusion feature 902. The access port 906 extends through the bottom clamshell 724B to provide access to the fiber channel 900 (as explained in more detail below). The fiber channel 900 is positioned between the rear aperture 744 and the alignment protrusion feature 902, where at least a portion of the alignment protrusion feature 902 can be positioned above the fiber channel 900 to define an overhang 908.

During assembly, the first tracing optical fiber 406A is bent and positioned in the fiber channel 900, and is biased towards a straight orientation. Accordingly, the overhang 908 and position of the alignment protrusion feature 902 on a side of the fiber channel 900 opposite from the rear aperture 744 act as a hook and prevent the first tracing optical fiber 406A from accidentally disengaging from the fiber channel 900. Further, the overhang 908 prevents any accidental pinching or damage to the first tracing optical fiber 406A when the top and bottom clamshells 724A, 724B are assembled together because the first tracing optical fiber 406A is more enclosed by the overhang 908.

Once the top and bottom clamshells 724A, 724B are assembled, a syringe (or other device) can be inserted into the access port 906 (in some embodiments having a diameter of 0.5 mm, 1 mm, 1.5 mm, etc.) to inject an adhesive or epoxy within the fiber channel 900 to fix the first tracing optical fiber 406A within the fiber channel 900. As shown, the central axis G-G of the alignment protrusion feature 902 is offset from the central axis H-H of the access port 906. This offset facilitates manufacture of the overhang 908.

Figure 9F:
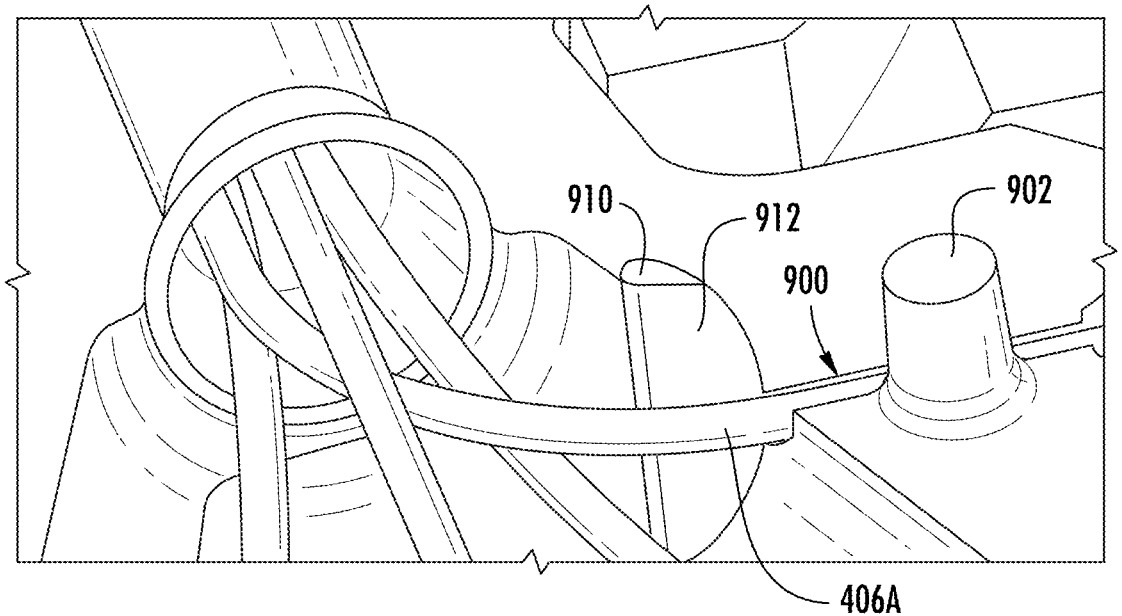
FIG. 9F is an enlarged perspective view of a fiber channel of the first fiber optic connector of FIG. 9A.
Figure 9G:
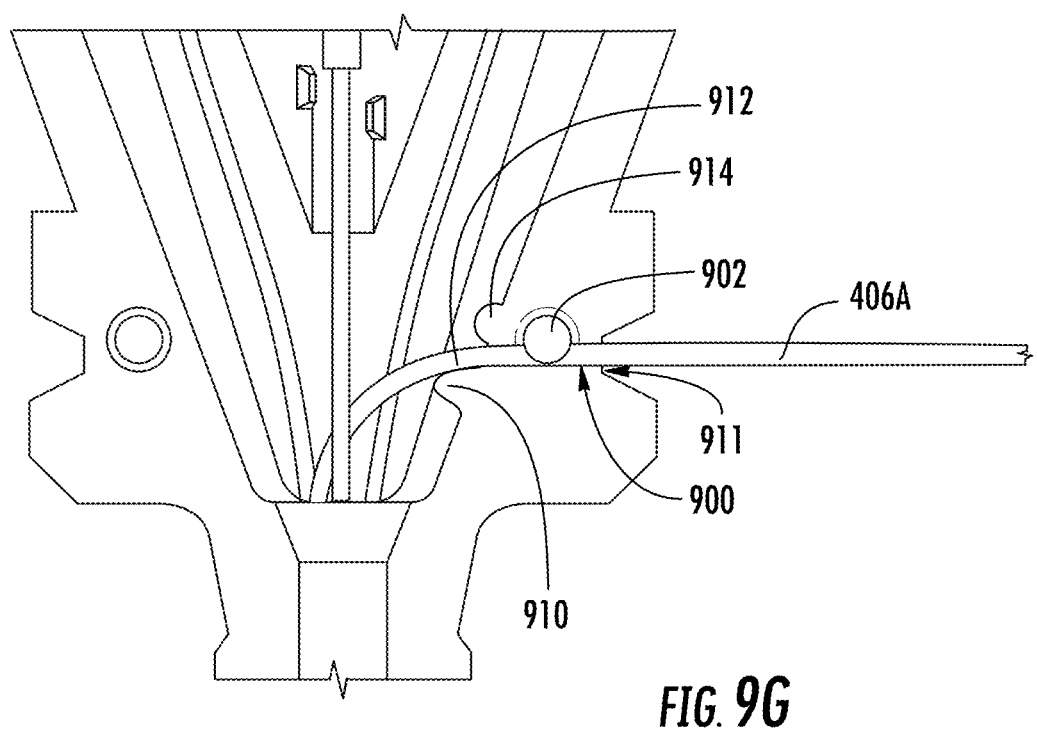
FIG. 9G is a cross-sectional view of the first fiber optic connector of FIG. 9A.

Referring to FIGS. 9E-9G, the bottom clamshell 724B of the housing 700 of the first and second fiber optic connector 208A, 208B further includes a post 910 (may also be referred to as a first post) positioned proximate the fiber channel 900. The post 910 protrudes inwardly and has a radius of curvature above the critical radius of curvature of the first tracing optical fiber 406A. In particular, the post 910 includes a contact surface 912 that is coextensive with the fiber channel 900. In this way, there is no sharp edge between the fiber channel 900 and the post 910. The post 910 is angled and/or curved with a radius above a minimum bend radius of the first tracing optical fiber 406A (below which the first tracing optical fiber 406A may become damaged). In this way, the post 910 maintains the first tracing optical fiber 406A above the minimum bend radius and prevents contact of the first tracing optical fiber 406A with any sharp edges that may damage the fiber (e.g., during fiber installation). Thus, the post 910 prevents reliability issues with the first tracing optical fiber 406A being bent so tightly that it breaks.

In certain embodiments, the first housing 700 of the first fiber optic connector 208A (e.g., duplex connector) includes a fiber channel 900 extending from the first tracing opening 911 (shown in FIG. 9C) to the first interior 726. The first housing 700 of the first fiber optic connector 208A (e.g., duplex connector) further includes a first post 910 in the first interior 726 proximate the fiber channel 900. The first post 910 comprising a contact surface 912 to prevent the first tracing optical fiber 406A from exceeding a critical bend radius. The critical bend radius is a minimum bend radius that corresponds with an increased damage rate of the first tracing optical fiber 406A. The first housing 700 further includes a rear aperture 744 opposite the first simplex connector 710A and the second simplex connector 710B (shown in FIG. 9A). The first post 910 is positioned between the fiber channel 900 and the rear aperture 744.

Referring to FIG. 9G, in certain embodiments, the bottom clamshell 724B of the housing 700 of the first and second fiber optic connector 208A, 208B further includes a second post 914 positioned proximate the fiber channel 900 opposite the first post 910. The second post 914 operates similar to the first post 910, but would maintain the first tracing optical fiber 406A above the minimum bend radius and prevent contact of the first tracing optical fiber 406A with any sharp edges that may damage the fiber when the first tracing optical fiber 406A is bent in the opposite direction (e.g., such as in the configuration shown in FIG. 12 below).

FIGS. 10A-10H are views of the second tracing end 408B of the second tracing optical fiber 406B mounted within the first fiber optic connector 208A and illustrating emission of an optical tracing signal into the first fiber optic connector 208A (see FIG. 2B). As shown, the top and bottom clamshells 724A, 724B (see FIG. 7A) each comprise an internal TIR structure 1000 for mounting tracing ends 410A, 408B (see FIG. 9A) of the first or second tracing optical fiber 406A, 406B within the body 722 (see FIG. 7A) of the first and second fiber optic connector 208A, 208B (see FIG. 9A). In particular, the illumination component 212 comprises the internal TIR structure 1000.

The internal TIR structure 1000 comprises a center column 1002 with an open channel 1004 defined in a top thereof. At a distal end of the center column 1002 is a vertical planar face 1006. Proximate but distal of the vertical planar face 1006 are left and right stabilizing columns 1008A, 1008B. These stabilizing columns 1008A, 1008B are staggered from one another for proper mating with the stabilizing columns 1008A, 1008B for the top clamshell 724A (which is identical to the bottom clamshell 724B). The stabilizing columns 1008A, 1008B are proximate the vertical planar face 1006 to keep the first tracing end 408B of the second tracing optical fiber 406B in place.

Extending from a top of the vertical planar face 1006 is a horizontal mating face 1010. In this way, the horizontal mating face 1010 of the bottom clamshell 724B is configured to mate with the horizontal mating face 1010 of the top clamshell 724A. Accordingly, as shown, when the second tracing optical fiber 406B is positioned in the open channel 1004 of the internal TIR structure 1000, the first tracing end 408B of the second tracing optical fiber 406B abuts the vertical planar face 1006 to the top and bottom clamshells 724A, 724B. This forces the first optical signal to emit through the vertical planar face 1006 and enter the material of the top and bottom clamshells 724A, 724B without any redirection or distortion.

Extending from a distal edge of the horizontal mating face 1010 is a sloping TIR surface 1012, the sloping TIR surface 1012 sloping downward (e.g., outward) from the top of the horizontal mating face 1010. The sloping TIR surface 1012 could be planar and/or curved. Further, the sloping TIR surface 1012 is narrower at the top (e.g., inward) than the bottom (e.g., outward) to compensate for the spreading the optical tracing signal as it exits the first tracing end 408B of the second tracing optical fiber 406B.

When the top and bottom clamshells 724A, 724B are mated to one another, the proximal edge of the top and bottom sloping TIR surface 1012 form a wedge that splits the emitting fiber optic signal such that half of the fiber optic signal is redirected upward, and half the fiber optic signal is redirected downward. This is because the orientation of the body 722 may be flipped to reverse polarity (discussed in more detail below). The distance of the proximal edge of the sloping TIR surface 1012 to the first tracing end 408B of the second tracing optical fiber 406B may vary to optimize optical redirection. TIR is advantageous because it is essentially lossless redirection. Further, the purpose of the slope of the sloping TIR surface 1012 is partly to redirect the emitted fiber optic signal which creates a cone shape as it exits the first tracing end 408B of the second tracing optical fiber 406B.

Figure 10A:
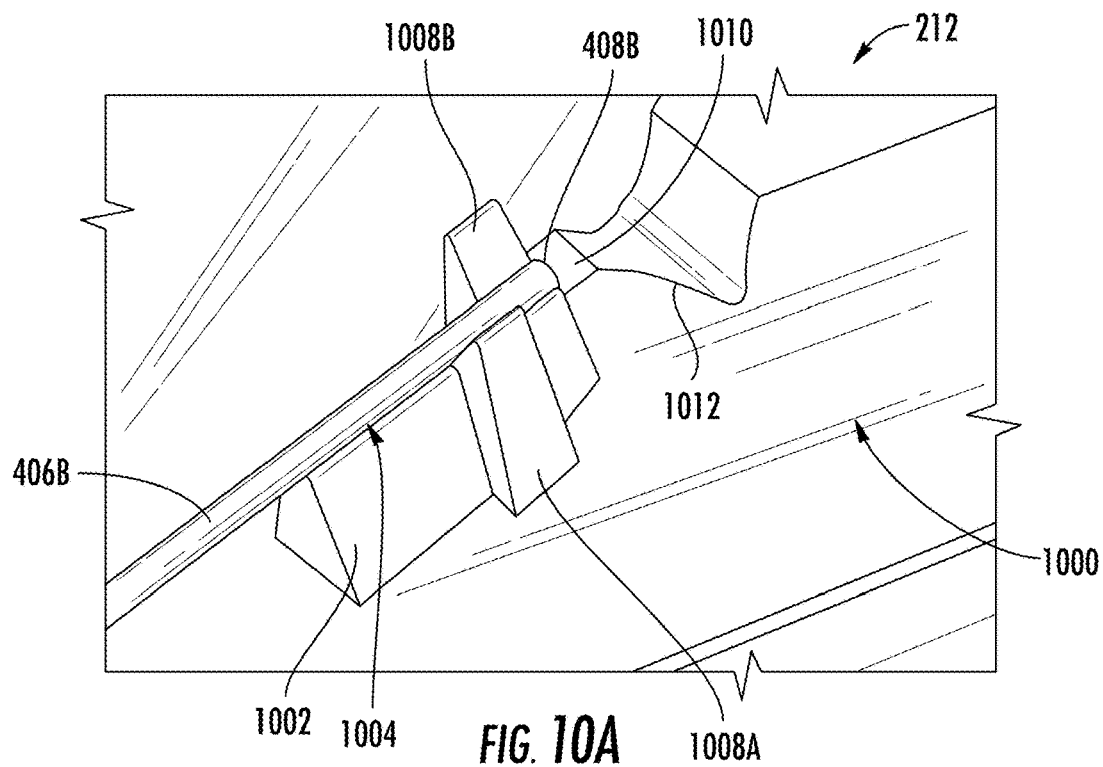
FIG. 10A is a front perspective view of a fiber mount of the bottom clamshell of the first fiber optic connector wherein the first tracing end of the second tracing optical fiber is secured on the fiber mount.
Figure 10B:
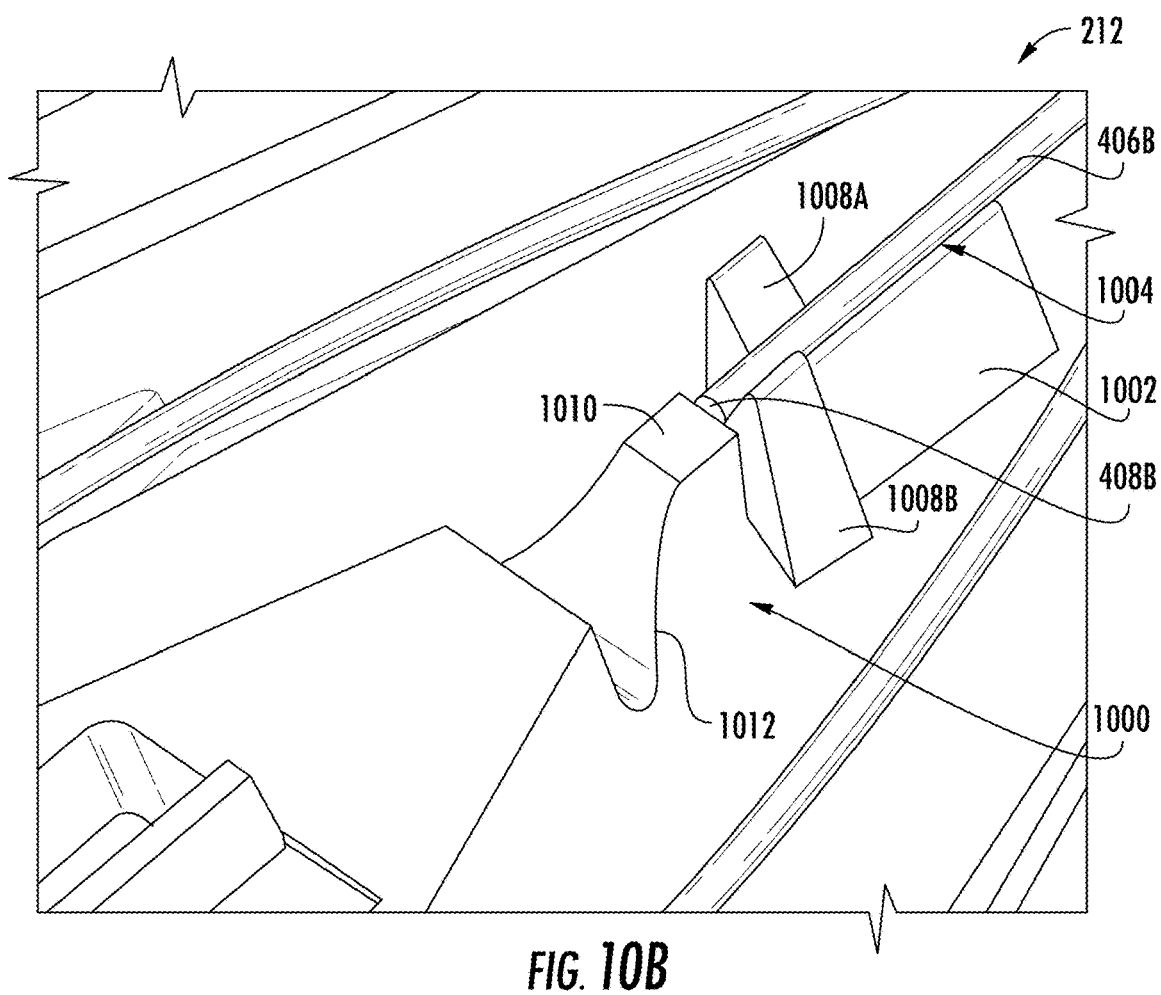
FIG. 10B is a rear perspective view of the first tracing end of the second tracing optical fiber secured on the fiber mount of the first fiber optic connector of FIG. 10A.
Figure 10C:
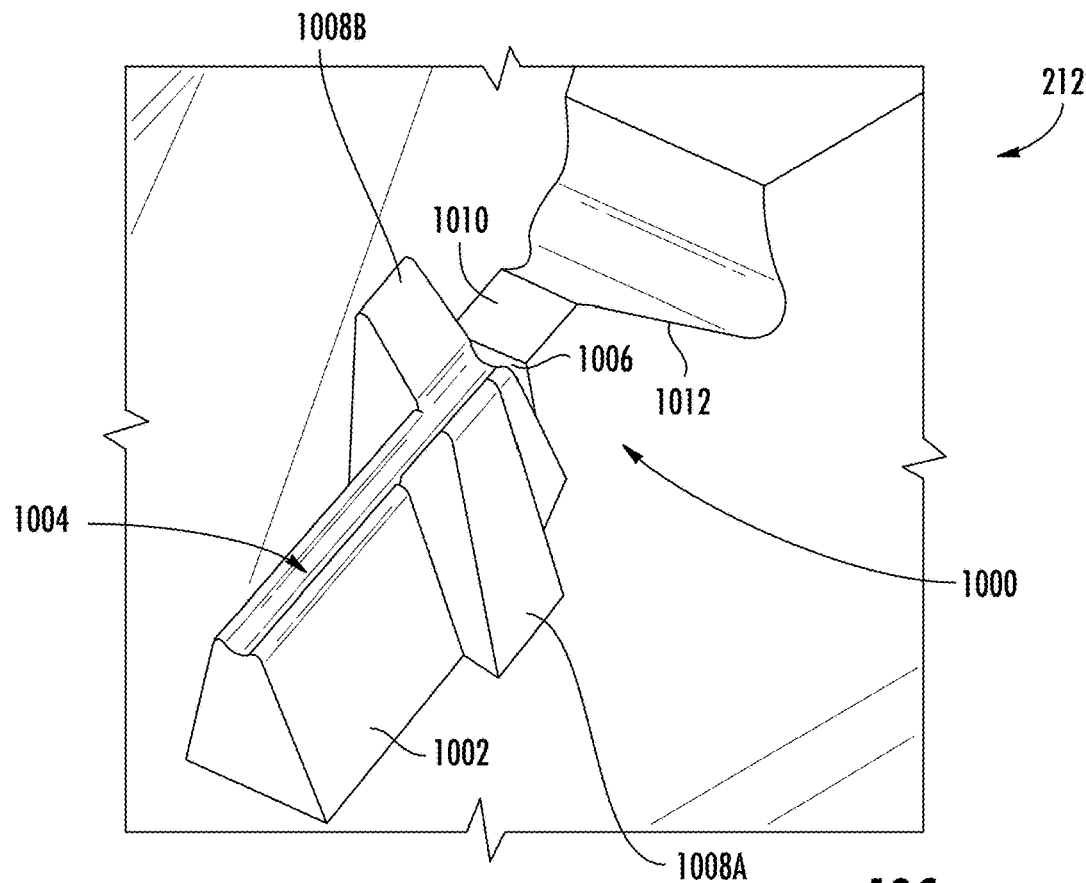
FIG. 10C is a front perspective view of the fiber mount of the first fiber optic connector of FIG. 10A.
Figure 10D:
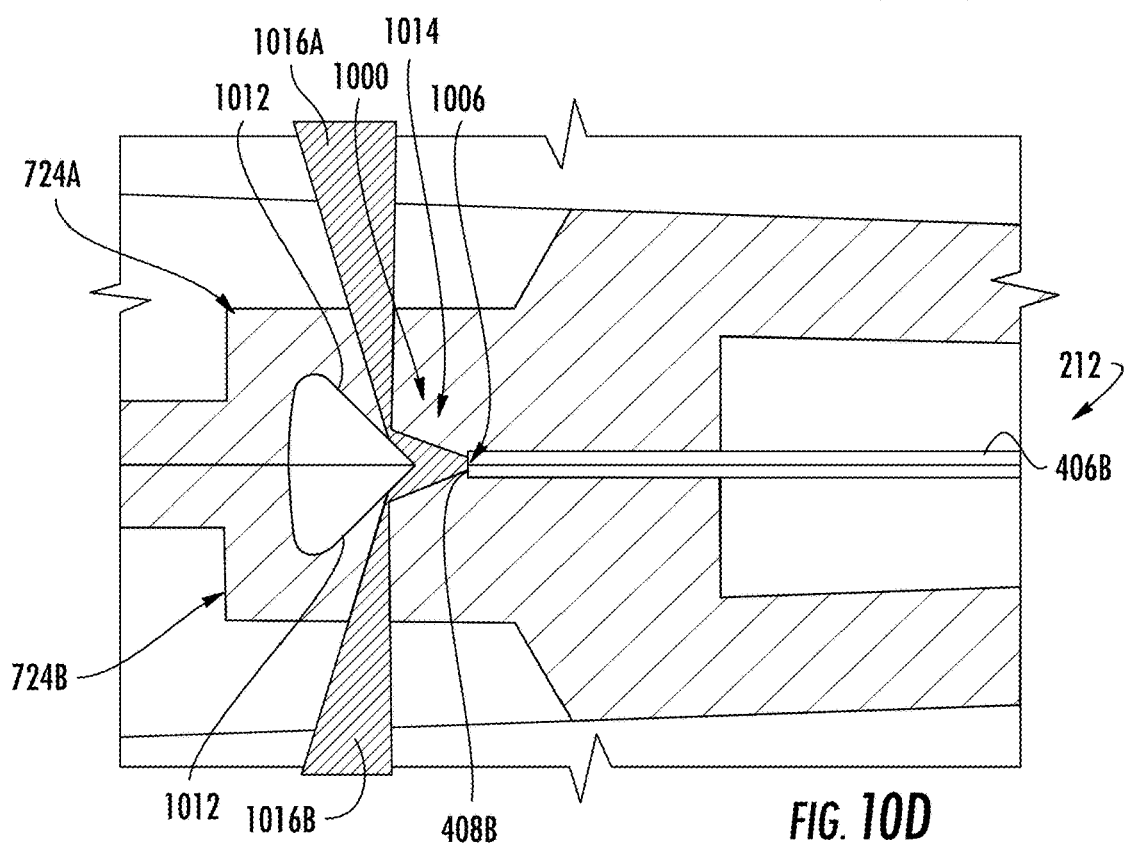
FIG. 10D is a cross-sectional side view of the housing body of the first fiber optic connector of FIG. 10A.
Figure 10E:
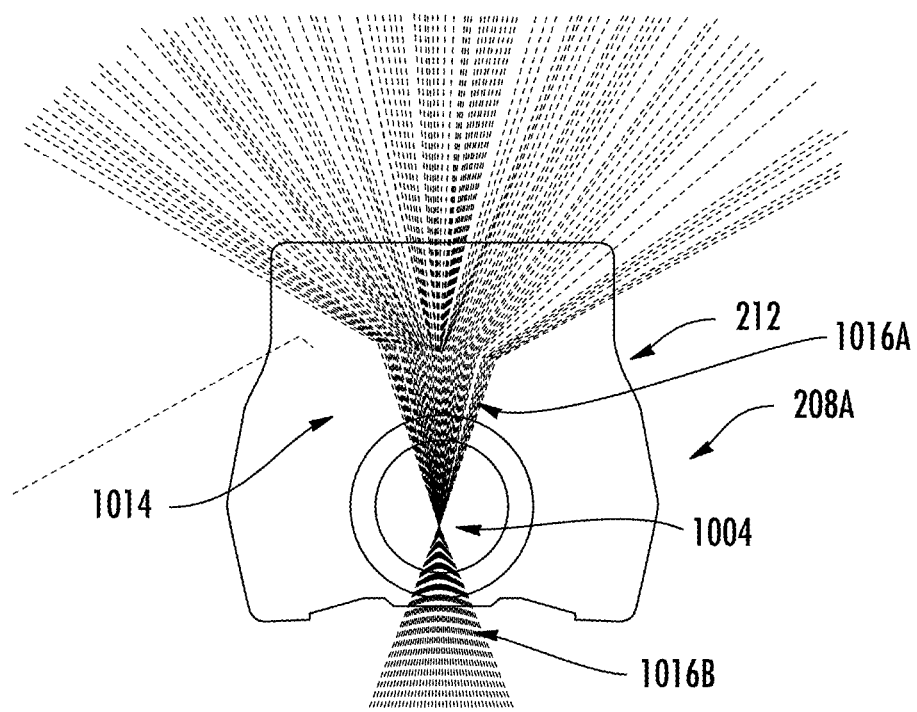
FIG. 10E is a schematic back view of the first fiber optic connector of FIG. 10A illustrating emission of an optical tracing signal from the first fiber optic connector housing using an internal total internal reflection (TIR) surface.
Figure 10F:
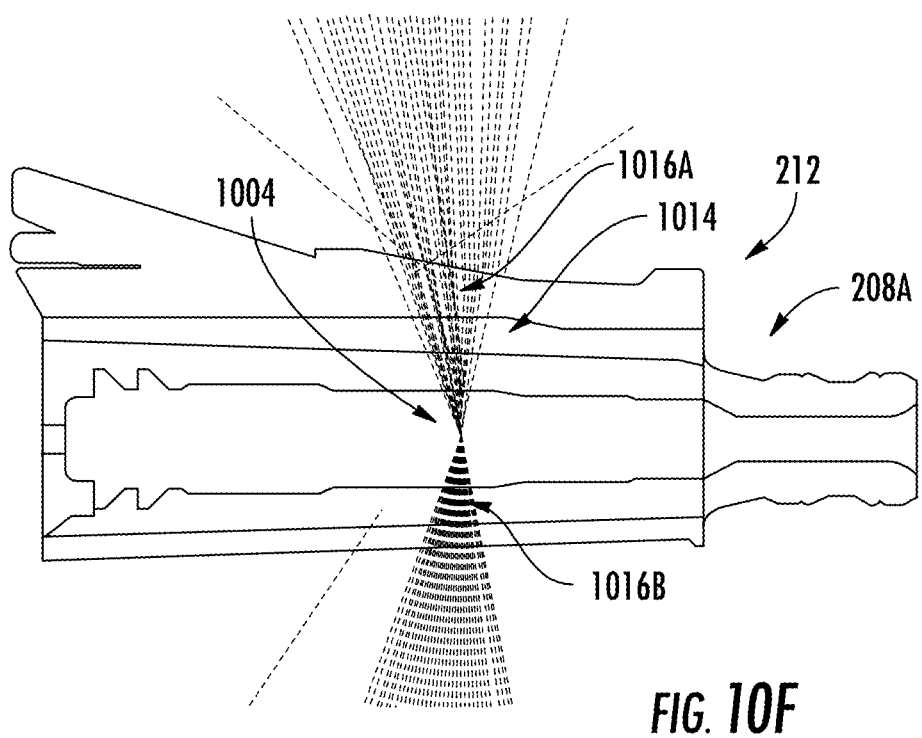
FIG. 10F is a schematic side view of the first fiber optic connector of FIG. 10E.

FIGS. 10D-10F are views of the first fiber optic connector 208A with the optical tracing signal redirected upward and downward by an internal TIR structure 1000. However, the first fiber optic connector 208A shown in FIGS. 10E and 10F has a locking member 704 (see FIGS. 7G-7J) without any external TIR structure. In other words, the locking member 704 does not redirect any of the emitted optical tracing signal. As shown, the internal TIR structure 1000 redirects a primary portion 1014 of the optical tracing signal such that a first half 1016A of the optical tracing signal is directed upward through the top clamshell 724A, through an aperture in a top of the trigger casing 728, and through the locking member 704, and a second half 1016B of the optical tracing signal is directed downward through the bottom clamshell 724B.

Figure 10G:
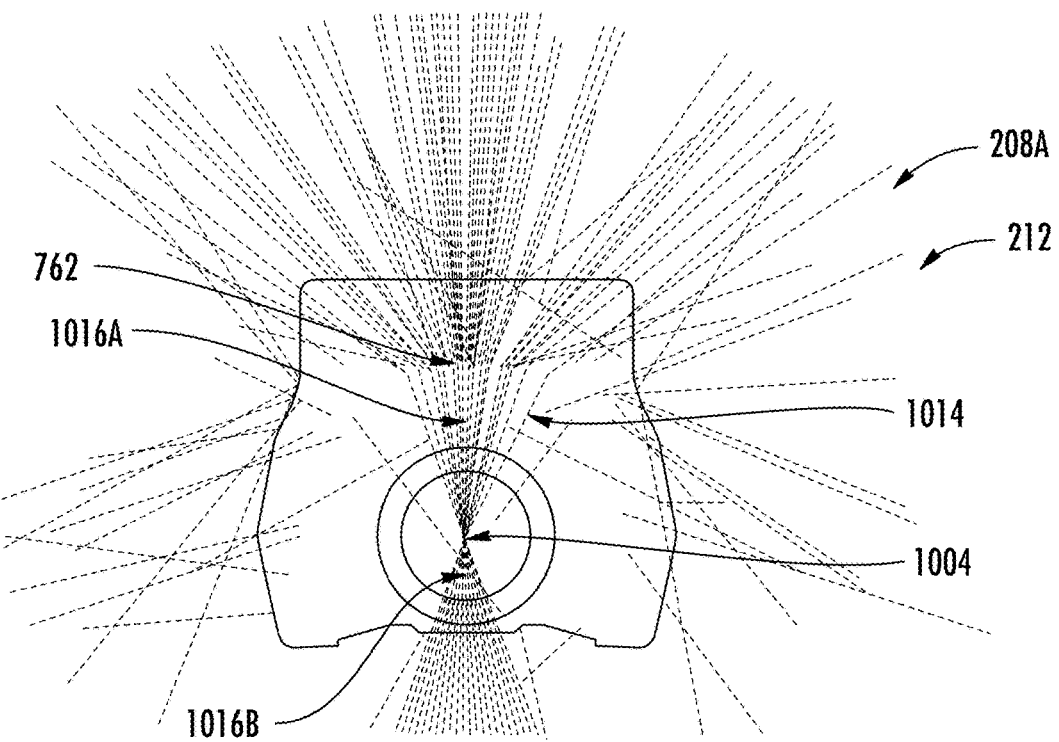
FIG. 10G is a schematic back view of the first fiber optic connector of FIG. 10A illustrating emission of the optical tracing signal from the first fiber optic connector housing using an internal TIR structure and an external TIR structure.
Figure 10H:
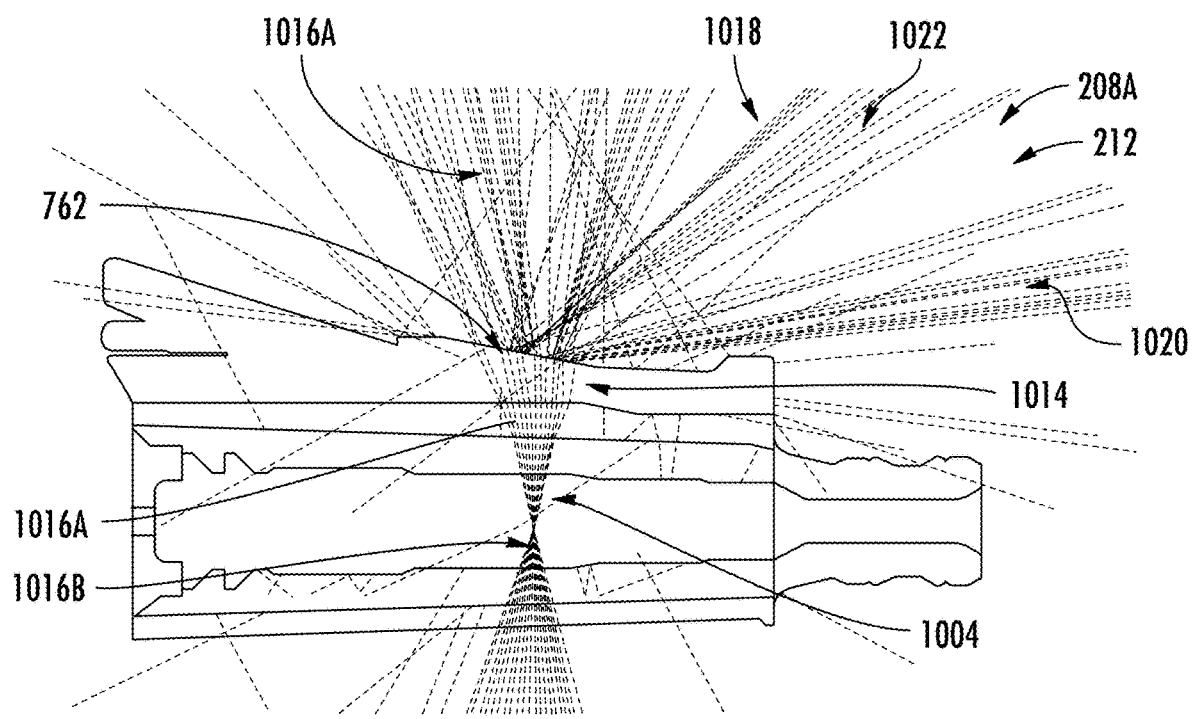
FIG. 10H is a schematic side view of the first fiber optic connector of FIG. 10G.

FIGS. 10G and 10H are views of the first fiber optic connector 208A with the optical tracing signal redirected upward and downward by the internal TIR structure 1000 and redirected backward (e.g., proximally) by the external TIR structure 762. The first fiber optic connector 208A shown in these figures has a locking member 704 with an external TIR structure 762 (see FIGS. 7G-7J). Accordingly, as shown, the internal TIR structure 1000 redirects the primary portion 1014 of the optical tracing signal such that the first half 1016A of the optical tracing signal is directed upward through the top clamshell 724A, through an aperture in a top of the trigger casing 728, and through the locking member 704; and the second half 1016B of the optical tracing signal is directed downward through the bottom clamshell 724B. The locking member 704 redirects a secondary portion 1018 of the primary portion 1014 of the emitted optical tracing signal. In particular, FIG. 10H shows first bands 1020 of the optical tracing signal redirected by the major rearward TIR surface 766, and second bands 1022 of the optical tracing signal redirected by the minor TIR surface 768. Note that this is when the locking member 704 is in the locked position. In the unlocked position, the locking member 704 would slide to the right, and the major forward TIR surface 764 would redirect more optical tracing signal, and the major rearward TIR surface 766 would redirect less optical tracing signal.

It is noted that the optical tracing signal may experience loss as it is injected from the light launch device 204 through the fiber optic cable 206. For example, the optical tracing signal may experience insertion loss (e.g., less than about 9 decibels (dB)). Further, the optical tracing signal may experience loss between the input power (e.g., as the optical tracing signal is injected into the first tracing end 408A of the first tracing optical fiber 406A positioned in the first fiber optic connector 208A), and the emission power (e.g., as the optical tracing signal is emitted from a second tracing end 410A of the first tracing optical fiber 406A positioned in the second fiber optic connector 208B). The loss, input power, and/or output power are dependent upon the wavelength of the optical tracing signal, aperture size, and divergence angle.

It is further noted that calibration of the input power and/or output power is dependent on energy and/or eye safety considerations. In particular, in some embodiments, the input power may be between about 10 microwatts and about 100 milliwatts, or between about 100 microwatts and about 50 milliwatts. In some embodiments, the output power may be between about 10 microwatts and about 50 milliwatts. Further, the input power may be calibrated based on the eye safe limit of the output power, where the eye safe limit is about 50 milliwatts. For example, the input power may be calibrated to about 100 milliwatts to provide an output power of 40 milliwatts. In another embodiment, the input power is calibrated to the eye safe limit (e.g., 50 milliwatts), to ensure that the output power does not exceed this eye safe limit. In other words, if the input power is limited to the eye safe limit, then the output power provided cannot exceed the eye safe limit.

The first and second fiber optic connectors can comprise polyethermide, polybutyleneterephthalate (PBT), polycarbonate (PC), and/or copolyester. In particular, polycarbonate is preferred for the body, the locking feature, and/or any other part that has the data optical signal (e.g., light) travel through it. In some embodiments, the locking member 704 is made of a material that has optical scattering elements on at least part of the surface or within it (e.g., Ultem filled with silica particles).

Figure 11A:
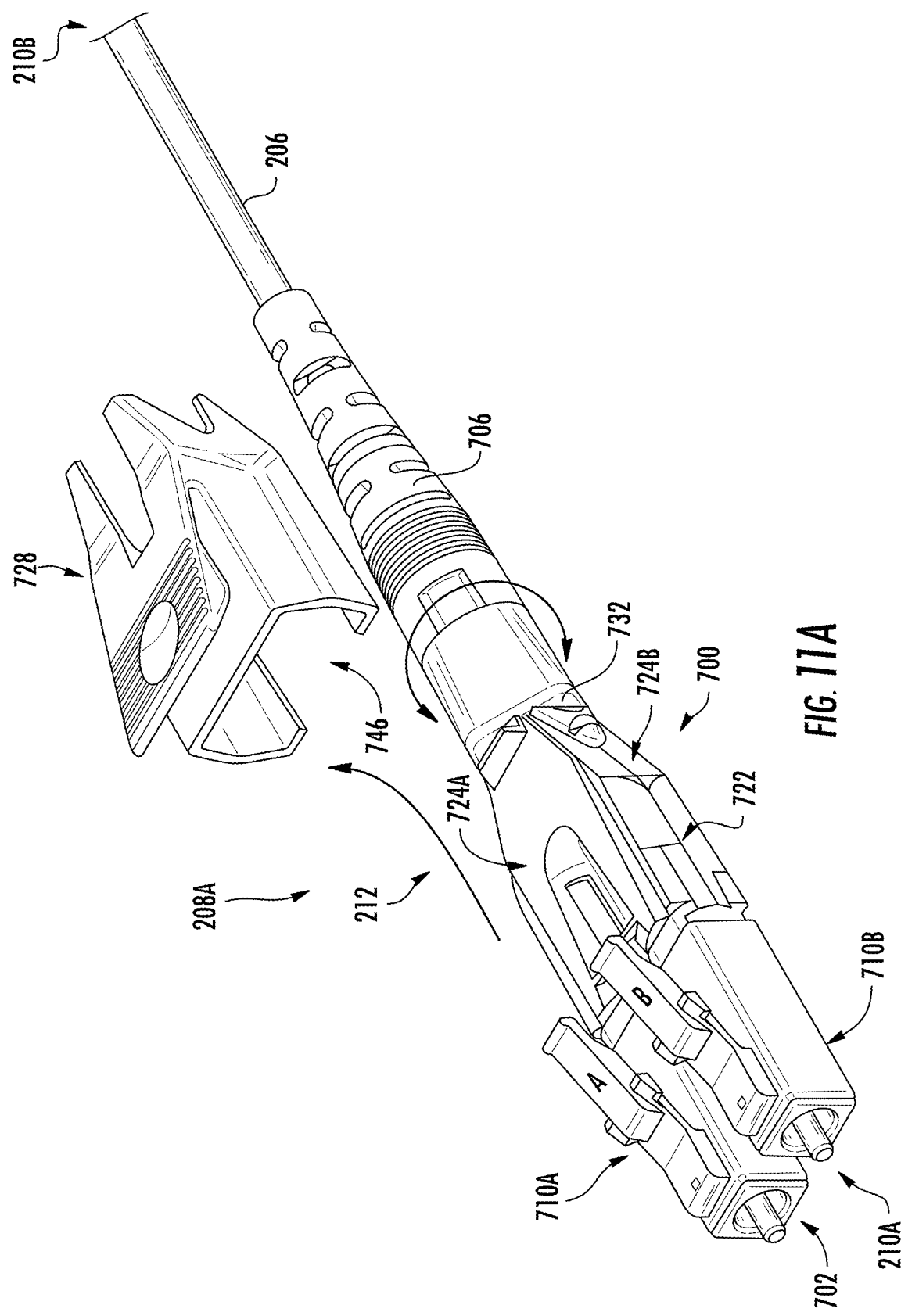
FIG. 11A is a perspective view of the first fiber optic connector beginning the polarity reversal procedure by having the boot rotated so that the trigger mechanism may be removed.
Figure 11B:
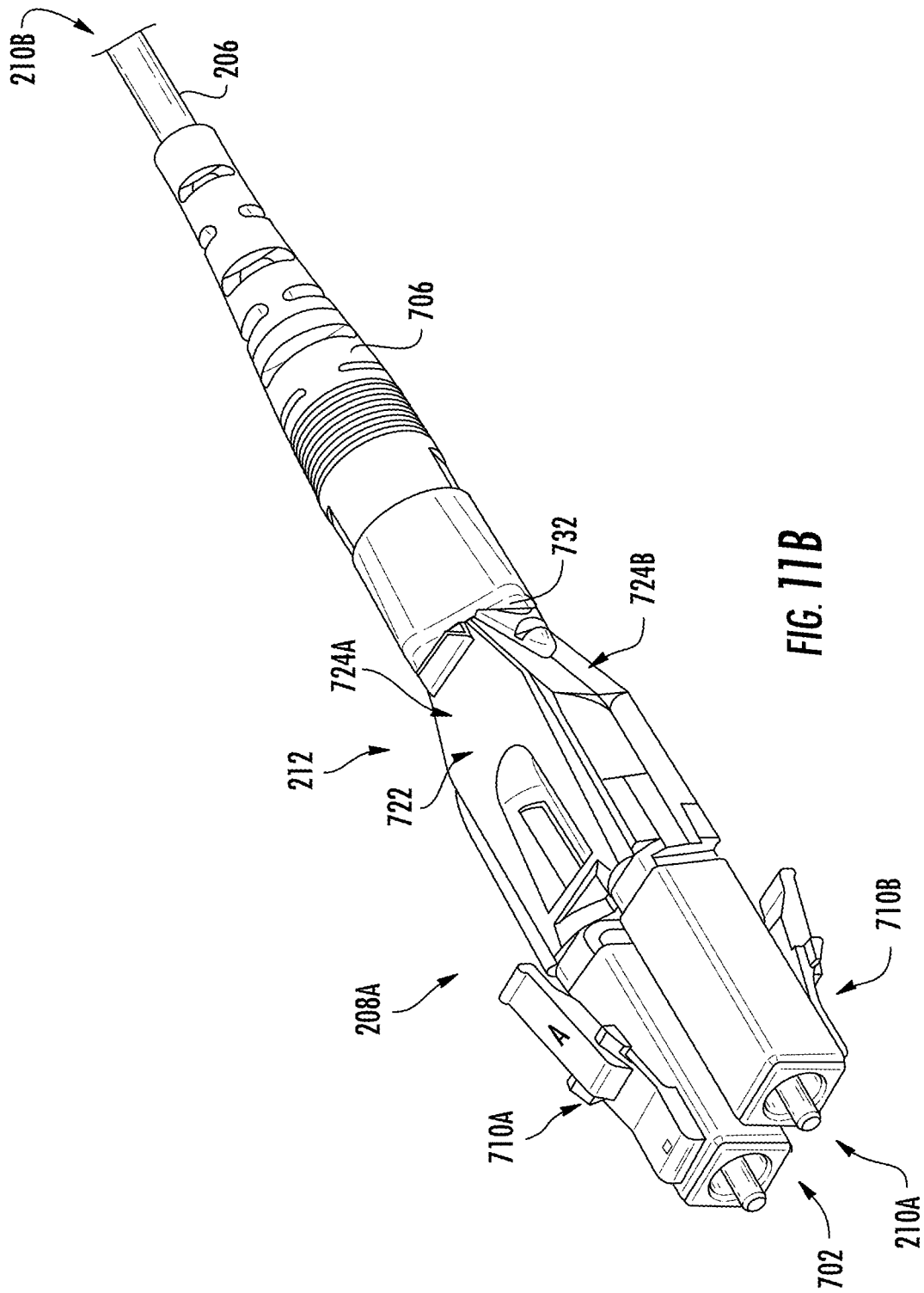
FIG. 11B is a perspective view of the first fiber optic connector of FIG. 11A illustrating the polarity reversal procedure after one of the fiber optic connectors is fully rotated during the polarity reversal procedure.

FIGS. 11A-11C are perspective views of the first fiber optic connector 208A as the polarity is reversed. The first and second fiber optic connectors 208A, 208B may independently rotate along their respective longitudinal axes for polarity reversal within their respective body 722.

FIG. 11A is a perspective view illustrating the beginning of the polarity reversal procedure. For convenience and clarity first fiber optic connector 208A is labeled with "A" and "B" to indicate a beginning orientation (may also be referred to as a first orientation, polarity orientation, etc.) corresponding to a polarity state of the traceable fiber optic cable assembly 202. The polarity of the traceable fiber optic cable assembly 202 may be changed to a second polarity state (may also be referred to as a second polarity configuration) by rotating the boot 706, removing the trigger casing 728, rotating the fiber optic connectors 208A, 208B in opposite directions, replacing the trigger casing 728 on the other side of the connector housing, and then rotating the boot 706 to a home position. In particular, the boot 706 is rotated about 45 degrees from its home position so that it is generally aligned with the side apertures 749 of the trigger casing 728. The trigger casing 728 is then translated axially, over boot 706 and fiber optic cable 206 until finally lifted off of the assembly via the lateral gap 746.

FIG. 11B is a perspective view of the first fiber optic connector 208A of FIG. 11A illustrating the polarity reversal procedure after one of the fiber optic connectors is fully rotated. The left connector sub-assembly 710A is rotated for about 180 degrees until the fiber optic connector 208A is in the position shown. As shown, left and right connector sub-assemblies 710A, 710B are 180 degrees opposite each other. Then the right connector sub-assembly 710A is rotated 180 degrees. Next, the trigger casing 728 is reinstalled similar to that described above with respect to FIG. 11A, but in the reverse order and on the other side of the body 722.

FIG. 11C is a perspective view of the first fiber optic connector 208A of FIG. 11A after the polarity reversal is completed. Accordingly, the polarity has been reversed. In other words, the 'A' and 'B' positions of the fiber optic connector 208A are reversed to a second orientation. The polarity reversal procedure is completely reversible and in no way affects the performance of the fiber optic connector used in the duplex assembly. While optical fibers may undergo a maximum of about 180 degrees of rotation, assembly methods can reduce the maximum rotation experienced, thereby mitigating any torsional affects. For instance, the fiber optic connector may be installed such that when in a relaxed state, the connectors are oriented at 9 o'clock and 3 o'clock (i.e., positioned in the outward direction instead of up or down), whereas for illustration the connectors are shown both at 12 o'clock in this disclosure. Consequently, the optical fibers only experience a net rotation of only +900 or −90° in any polarity orientation.

Figure 12:
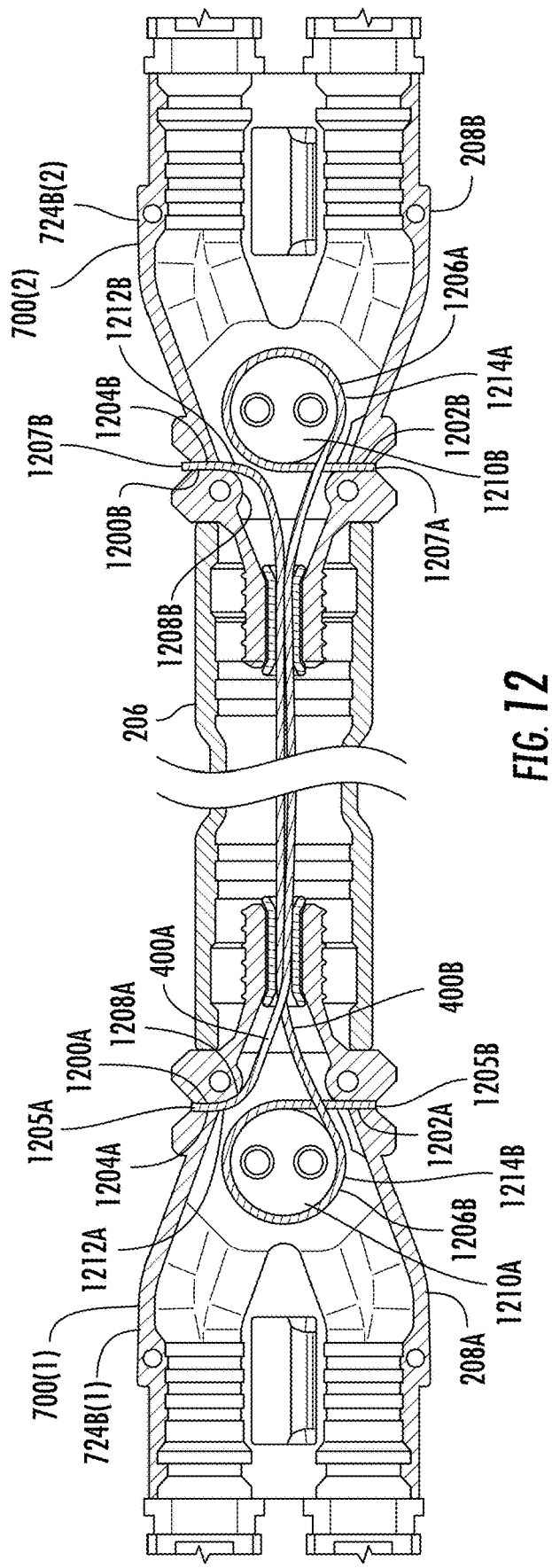
FIG. 12 is a cross-sectional view of another embodiment of the traceable fiber optic cable assembly using a bend induced light scattering (BIS) optical fiber.

FIG. 12 is a cross-sectional view of bottom clamshells 724B of the fiber optic connectors 208A, 208B of FIGS. 9A-10 with optical tracing fibers 406A, 406B embodied as bend induced light scattering (BIS) tracing optical fibers as disclosed in U.S. patent application Ser. No. 16/144,094 filed Sep. 27, 2018 and entitled "Bend Induced Light Scattering Fiber and Cable Assemblies and Method of Making," which is incorporated herein by reference in its entirety.

Although top and bottom clamshells 724A, 724B are identical, as discussed above (see FIG. 7A), in other embodiments top and bottom clamshells 724A, 724B may not be substantially identical, such as one half may comprise all the alignment cavity features, and the other half comprise all the alignment protrusion features. Likewise, other configurations are possible for securing the housing components together. Other variations include a housing formed from a single component that has an upper and lower portion connected by a living hinge.

The BIS tracing optical fibers 406A, 406B extend between the first and second fiber optic connectors 208A, 208B.

In certain embodiments, the fiber optic cable 206 includes a first BIS tracing optical fiber 406A, and a second BIS tracing optical fiber 406B positioned within the jacket 408 (data transmission fibers 400A, 400B (see FIG. 7A) are omitted). The first bottom clamshell 724B(1) (and/or first top clamshell 724A (see FIG. 7A)) includes a first entry channel 1200A and a first emission channel 1202A, and the second bottom clamshell 724B(2) (and/or second top clamshell 724A (see FIG. 7A)) includes a second entry channel 1200B and a second emission channel 1202B (may be referred to generally as an entry channel 1100 and an emission channel 1102). Accordingly, a first end portion 1204A (including a first tracing end 1205A) of a first BIS tracing optical fiber 406A is positioned proximate (e.g., in or near) the first fiber optic connector 208A. In particular, the first end portion 1204A of the first BIS tracing optical fiber 406A is positioned in the first entry channel 1200A in the first fiber optic connector 208A. A second end portion 1206A (including a second tracing end 1207A) of the first BIS tracing optical fiber 406A is positioned proximate (e.g., in or near) the second fiber optic connector 208B. In particular, the second end portion 1206B of the first BIS tracing optical fiber 406A is positioned in the second emission channel 1202B in the second fiber optic connector 208B. Similarly, a first end portion 1204B (including a second tracing end 1207B) of the second BIS tracing optical fiber 406B is positioned proximate (e.g., in or near) the second fiber optic connector 208B. In particular, the first end portion 1204B is positioned in the second entry channel 1200B in the second fiber optic connector 208B. A second end portion 1206B (including a first tracing end 1205B) of the second BIS tracing optical fiber 406B is positioned proximate (e.g., in or near) the first fiber optic connector 208A. In particular, the second end portion 1206B is positioned in the first emission channel 1202A in the first fiber optic connector 208A.

The first bottom clamshell 724B(1) includes a first protrusion 1208A positioned proximate the first entry channel 1200A, between the first entry channel 1200A and the rear 707(1) of the housing 700(1). The first protrusion 1208A protrudes inwardly and has a radius of curvature above the critical radius of curvature. The first bottom clamshell 724B(1) includes a first central hub 1210A defining a circular shape and having a radius of curvature below the critical radius of curvature.

Similarly, the second bottom clamshell 724B(2) includes a second protrusion 1208B positioned proximate the second entry channel 1200B, between the second entry channel 1200B and the rear 707(2) of the housing 700(2). The second protrusion 1208B protrudes inwardly and has a radius of curvature above the critical radius of curvature. The second bottom clamshell 724B(2) includes a second central hub 1210B defining a circular shape and having a radius of curvature below the critical radius of curvature.

The entry channels 1200A, 1200B and the protrusions 1208A, 1208B maintain a first radius of curvature of first and second entry bends 1212A, 1212B of first and second BIS tracing optical fibers 406A, 406B above the critical radius of curvature for light entry into the BIS tracing optical fibers 406A, 406B. The emission channels 1202A, 1202B and central hubs 1210A, 1210B maintain a second radius of curvature of first and second emission bends 1214A, 1214B of the first and second BIS tracing optical fibers 406A, 406B below the critical radius of curvature for light emission out of the BIS tracing optical fibers 406A, 406B. In other words, the entry channels 1200A, 1200B and protrusions 1208A, 1208B maintain (i.e., prevent from exceeding) the BIS tracing optical fiber 406 above the critical radius of curvature for light emission, thereby allowing entry of tracer light, and the emission channels 1202A, 1202B maintain (i.e., prevent from exceeding) the BIS tracing optical fiber 406 below the critical radius of curvature for light emission (but above the radius of curvature for damaging the BIS tracing optical fiber 406), thereby emitting tracer light within the fiber optic connectors 208A, 208B. At least part of the fiber optic connector 208A, 208B is transparent, thereby allowing for end point only tracing applications, where light is emitted at the bends within the optical connectors, while also allowing for identification of bends and kinks in the cable.

In particular, in certain embodiments, the first fiber optic connector 208A includes the first entry channel 1200A and the first protrusion 1208A to maintain the first entry bend 1212A of the first end portion 1204A of the first BIS tracing optical fiber 406A above a critical radius of curvature for light emission, and the first fiber optic connector 208A includes the first emission channel 1202A and the central hub 1210A to maintain the second emission bend 1214B of the second end portion 1204B of the second BIS tracing optical fiber 406B below a critical radius of curvature for light emission. The second fiber optic connector 208B includes the second entry channel 1200B and the second protrusion 1208B to maintain the second entry bend 1212B of the second end portion 1204B of the second BIS tracing optical fiber 406B above a critical radius of curvature for light emission, and the second fiber optic connector 208B includes the second emission channel 1202B and the second central hub 1210B to maintain the first emission bend 1214A of the second end portion 1206A of the first BIS tracing optical fiber 406A below a critical radius of curvature for light emission.

The first and second entry channels 1200A, 1200B and the first and second protrusions 1208A, 1208B provide a bend of about 90 degrees. The first and second emission channels 1202A, 1202B and the first and second central hubs 1210A, 1210B provide a looped bend of about 270 degrees. As a result, the BIS tracing optical fiber 406 may be looped one or more times around the central hubs 1210A, 1210B. In other words, in certain embodiments, the first BIS tracing optical fiber 406 includes a first entry bend 1212A in the first connector 208A and a first emission bend 1214A in the second connector 908B, where the first emission bend 1214A is less than the critical radius of curvature. In certain embodiments, the first entry bend 1212A is equal to or greater than about 90 degrees. In certain embodiments, the first entry bend 1212A is equal to or greater than about 180 degrees. In certain embodiments, the first entry bend 1212A is equal to or greater than about 270 degrees. In certain embodiments, the first emission bend 1214A is equal to or greater than about 90 degrees. In certain embodiments, the first emission bend 1214A is equal to or greater than about 180 degrees. In certain embodiments, the first emission bend 1214A is equal to or greater than about 270 degrees. Other bends could be used for the entry channel 1200 and/or the emission channel 1102.

In this way, the BIS tracing optical fiber 406 serves as an End Point Only (EPO) traceable fiber, and can also identify bends and kinks in the cable, as discussed above.

By using a BIS tracing optical fiber 406 instead of a non-scattering fiber, light at the far end of fiber optic connector 208A, 208B does not need to be redirected as it exits the side of the connector. Instead, the BIS tracing optical fiber 406 will light up the connector uniformly, enhancing visibility. For example, a non-scattering fiber may lose light in a 90 degree bend and may not scatter evenly in all directions, which could substantially reduce the glow and visibility of the connector. In certain embodiments, the BIS tracing optical fiber 406A, 406B is configured to have a different lower NA from other fibers in the cable tracing system 200 to increase the amount of light emitted and scattered. In certain embodiments, there is an optimal fraction of light that should be scattered, as higher or lower scattering fractions may reduce the overall visibility of the far end connector 208A, 208B.

Figure 13A:
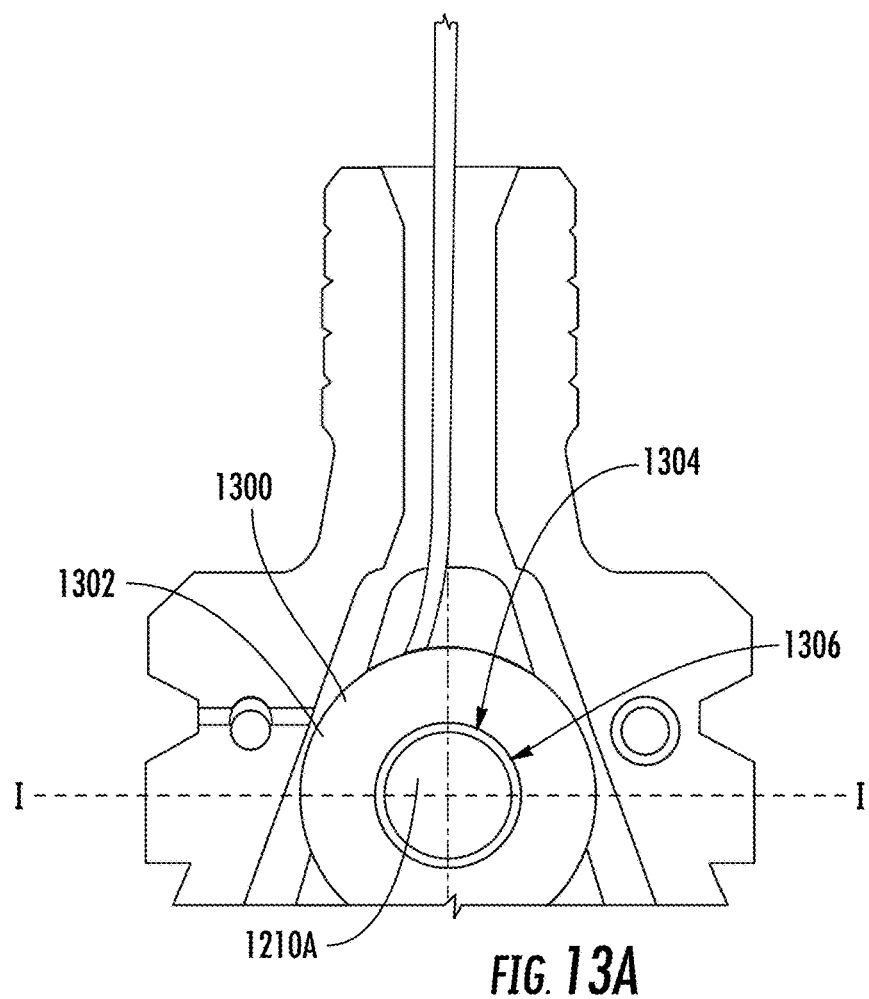
FIG. 13A is a top view of another embodiment of a first fiber optic connector with a mandrel for wrapping and mounting the optical tracing optical fiber.
Figure 13B:
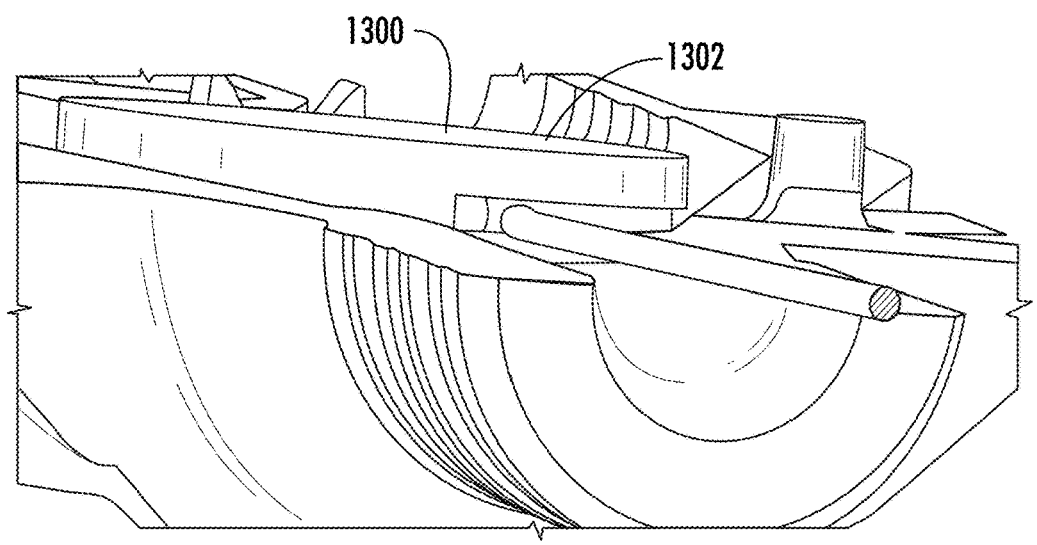
FIG. 13B is a perspective view of the first fiber optic connector and mandrel of FIG. 13A.

FIGS. 13A-13B are views of another embodiment of the first fiber optic connector 208A with a mandrel 1300. The mandrel 1300 includes the central hub 1210A and an outer ring 1302. The outer ring 1302 defines a central hole 1304, which at least partially receives the central hub 1210A. The mandrel 1300 further includes an annular channel 1306 formed between an inner surface of the outer ring 1302 and an outer surface of the central hub 1210A. Light from the BIS tracing optical fiber 406 emits through the annular channel 1306. Further, the mandrel 1300 is angled backward around the axis I-I, such that light emitted from the BIS tracing optical fiber 406 is emitted rearward.

Referring to FIG. 13B, a radius of the outer ring 1302 is larger than a radius of the central hub 1210A, thereby forming a lip to retain the BIS tracing optical fiber 406 around the central hub 1210A of the mandrel 1300.

FIG. 14A is a schematic top view of a traceable fiber optic cable assembly 202"" with indication of polarity (may also be referred to as polarity configuration, polarity orientation, etc.) using a single side launch. In particular, a traceable fiber optic cable assembly 202"" includes a traceable fiber optic cable 206, the first fiber optic connector 208A embodied as a first duplex connector, and the second fiber optic connector 208B embodied as a second duplex connector. The traceable fiber optic cable 206 includes a first data transmission element 400A, a second data transmission element 400B, and a first tracing optical fiber 406A'. The first data transmission element 400A includes a first data end 402A and a second data end 404A for communication of first optical data signals. The second data transmission element 400B includes a first data end 402B and a second data end 404B for communication of second optical data signals. The first tracing optical fiber 406A includes a first tracing end 408A' and a second tracing end 410A'.

The first duplex connector 208A is at a first end of the traceable fiber optic cable 206. The first duplex connector 208A includes a first housing 700 defining a first interior 726, a first simplex connector 710A (embodied as a first transmit simplex connector) at least partially within the first interior 726 of the first housing 700, and a first simplex connector 710B (embodied as a first receive simplex connector) at least partially within the first interior 726 of the first housing 700. The first housing 700 defines a first tracing opening 606' in a preconfigured orientation relative to the first transmit simplex connector 710A and offset from a central axis I-I of the first duplex connector 208A. The first tracing opening 606' is positioned proximate the first transmit simplex connector 710A.

The second duplex connector 208B is at a second end of the traceable fiber optic cable 206. The second duplex connector 208B includes a second housing 700 defining a second interior 726, a second simplex connector 710A (embodied as a first receive simplex connector) at least partially within the second interior 726 of the second housing 700, and a second simplex connector 710B (embodied as a first transmit simplex connector) at least partially within the second interior 726 of the second housing 700. The second housing 700 of the second duplex connector 208B includes a second tracing opening 606'. The second tracing end 410A' of the first tracing optical fiber 406A is within the second tracing opening 606'. The second tracing end 410A' is accessible from an exterior of the first housing 700 for receiving a second optical tracing signal for propagation of the second optical tracing signal to the first tracing end 410A' of the first tracing optical fiber 406A. In certain embodiments, the second tracing opening 606' is positioned proximate the second transmit simplex connector 710A. In certain embodiments, the second tracing opening 606' is positioned proximate the second receive simplex connector 710A. In certain embodiments, the second housing 700 of the second duplex connector 208B further comprises a second unfilled opening 606" devoid of a tracing optical fiber 406A.

The first tracing end 408A' of the first tracing optical fiber 406A is within the first tracing opening 606' of the first housing 700 of the first fiber optic connector 208A and the second tracing end 410A' of the first tracing optical fiber 406A is within the second housing 700 of the second fiber optic connector 208B. The first tracing end 408A' is accessible from an exterior of the first housing 700 for receiving the first optical tracing signal 1400 for propagation of the first optical tracing signal 1400 to the second tracing end 410A' of the first tracing optical fiber 406A to indicate a first orientation of the first duplex connector 208A corresponding to the polarity state of the fiber optic cable assembly 202. The first unfilled opening 606" is devoid of a tracing optical fiber 406A.

In certain embodiments, the first tracing end 408A' of the first tracing optical fiber 406A is proximate the first transmit simplex connector 710A at the first end of the traceable fiber optic cable 206, and the second tracing end 410A' of the first tracing optical fiber 406A is proximate the second transmit simplex connector 710A at the second end of the traceable fiber optic cable 206. This orientation is known to the operator.

The first tracing optical fiber 406A is configured to receive the first optical tracing signal 1400 at the first tracing end 408A' for propagation of the first optical tracing signal 1400 through the first tracing optical fiber 406A to the second tracing end 410A' of the first tracing optical fiber 406A to indicate a first orientation of the first duplex connector 208A corresponding to a first polarity state of the traceable fiber optic cable assembly 202. In particular, if the operator injects the first optical tracing signal 1400 into the first duplex connector 208A', the operator knows the orientation of the first duplex connector 208A' depending on whether light is emitted from the second duplex connector 208B. In certain embodiments, the first optical tracing fiber 406A is configured to have the first tracing end 408A' of the first tracing optical fiber 406A proximate the first transmit connector 208A at the first end of the traceable fiber optic cable 206, and the second tracing end 410A' of the first tracing optical fiber 406A is proximate the second transmit simplex connector 208A at the second end of the traceable fiber optic cable 206.

In other embodiments, the first tracing end 408A' of the first tracing optical fiber 406A is proximate the first transmit simplex connector 710A at the first end of the traceable fiber optic cable 206, and the second tracing end 410A' of the first tracing optical fiber 406A is proximate the second receive simplex connector 710B at the second end of the traceable fiber optic cable 206. In other embodiments, the first tracing end 408A' of the first tracing optical fiber 406A is proximate the first receive simplex connector 710B at the first end of the traceable fiber optic cable 206, and the second tracing end 410A' of the first tracing optical fiber 406A is proximate the second receive simplex connector 710B at the second end of the traceable fiber optic cable 206. Preferably, the first tracing end 408A' and the second tracing end 408B' are both proximate the first and second transmit simplex connectors 710A or are both proximate the first and second receive simplex connectors 710B, as this simplifies determining an orientation of the first and second duplex connectors 208A, 208B (and the polarity of the fiber optic cable assembly 202) for the user. Further, such configurations may be preferable in certain applications where a launch connector 216 (see FIGS. 2A-2C) of a light launch device 204 (see FIGS. 2A-2C) is used and configured to only inject light from one side (e.g., the first side) of the launch connector 216. As the launch connector 216 clips onto the first and second duplex connector 208A, 208B from the top, this ensures that light is injected into the same side of a first and second duplex connector 208A, 208B (i.e., the right side of the first or second duplex connector 208A, 208B). In other words, light is injected into different sides of the fiber optic cable assembly 202. For example, in certain embodiments, a first optical tracing signal is transmitted into a first side of the first duplex connector 208A and a second optical tracing signal is transmitted into a first side of the second duplex connector 208B. In this way, for example, if the first tracing optical fiber 406A is always proximate the transmit simplex connector 710A, a user can easily determine if the first or second duplex connector 208A, 208B is in a first or second orientation (i.e., whether the transmit simplex connector is on the left or right side of the first or second duplex connector 208A, 208B).

In other embodiments, two tracing optical fibers 406A, 406B are used in a configuration similar to that shown in FIGS. 4, 5A, and 9A. The same features and operation for determining polarity apply as discussed above as long as the orientation is known to the operator. For example, the first tracing ends 408A, 408B (see FIG. 4) of the first and second tracing optical fibers 406A, 406B are proximate the first transmit simplex connector 710A of the first and second duplex connectors 208A, 208B, respectively. In other embodiments, the first tracing ends 408A, 408B (see FIG. 4) of the first and second tracing optical fibers 406A, 406B are proximate the first receive simplex connector 710B of the first and second duplex connectors 208A, 208B, respectively.

It is noted that in certain embodiments, the first tracing optical fiber 406A is a BIS optical fiber, such that the first tracing optical fiber 406A emits light at a first bend 1404A within the first fiber optic connector 208A, and the first tracing optical fiber 406A emits light at a second bend 1404B within the second fiber optic connector 208B. In this way, the first tracing optical fiber 406A, first bend 1404A, and/or second bend 1404B are configured to emit light at an opposite end of the traceable fiber optic cable 206. In particular, for example, if the first optical tracing signal 1400 is inserted into the first fiber optic connector 208A, some light is emitted at the first bend 1404A at the first fiber optic connector 208A and then light is emitted again at the second bend 1404B at the second fiber optic connector 208B. However, the first tracing optical fiber 406A, first bend 1404A, and/or second bend 1404B are specifically configured to emit some light for visual detection of a far end of the traceable fiber optic cable 206 regardless of which end the light is injected, but is also configured not to emit too much light that too little light emits from the far end of the traceable fiber optic cable 206. For example, in certain embodiments, the first bend 1404A and the second bend 1404B are configured to emit 0.2 to 0.3 dB (e.g., with 30 mW being injected at the first tracing end 408A'). This way, regardless of which end of the traceable fiber optic cable 206 the first optical tracing signal 1400 is injected, a sufficient amount of light is emitted at the far end for easy and effective visual detection by a user.

FIG. 14B is a schematic top view of another embodiment of the traceable fiber optic cable assembly 202"" with indication of polarity of FIG. 14A with a double side launch. In particular, light is concurrently injected on both sides of the first duplex connector 208A, where the first optical tracing signal 1400 injected into the first side of the first duplex connector 208A is a first color (e.g., red), and a second optical tracing signal 1402 injected into the second side of the first duplex connector 208A is a second color (e.g., green). In this way, the operator knows the orientation of the first duplex connector 208A based on what color is emitted from the second duplex connector 208B (as similarly described in FIG. 14A).

Figure 15:
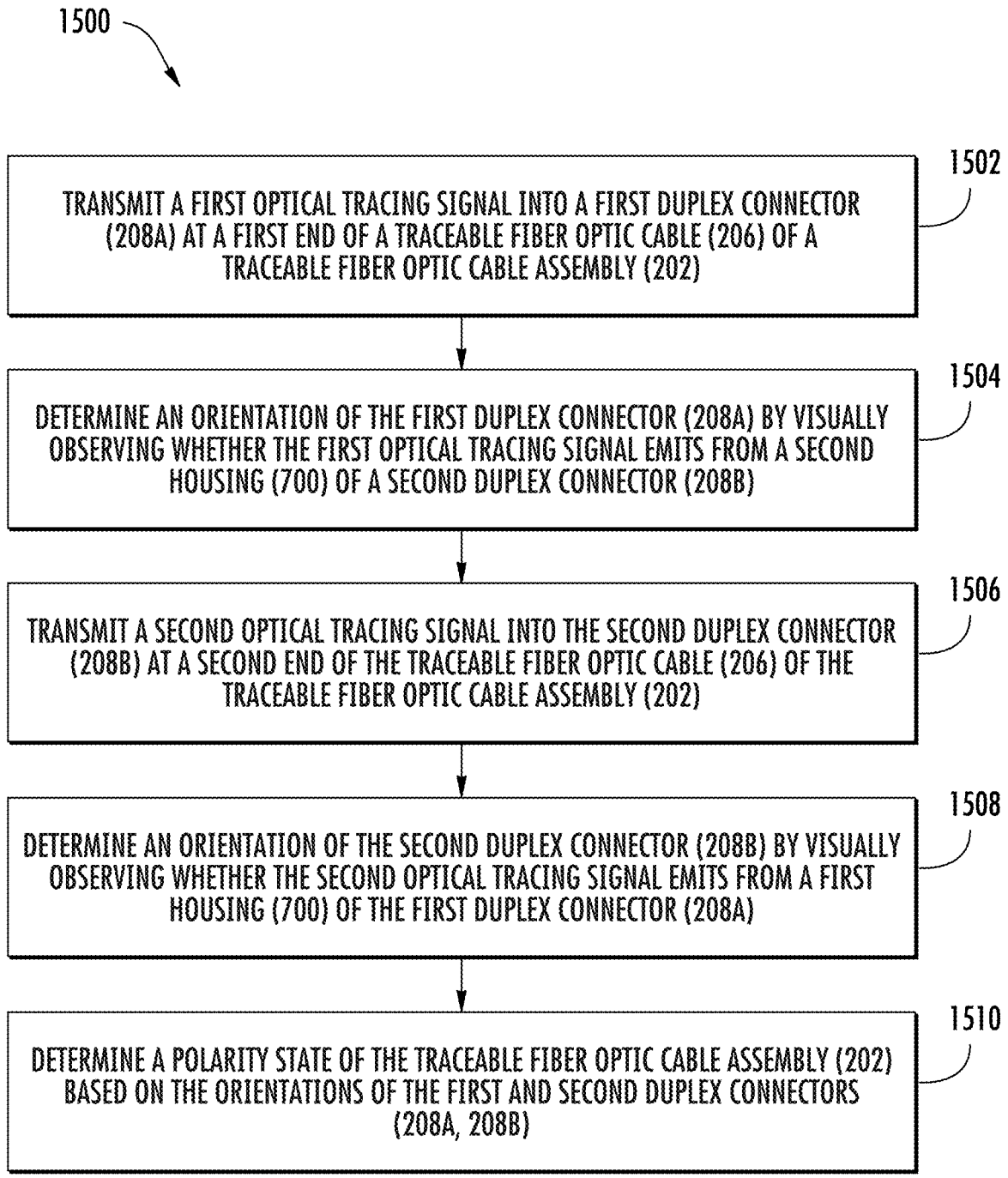
FIG. 15 is a flowchart of steps for determining polarity of a traceable fiber optic cable assembly.

FIG. 15 is a flowchart 1500 illustrating steps for determining polarity of a traceable fiber optic cable assembly 202 using tracing light. In particular, in step 1502, a first optical tracing signal is transmitted into a first duplex connector 208A (e.g., a first side of the first duplex connector) at a first end of a traceable fiber optic cable 206 of a traceable fiber optic cable assembly 202. In certain embodiments, the first optical tracing signal is transmitted through at least one of: (i) a first tracing end 408A of a first tracing optical fiber 406A in a first tracing opening 606' of a first housing 700 of the first duplex connector 208A for propagation through the first tracing optical fiber 406A to a second tracing end 410A in a second duplex connector 208B at a second end of the traceable fiber optic cable 206, the first tracing opening 606' in a preconfigured orientation relative to a first transmit simplex connector 710A of the first duplex connector 208A and offset from a central axis of the first duplex connector 208A, and (ii) a first unfilled opening 606" of the first housing 700 of the first duplex connector 208A. In step 1504, an orientation of the first duplex connector 208A is determined by visually observing whether the first optical tracing signal emits from a second housing 700 of the second duplex connector 208B.

In step 1506, a second optical tracing signal is transmitted into a second duplex connector 208B (e.g., a first side of the second duplex connector 208B) at a second end of the traceable fiber optic cable 206 of the traceable fiber optic cable assembly 202. In step 1508, an orientation of the second duplex connector 208B is determined by visually observing whether the second optical tracing signal emits from a first housing 700 of the first duplex connector 208A. In step 1510, a polarity state of the traceable fiber optic cable assembly 202 is determined based on the orientations of the first and second duplex connectors 208A, 208B.

Optical fibers may be referred to interchangeably as optical waveguides herein. Therefore this disclosure does not intend to differentiate between the terms "optical fiber" and "optical waveguide" per se. The optical fibers may conduct nonvisible light or visible light, such as green light at approximately 532 nm. Red light, blue light, or a combination thereof could also be used to assist with tracing the fiber optic cable 206. Green light may be used due to the relative high degree of sensitivity of the human eye to green light.

In some embodiments, the optical fibers each include a core and a cladding. The core may be made from glass, particularly silica-based glass, having a first index of refraction. Alternatively, the core may be formed from a polymer. The size of the core is not particularly limited, but in some embodiments diameters may be between about 80 microns and about 250 microns. The core may be, for example, 125 microns. Cores that are significantly smaller may be subject to damage from handling, and cores that are significantly larger may be subject to damage when bending.

The cladding can be made from glass or a polymer, such as fluoro-acrylate. The material for the cladding may be selected to have an index of refraction that differs from the index of refraction of the core. In some embodiments, the index of refraction of the cladding is lower than that of the core. The indices of refraction may produce a step-index optical fiber. In other embodiments, the optical fibers may be trapezium or triangular index fibers, gradient index fibers, etc. The cladding closely surrounds the core to help maintain light within the tracing optical fibers. The cladding may have a thickness between about 4% and about 40% of the diameter of the core. For example, the cladding may be between about 5 and about 50 microns thick from the surface of the core to an exterior surface of the cladding when the core has a diameter of 125 microns. The optical fibers may be single mode fibers or multi-mode fibers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A traceable fiber optic cable assembly, comprising:
   a traceable fiber optic cable comprising:
      a first data transmission element comprising a first data end and a second data end;
      a second data transmission element comprising a first data end and a second data end; and
      a tracing optical fiber comprising a first tracing end and a second tracing end;
   a first duplex connector at a first end of the traceable fiber optic cable, the first duplex connector comprising a first housing defining a first interior, a first transmit simplex connector at least partially within the first interior of the first housing and comprising the first data end of the first data transmission element, and a first receive simplex connector at least partially within the first interior of the first housing and comprising the first data end of the second data transmission element, the first housing defining a first tracing opening, the first tracing opening in a preconfigured orientation relative to the first transmit simplex connector; and
   a second duplex connector at a second end of the traceable fiber optic cable, the second duplex connector comprising a second housing defining a second interior, a second transmit simplex connector at least partially within the second interior of the second housing and comprising the second data end of the first data transmission element, and a second receive simplex connector at least partially within the second interior of the second housing and comprising the second data end of the second data transmission element;
   wherein the first tracing end of the tracing optical fiber is within the first tracing opening of the first housing of the first duplex connector and the second tracing end of the tracing optical fiber is within the second housing of the second duplex connector;
   wherein the first tracing end is accessible from an exterior of the first housing for propagating an optical tracing signal to the second tracing end of the tracing optical fiber for determining an orientation of the first duplex connector corresponding to a first polarity state of the traceable fiber optic cable assembly.

2. The traceable fiber optic cable assembly of claim 1, wherein the first tracing opening is positioned proximate the first transmit simplex connector.

3. The traceable fiber optic cable assembly of claim 1, wherein the second housing of the second duplex connector further comprises a second tracing opening, the second tracing end of the tracing optical fiber positioned in the second tracing opening and accessible from an exterior of the second housing.

4. The traceable fiber optic cable assembly of claim 3, wherein the second tracing opening is positioned proximate the second transmit simplex connector.

5. The traceable fiber optic cable assembly of claim 3, wherein the second tracing opening is positioned proximate the second receive simplex connector.

6. The traceable fiber optic cable assembly of claim 1, wherein the first housing of the first duplex connector further comprises:
   a first fiber channel extending from the first tracing opening to the first interior and comprising at least a portion of the tracing optical fiber; and
   a first post in the first interior proximate the fiber channel, the first post comprising a first contact surface to prevent the tracing optical fiber from exceeding a critical bend radius.

7. The traceable fiber optic cable assembly of claim 3, wherein the second housing of the second duplex connector further comprises:

a fiber channel extending from the second tracing opening to the second interior and comprising at least another portion of the tracing optical fiber; and a second post in the second interior proximate the second fiber channel, the second post comprising a second contact surface to prevent the tracing optical fiber from exceeding a critical bend radius.

8. The traceable fiber optic cable assembly of claim 1, wherein at least a portion of the first duplex connector comprises a first translucent material.

9. The traceable fiber optic cable assembly of claim 8, wherein at least a portion of the second duplex connector comprises a second translucent material.

10. A method for determining polarity of a traceable fiber optic cable assembly, comprising:

transmitting an optical tracing signal into a first duplex connector at a first end of a traceable fiber optic cable of a traceable fiber optic cable assembly, the optical tracing signal transmitted to at least one of:

(i) a first tracing end of a tracing optical fiber in a first tracing opening of a first housing of the first duplex connector for propagation through the tracing optical fiber to a second tracing end of the tracing optical fiber in a second duplex connector at a second end of the traceable fiber optic cable, the first tracing opening in a preconfigured orientation relative to a first transmit simplex connector of the first duplex connector; and (ii) a first unfilled opening of the first housing of the first duplex connector; and determining an orientation of the first duplex connector corresponding to a first polarity state of the traceable fiber optic cable assembly by visually observing whether the optical tracing signal emits from a second housing of the second duplex connector.

11. The method of claim 10, wherein the first tracing opening is positioned proximate the first transmit simplex connector.

12. The method of claim 10, wherein at least a portion of the first duplex connector comprises a first translucent material.

13. The method of claim 10, wherein at least a portion of the second duplex connector comprises a second translucent material.

14. The method of claim 10, wherein transmitting the optical tracing signal into the first duplex connector comprises transmitting the optical tracing signal through the first unfilled opening of the first housing of the first duplex connector.

15. The method of claim 14, wherein determining the polarity orientation of the first duplex connector comprises determining the polarity orientation of the first duplex connector by visually observing the optical tracing signal not being emitting from the second housing of the second duplex connector.

16. A traceable fiber optic cable assembly, comprising:

a traceable fiber optic cable comprising at least one data transmission element and a tracing optical fiber comprising a first tracing end and a second tracing end;

a first transmit connector at a first end of the traceable fiber optic cable;

a first receive connector at the first end of the traceable fiber optic cable;

a second transmit connector at a second end of the traceable fiber optic cable; and a second receive connector at the second end of the traceable fiber optic cable;

wherein the first tracing end of the tracing optical fiber is proximate the first transmit connector at the first end of the traceable fiber optic cable and the second tracing end of the tracing optical fiber is proximate the second receive connector at the second end of the traceable fiber optic cable; and wherein the first tracing optical fiber is configured to receive a optical tracing signal at the first tracing end for propagation of the optical tracing signal through the tracing optical fiber to the second tracing end of the tracing optical fiber to indicate a polarity orientation of the first transmit connector and the first receive connector.

17. The traceable fiber optic cable assembly of claim 16, further comprising a first duplex connector comprising the first transmit connector and the first receive connector.

18. The traceable fiber optic cable assembly of claim 17, further comprising a second duplex connector comprising the second transmit connector and the second receive connector.

19. The traceable fiber optic cable assembly of claim 18, wherein the first tracing end of the tracing optical fiber is located in a first opening of the first duplex connector, and the first tracing end being accessible from an exterior of the first duplex connector.

20. The traceable fiber optic cable assembly of claim 19, wherein the second tracing end of the tracing optical fiber is located inside an interior of the second duplex connector.

21. The traceable fiber optic cable assembly of claim 20, wherein the tracing optical fiber comprises a bend induced light scattering optical fiber.

22. The traceable fiber optic cable assembly of claim 21, wherein the second tracing end of the tracing optical fiber comprises a bend that is equal to or greater than 90 degrees.

23. The traceable fiber optic cable assembly of claim 22, wherein the second tracing end of the tracing optical fiber is retained around a central hub of a mandrel.

24. The traceable fiber optic cable assembly of claim 20, wherein the first and second duplex connectors comprise an illumination component comprising one or more total internal reflection structures.

25. The traceable fiber optic cable assembly of claim 24, wherein the illumination components of the first and second duplex connectors are located on locking members of the first and second duplex connectors.

* * * * *